(12) United States Patent
Lev-Sagie et al.

(10) Patent No.: US 12,078,647 B2
(45) Date of Patent: Sep. 3, 2024

(54) ASSAY SYSTEM INCLUDING ASSAY APPARATUS AND HANDHELD SINGLE USE ASSAY DEVICES FOR USE THEREWITH

(71) Applicant: Gyntools Ltd, Jeruslaem (IL)

(72) Inventors: Menachem Lev-Sagie, Lapid (IL); Nimrod Lev, Savion (IL); Tal Shlomovitz, Tel Aviv (IL); Zohar Horowitz Limor, Even Yehuda (IL)

(73) Assignee: GYNTOOLS LTD, Jerusalem (IL)

( * ) Notice: Subject to any disclaimer, the term of this patent is extended or adjusted under 35 U.S.C. 154(b) by 119 days.

(21) Appl. No.: 17/744,007

(22) Filed: May 13, 2022

(65) Prior Publication Data

US 2022/0268793 A1 Aug. 25, 2022

Related U.S. Application Data

(60) Division of application No. 16/725,663, filed on Dec. 23, 2019, now Pat. No. 11,346,850, which is a
(Continued)

(30) Foreign Application Priority Data

Jun. 21, 2017 (IL) .......................................... 253067
Oct. 30, 2019 (IL) .......................................... 270300

(51) Int. Cl.
*G01N 35/00* (2006.01)
*G01N 31/22* (2006.01)
(Continued)

(52) U.S. Cl.
CPC ..... *G01N 35/00029* (2013.01); *G01N 31/221* (2013.01); *G01N 35/00584* (2013.01);
(Continued)

(58) Field of Classification Search
CPC .. G01N 35/00029; G01N 21/33; G01N 21/35; G01N 23/083; G01N 31/221;
(Continued)

(56) References Cited

U.S. PATENT DOCUMENTS

| 4,190,314 A | 2/1980 | Goldsmith |
| 5,428,470 A | 6/1995 | Labriola, II |

(Continued)

FOREIGN PATENT DOCUMENTS

| AU | 2005240757 B2 | 2/2011 |
| KR | 20140140068 A | 12/2014 |

(Continued)

OTHER PUBLICATIONS

Extended Supplementary European Search Report for EP18819634.9 issued on Feb. 18, 2021.
(Continued)

*Primary Examiner* — Matthew D Krcha
*Assistant Examiner* — Tingchen Shi
(74) *Attorney, Agent, or Firm* — Panitch Schwarze Belisario & Nadel LLP

(57) ABSTRACT

Assay systems including assay apparatus and handheld assay devices for use therewith for obtaining diagnostic information of a bodily specimen. Assay devices include a cartridge housing snugly accommodating a specimen slide intended for elevation from an initial lowermost specimen introduction position to a final uppermost specimen examination position in which a bodily specimen is compressed between a cartridge housing top face and a specimen slide. Assay devices preferably include a liquid reagent dispensing arrangement for dispensing liquid reagent on a specimen slide for reacting with a bodily specimen.

18 Claims, 36 Drawing Sheets

Related U.S. Application Data continuation-in-part of application No. PCT/IL2018/050671, filed on Jun. 17, 2018.

(51) Int. Cl.
   *G01N 35/10* (2006.01)
   *G01N 21/33* (2006.01)
   *G01N 21/35* (2014.01)
   *G01N 23/083* (2018.01)

(52) U.S. Cl.
   CPC ..... *G01N 35/1002* (2013.01); *G01N 35/1081* (2013.01); *G01N 21/33* (2013.01); *G01N 21/35* (2013.01); *G01N 23/083* (2013.01); *G01N 2035/00039* (2013.01); *G01N 2035/00138* (2013.01)

(58) Field of Classification Search
   CPC ......... G01N 35/00584; G01N 35/1002; G01N 35/1081; G01N 2035/00039
   See application file for complete search history.

(56) References Cited

U.S. PATENT DOCUMENTS

| | | | |
|---|---|---|---|
| 5,760,315 A | 6/1998 | Verheijden et al. | |
| 6,170,318 B1 | 1/2001 | Lewis | |
| 6,316,205 B1 | 11/2001 | Guan et al. | |
| 7,434,986 B2 | 10/2008 | Ignatowicz | |
| 7,434,988 B1 | 10/2008 | Kychakoff et al. | |
| 8,371,182 B1 | 2/2013 | Israelachvili | |
| 9,222,935 B1 | 12/2015 | Bransky et al. | |
| 9,265,580 B2 | 2/2016 | Speck et al. | |
| 9,518,920 B2 | 12/2016 | Fine et al. | |
| 2002/0182739 A1 | 12/2002 | Sadik et al. | |
| 2003/0164024 A1* | 9/2003 | Mitsubayashi | G01N 21/7703 436/164 |
| 2007/0202564 A1 | 8/2007 | Glasson et al. | |
| 2008/0188769 A1 | 8/2008 | Lu | |
| 2009/0030342 A1 | 1/2009 | Flanigan et al. | |
| 2011/0021950 A1 | 1/2011 | Daniels | |
| 2011/0067489 A1* | 3/2011 | Haberstroh | G01N 21/03 73/864.91 |
| 2011/0136135 A1* | 6/2011 | Larsen | G01N 35/00029 435/7.1 |
| 2012/0031605 A1 | 2/2012 | Takayama et al. | |
| 2012/0108461 A1* | 5/2012 | Bussan | G01N 35/028 506/18 |
| 2012/0157878 A1 | 6/2012 | Mendez | |
| 2012/0288890 A1 | 11/2012 | Oouchi | |
| 2013/0211288 A1 | 8/2013 | Zwart | |
| 2013/0338533 A1 | 12/2013 | Olsen | |
| 2015/0004717 A1* | 1/2015 | McDevitt | G01N 35/1002 422/63 |
| 2015/0094219 A1 | 4/2015 | Trowell et al. | |
| 2016/0186240 A1 | 6/2016 | Andreyev et al. | |
| 2017/0167985 A1* | 6/2017 | Lee | G01N 31/221 |
| 2017/0209865 A1 | 7/2017 | Carrano et al. | |
| 2018/0070928 A1 | 3/2018 | Jones et al. | |
| 2019/0120727 A1 | 4/2019 | Harding et al. | |
| 2019/0233888 A1 | 8/2019 | Wunderle et al. | |
| 2020/0132703 A1 | 4/2020 | Lev-Sagie et al. | |

FOREIGN PATENT DOCUMENTS

| | | |
|---|---|---|
| WO | 2005108604 A2 | 11/2005 |
| WO | 2012033796 A2 | 3/2012 |
| WO | 2013078014 A1 | 5/2013 |
| WO | 2013134179 A2 | 9/2013 |
| WO | 2017001922 A1 | 1/2017 |
| WO | 2018235073 A1 | 12/2018 |

OTHER PUBLICATIONS

PCT International Search Report for PCT/KR2020/051116 issued on Feb. 11, 2021.
Int'l Search Report issued Feb. 11, 2021 in Int'l Application No. PCT/KR2020/051116.
Extended Supplementary European Search Report issued Feb. 18, 2021 in EP Application No. 18819634.9.
Extended Supplementary Search Report issued Feb. 18, 2021 in EP Application No. 18819634.9.
Int'l Search Report issued Feb. 11, 2021 in Int'l Application No. PCT/IL2020/051116.
Int'l Search Report and Written Opinion issued Oct. 8, 2020 in Int'l Application No. PCT/IL2020/050647.

\* cited by examiner

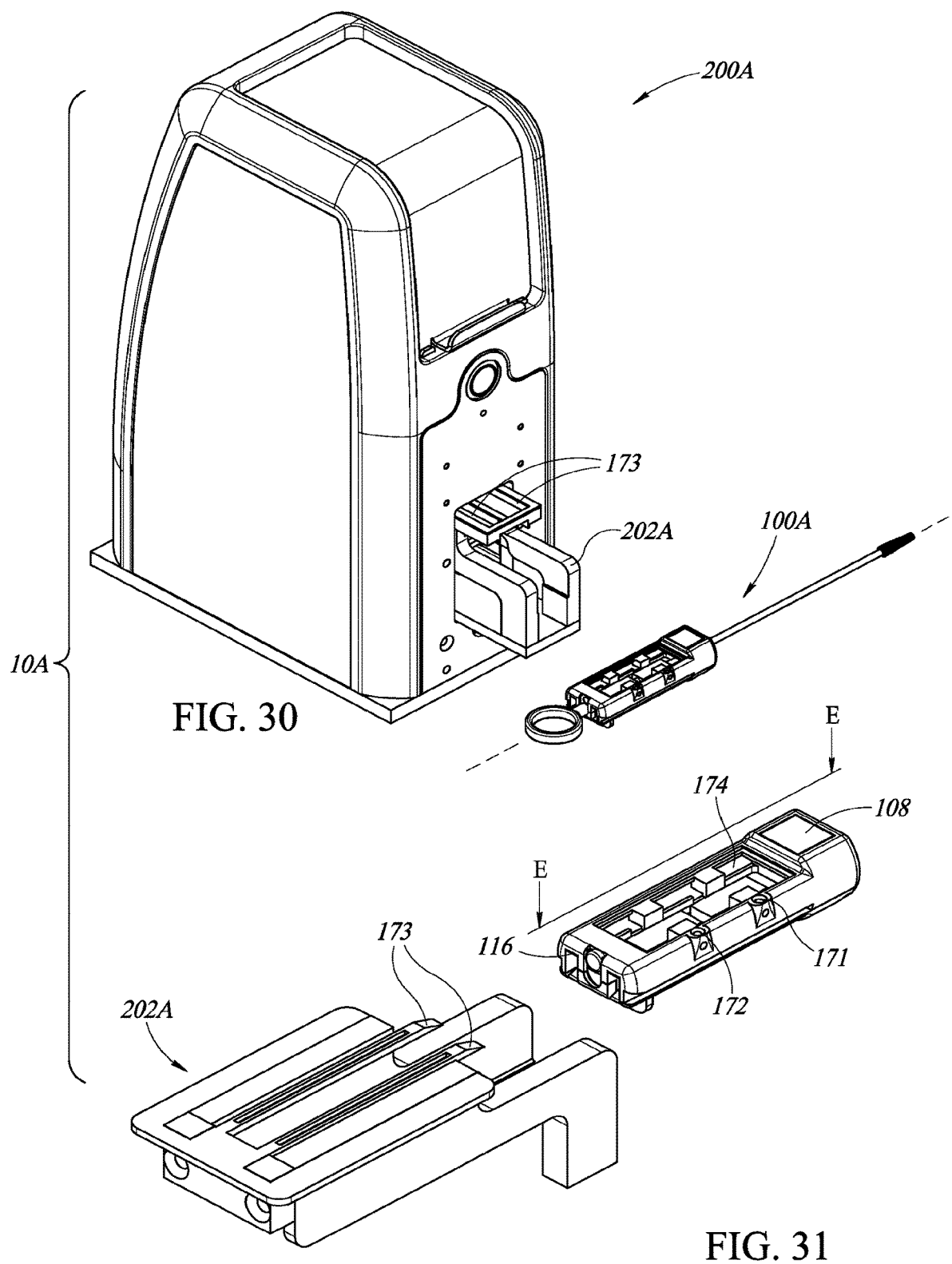

ASSAY SYSTEM INCLUDING ASSAY APPARATUS AND HANDHELD SINGLE USE ASSAY DEVICES FOR USE THEREWITH

CROSS-REFERENCE TO RELATED APPLICATIONS

This application is a division of U.S. application Ser. No. 16/725,663, filed Dec. 23, 2019, which is a Continuation-in-Part Application of PCT/IL2018/050671, filed on Jun. 17, 2018, which claims priority to IL 253067, filed on Jun. 21, 2017, and also claims priority to IL 270300, filed on Oct. 30, 2019, the entire disclosures of which are incorporated herein by reference.

FIELD OF THE INVENTION

This invention relates to assay systems including assay apparatus and handheld assay devices for use therewith.

BACKGROUND OF THE INVENTION

Assays are part of multiple step investigative procedures for qualitatively assessing or quantitatively measuring the presence, amount, or functional activity of one or more specimens. Assays include pre- and post-analytic procedures. Pre-analytic steps include inter alia specimen collection and handling, information collection and processing, and the like. Post-analytic steps include inter alia information storage, report documentation, report transmission, and the like. Assays can be employed for investigating chemical specimens, biological specimens, organic specimens and non-organic specimens. Specimens can be solid, liquid, gel and the like. Investigations can include naked eye visual examinations, naked eye optical examinations using optical apparatus, for example, microscopes, and the like. Investigations can include digital scanning in different modalities including inter alia visible light, IR, UV, ultrasound, X-ray and the like for image processing purposes.

There is a need for assay systems for diagnostic purposes of bodily specimens.

SUMMARY OF THE INVENTION

The present invention is directed towards assay systems for diagnostic purposes of bodily specimens. Bodily specimens can be obtained from a bodily orifice or an exposed bodily surface. Bodily orifices include inter alia facial orifices, urethra, rectum, and vagina. Exposed bodily surfaces include inter alia a skin eruption, a skin efflorescence, an open wound, lips, eyes, and the like.

The assay systems include single use handheld assay devices for each preparing a bodily specimen for diagnostic purposes and assay apparatus for use with interchangeable assay devices for acquiring diagnostic information of bodily specimens. The handheld assay devices are each intended for use with a single use handheld specimen collection tool for obtaining a bodily specimen to be sampled. Handheld specimen handling tools can include inter alia a syringe, a pipette, a specimen sampling device, and the like. Some specimen sampling devices have a leading specimen sample collection end which can take different forms depending on a bodily specimen to be sampled. Suitable specimen collection ends include inter alia a brush, a swab, a shallow bowl, a needle, and the like. Some handheld assay devices can be pre-assembled with a handheld specimen collection tool or alternatively a handheld specimen collection tool can be provided separately.

The assay devices include a cartridge housing having a cartridge housing top face, a cartridge housing bottom face opposite the cartridge housing top face, and a cartridge housing peripheral face extending between the cartridge housing top face and the cartridge housing bottom face to bound a cartridge housing interior. The cartridge housing includes a specimen slide snugly accommodated in the cartridge housing interior and designed to be slidingly elevated from an initial lowermost specimen introduction position to a final uppermost specimen examination position correspondingly remote from and adjacent a cartridge housing top face. The specimen slide is intended to be compressed against the housing top face's underside in the final uppermost specimen examination position to bound a compression zone therebetween similar to a conventional arrangement of a cover slip for placing on a specimen placed on a microscope slide for investigation purposes.

The assay device has a line of examination through the cartridge housing and the specimen slide transparent to at least one predetermined EMR spectrum including inter alia visible light, IR, UV, ultrasound, X-ray and the like. A handheld specimen collection tool is employed for placing bodily specimen on the specimen slide in its initial lowermost specimen introduction position. The handheld specimen collection tool is necessarily removed from the compression zone during the elevation of the specimen slide to its final uppermost specimen examination position.

The assay devices can include a built-in liquid reagent dispensing arrangement for dispensing liquid reagent onto a bodily specimen on a specimen slide. The built-in liquid reagent dispensing arrangement can be designed to dispense different liquid reagents on bodily specimens smeared onto two or more spatially discrete work surfaces along a specimen slide such that the liquid reagents don't cross react. The assay devices are required to undergo two actuations after depositing bodily specimen on a specimen slide to be ready for examination of their bodily specimen for diagnostic purposes as follows: First, actuation of their built-in liquid reagent dispensing arrangement. And second, elevation of their specimen slides from their initial lowermost specimen introduction position to their final uppermost specimen examination specimen. Specimen slide elevation can occur concurrently with or after liquid reagent dispensing on the condition that liquid reagent dispensing ends before specimen slide elevation ends.

Assay apparatus can range from a commercially available digital microscope to purposely designed assay apparatus. Suitable commercially available digital microscopes include inter alia Leica DVM6 and the like. Some assay apparatus includes a tray with a tray pocket for interchangeably receiving an assay device in which a bodily specimen has been preferably deposited onto its specimen slide. Such assay apparatus is similar to a personal computer having a disc drive insofar as the assay device tray has an assay device access position and an assay device examination position. The assay device tray enables placement of an assay device thereon in the assay device access position and removal therefrom. The assay device tray is inserted into the assay apparatus for specimen examination purposes.

Assay apparatus can include one or more plungers for actuating a handheld assay device's built-in liquid reagent dispensing arrangement and one or more specimen slide elevation members for elevating a handheld assay device's specimen slide from its initial lowermost specimen introduction position to its final uppermost specimen examination specimen. Such assay apparatus can include a single electric motor with mechanical arrangements for actuating an assay device's built-in liquid reagent dispensing arrangement and elevating its specimen slide. Alternatively, assay apparatus can include electro-mechanical means, for example, small electric motors, solenoids, and the like, for actuating an assay device's built-in liquid reagent dispensing arrangement and elevating its specimen slide. The assay apparatus preferably includes one or more micro-switches for ensuring that a newly inserted assay device is correctly inserted in its tray pocket. The assay apparatus preferably includes a used assay device detector for detecting a previously used assay device for rejecting same.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 30 is a pictorial view of an alternative assay system including assay apparatus and a handheld assay device with a pre-assembled handheld specimen collection tool;

FIG. 31 is a close-up view of the FIG. 30 assay apparatus's tray and assay device;

DETAILED DESCRIPTION OF DRAWINGS

Assay System

Figure 1:
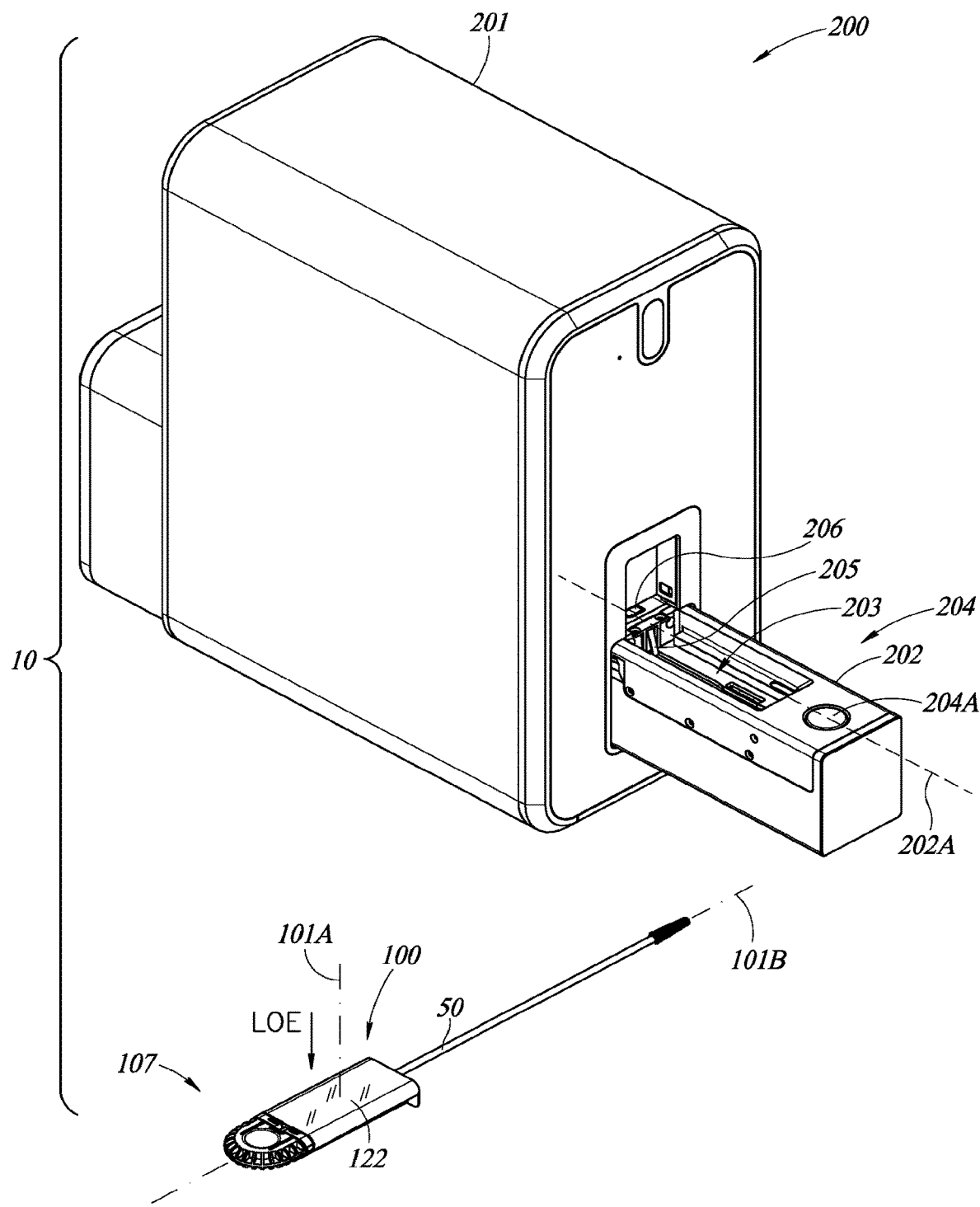
FIG. 1 is a pictorial view of an assay system including assay apparatus and a handheld assay device with a pre-assembled handheld specimen collection tool.

FIG. 1 shows an assay system 10 for diagnostic purposes of bodily specimens. The assay system 10 includes a handheld assay device 100 for use in a desktop assay apparatus 200 suitable for deployment in an outpatient clinic and the like. The assay device 100 is preferably pre-assembled with a specimen collection tool 50 for facilitating usage. Alternatively, the assay device 100 and the specimen collection tool 50 can be provided as discrete items. The assay apparatus 200 can be powered by a mains supply, a rechargeable battery, and the like. The assay apparatus 200 can be a standalone device with built-in diagnosis capabilities for diagnostic purposes and/or can transmit acquired images and other information for remote processing.

The assay apparatus 200 includes an apparatus housing 201 having a tray 202 reciprocal between an outermost position and an innermost position. The tray 202 has a longitudinal tray centerline 202A and a longitudinal tray pocket 203 centered therealong for interchangeably receiving assay devices 100. The tray 202 includes a manual operated eject mechanism 204 with an eject button 204A for ejecting an assay device 100 from the tray pocket 203 after it has been processed for diagnostic information. The tray pocket 203 preferably includes one or more micro-switches 205 for ensuring an assay device 100 has been correctly inserted. The tray 200 includes a color target 206 for calibration purposes as explained hereinbelow. The assay apparatus 200 may include a barcode reader for reading an assay device's barcode for determining that an assay device 100 is an authorized assay device.

Assay Device including Specimen Collection Tool

Figure 2:
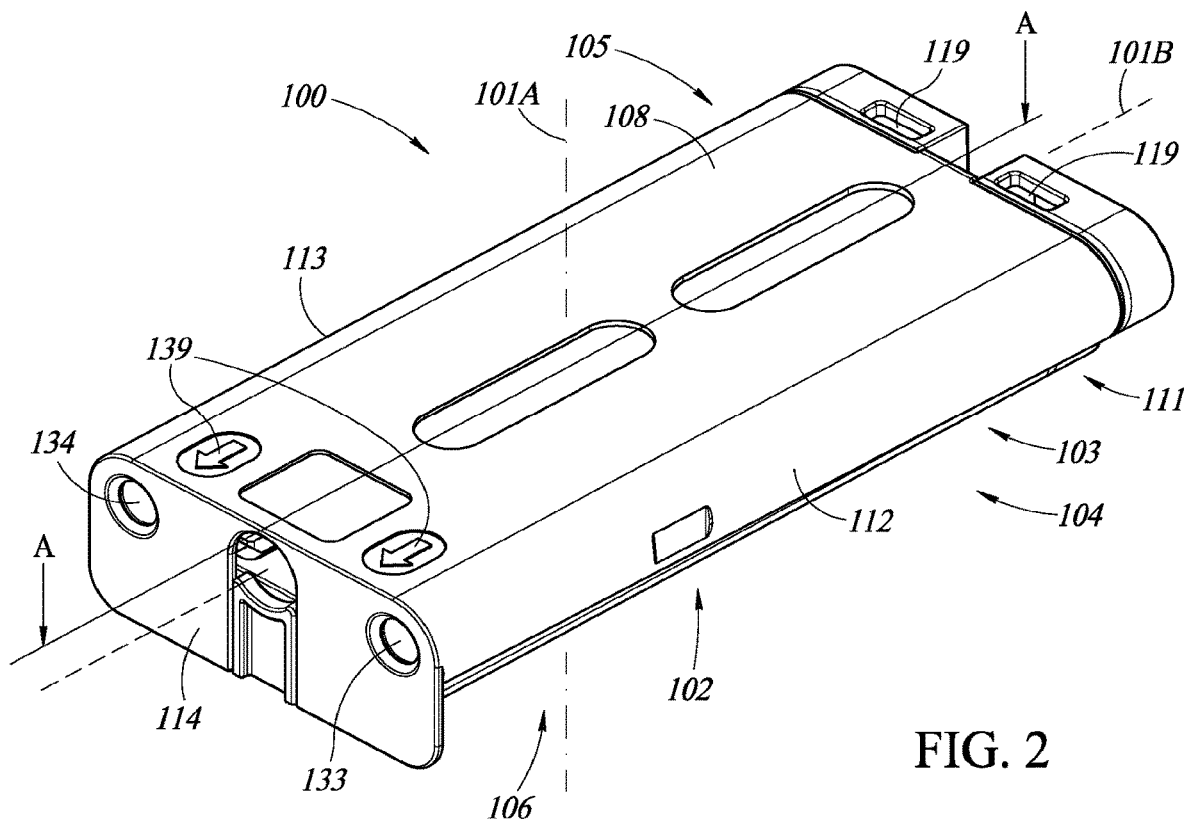
FIG. 2 is a top perspective view of the assay device.
Figure 3:
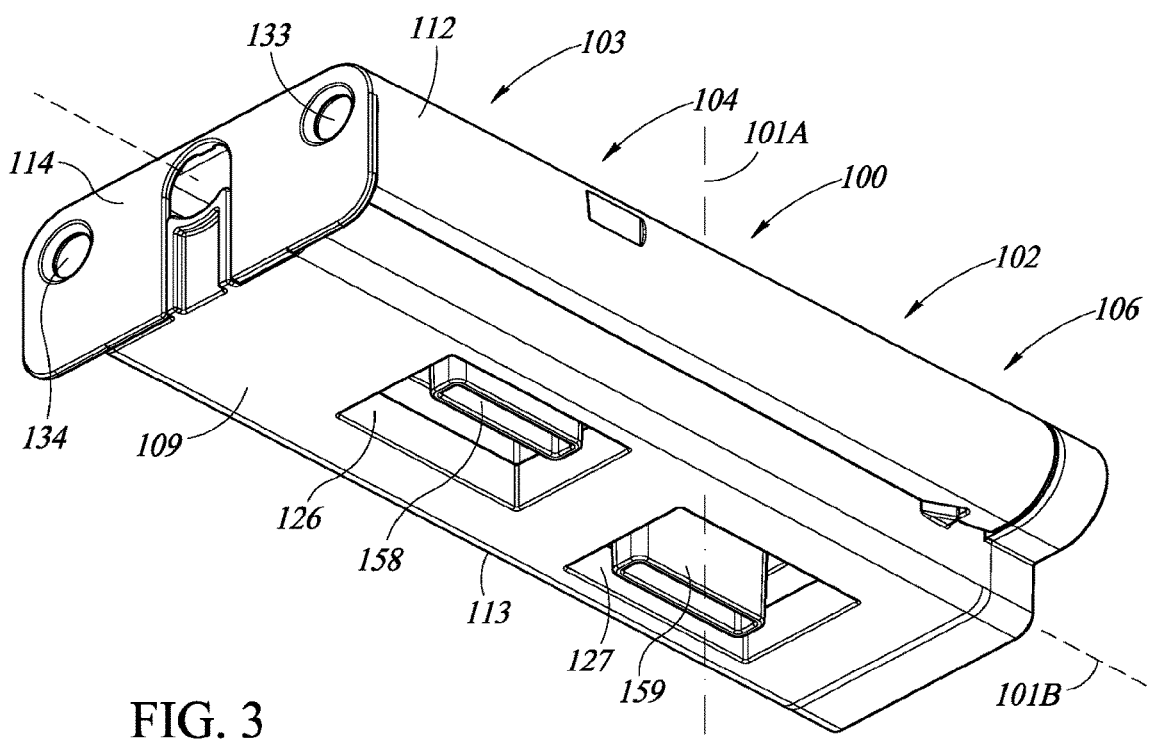
FIG. 3 is a bottom perspective view of the assay device
Figure 4:
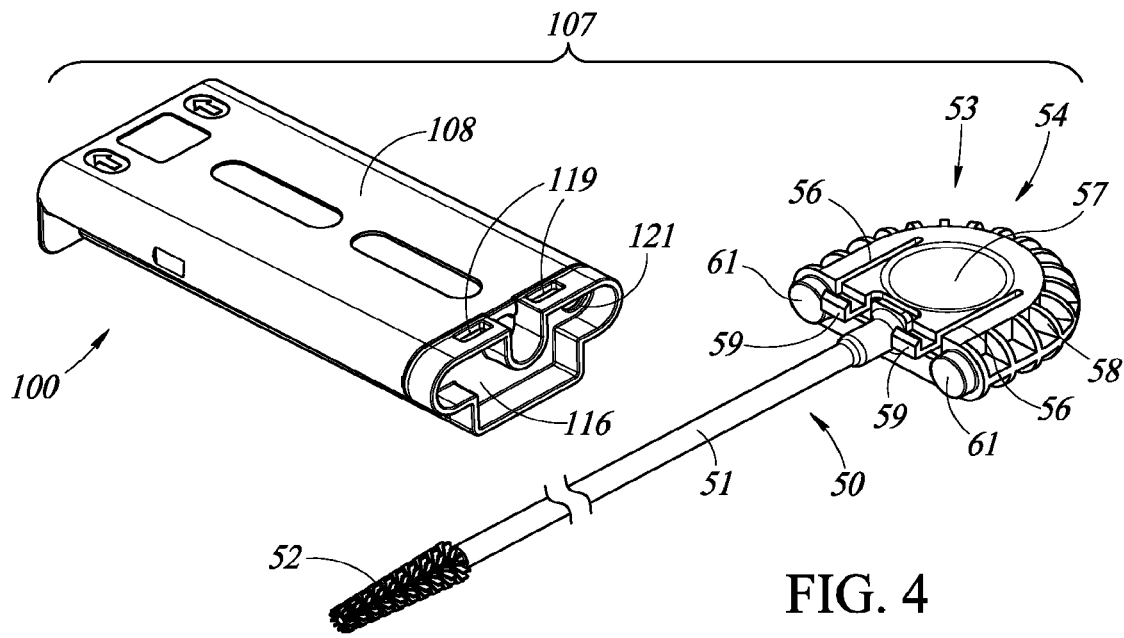
FIG. 4 is a close up view showing a securing arrangement for securing the handheld specimen collection tool to the handheld assay device.

FIG. 2 and FIG. 3 show the assay device 100 having an upright assay device centerline 101A and a horizontal longitudinal assay device centerline 101B perpendicular to the upright assay device centerline 101A. The assay device 100 is examined along a Line Of Examination (LOE) co-directional with the upright assay device centerline 101A The assay device 100 includes a generally box-shaped cartridge housing 102 with a cartridge housing interior 103 snugly accommodating a specimen slide 104 slidingly elevated from an initial lowermost specimen introduction position to a final uppermost specimen examination position. The cartridge housing 102 is preferably formed from transparent plastic material, for example, polycarbonate, and the like. The assay device 100 includes a specimen slide securing arrangement 105 for securing the specimen slide 104 in its final uppermost specimen examination position. The assay device 100 includes a built-in liquid reagent dispensing arrangement 106 for dispensing liquid reagent on a bodily specimen smeared on the specimen slide 104 in its initial lowermost specimen introduction position.

The assay device 100 and the specimen collection tool 50 include a manual operated engagement 107 (see FIG. 1) for initially engaging the specimen collection tool 50 to the assay device 100 for preventing relative movement therebetween during transportation and also during obtaining a bodily specimen. The manual operated engagement 107 is released for enabling sliding removal of the specimen collection tool 50 from the assay device 100 after obtaining a bodily specimen and before insertion of the assay device 100 in the assay apparatus 200 for diagnostic purposes.

FIG. 2 to FIG. 9 show the cartridge housing 102 includes a cartridge housing top face 108, a cartridge housing bottom face 109 opposite the cartridge housing top face 108 and a cartridge housing peripheral face 111 extending between the cartridge housing top face 108 and the cartridge housing bottom face 109 and co-directional with the upright assay device centerline 101A. The cartridge housing peripheral face 111 includes an opposite pair of major side walls 112 and 113 co-directional with the horizontal longitudinal assay device centerline 101B, a leading minor end face 114 transverse to the horizontal longitudinal assay device centerline 101B and a trailing minor end face 116 transverse to the horizontal longitudinal assay device centerline 101B and opposite the leading minor end face 114. The leading minor end face 114 has a leading throughgoing aperture 117 and the trailing minor end face 116 has a trailing throughgoing aperture 118 both deployed along the horizontal longitudinal assay device centerline 101A for enabling passage of the specimen collection tool 50 therethrough. The cartridge housing top face 108 includes a spaced apart pair of cutouts 119 on either side of the horizontal longitudinal assay device centerline 101B adjacent the trailing minor end face 116. The trailing minor end face 116 includes a spaced apart pair of trailing blind bores 121 on either side of the trailing throughgoing aperture 118.

The specimen collection tool 50 includes an elongated shaft 51 having a leading specimen collection tip 52 in the form of a brush, a swab, and the like, and a trailing end 53. The trailing end 53 includes a half oval shaped planar hand grip 54 having a spaced apart pair of longitudinal slits 56 co-directional with the shaft 51 for forming a manually depressible release button 57 flexibly connected to a hand grip surround 58. The release button 57 includes a spaced apart of leading clips 59 for snap fitting to the assay device's spaced apart pair of cutouts 119 in the assay device 100 and the specimen collection tool 50's assembled state. The hand grip surround 58 includes a spaced apart pair of circular protrusions 61 for insertion into the assay device's spaced apart pair of trailing blind bores 121 in the assay device 100 and the specimen collection tool 50's assembled state.

FIG. 1 shows the assay device 100 includes a protective foil 122 covering the cartridge housing top face 108 and the leading minor end face 114. The protective foil 122 is kept in place during the obtaining of a bodily specimen and is removed before insertion of the assay device 100 into the assay apparatus 200 for diagnostic purposes. The protective foil 122 prevents finger prints on the cartridge housing top face 108 which can degrade imaging by the assay apparatus 200. The protective foil 122 ensures the leading minor end face 114 remains clean of any bodily specimen which might otherwise remain on sliding removal of a specimen collection tool 50 from an assay device 100 and lead to dirtying the assay apparatus 200's interior.

The cartridge housing 102 includes a dual component construction: a base 123 and a cover 124 for mounting on the base 123. The base 123 includes the cartridge housing bottom face 109, the trailing minor end surface 116 and a trailing section of the cartridge housing top face 108 with the spaced apart pair of cutouts 119. The cartridge housing bottom face 109 is formed with a leading throughgoing aperture 126 and a trailing throughgoing aperture 127 both deployed along the horizontal longitudinal assay device centerline 101B for providing access to the cartridge housing interior 103. The base 123 includes an opposite pair of major side walls 128 and 129 lateral to the horizontal longitudinal assay device centerline 101B correspondingly formed with longitudinal barrels 131 and 132 of the built-in liquid reagent dispensing arrangement 106.

The cover 124 includes the cartridge housing top face 108 and the leading minor end face 114. The leading minor end face 114 is formed with a spaced apart pair of leading throughgoing apertures 133 and 134 in registration with the spaced apart pair of longitudinal barrels 131 and 132. The cartridge housing top face 108 can be transparent to predetermined EMR spectrum. Alternatively, the cartridge housing top face 108 can include a longitudinal arrangement of three panels transparent to predetermined EMR spectrum. The three panels includes a generally square leading cartridge housing top face panel 136 adjacent the leading minor end face 114, a generally rectangular intermediate cartridge housing top face panel 137 midway between the leading minor end face 114 and the trailing minor end face 116, and a generally rectangular trailing cartridge housing top face panel 138 adjacent the trailing minor end face 116. The intermediate cartridge housing top face panel 137 overlies the leading throughgoing aperture 126. The trailing cartridge housing top face panel 138 overlies the trailing throughgoing aperture 127. The leading cartridge housing top face panel 136, the intermediate cartridge housing top face panel 137 and the trailing cartridge housing top face panel 138 can be formed as a single panel.

Figure 8:
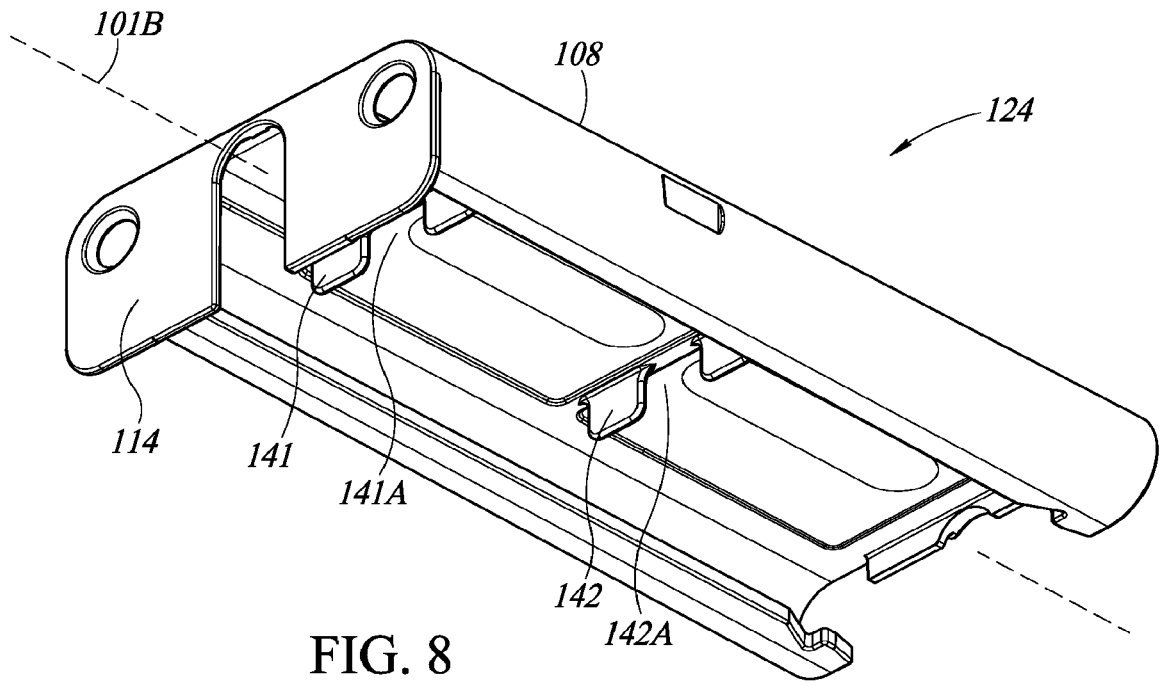
FIG. 8 is a bottom perspective view of a cover of the handheld assay device.
Figure 9:
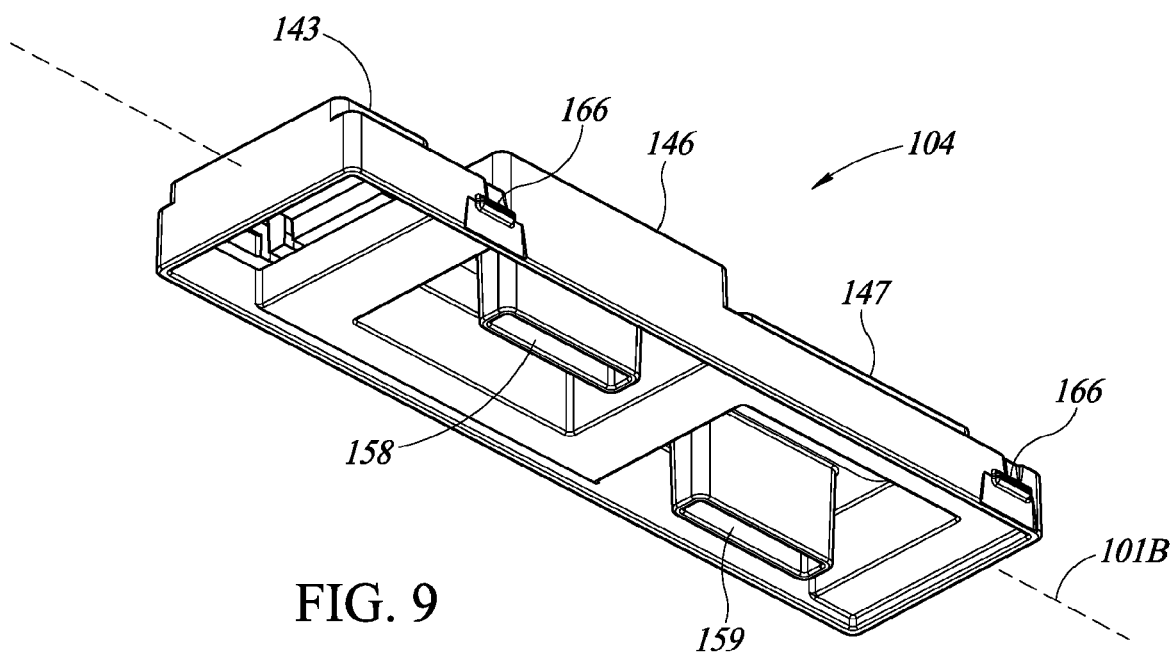
FIG. 9 is a bottom perspective view of a specimen slide of the handheld assay device.

The cartridge housing top face 108 includes a spaced apart pair of arrows 139 towards the leading minor end surface 114 pointing in the direction of the leading minor end surface 114 for assisting a user to correctly place an unused assay device 100 in the assay apparatus 200. FIG. 8 shows the cartridge housing top face 108 includes a leading guidance member 141 and a trailing guidance member 142 downward depending into the cartridge housing interior 103 for guiding sliding withdrawal of the handheld specimen collection tool 50 from the assay device 100 for smearing bodily specimen on the specimen slide 104. The leading guidance member 141 and the trailing guidance member 142 correspondingly have central apertures 141A and 142A along the horizontal longitudinal assay device centerline 101B for passage therethrough of the handheld specimen collection tool 50.

The specimen slide 104 has three spatially discrete work surfaces along the horizontal longitudinal assay device centerline 101B as follows: a leading work surface 143 with a pH detection surface 144 for indicating a bodily specimen's pH value, a central work surface 146 and a trailing work surface 147. The pH detection surface 144 can be litmus paper or other pH sensitive material. The central work surface 146 has a longitudinal directed generally rectangular shaped specimen slide panel 148 along the longitudinal assay device centerline 101 and an autofocus target 149 toward its leading end. The trailing work surface 147 has a longitudinal directed generally rectangular shaped specimen slide panel 151 along the longitudinal assay device centerline 101 and an autofocus target 152 towards its leading end. The leading work surface 143 is in registration with the leading cartridge housing top face panel 136, the specimen slide panel 148 and autofocus target 149 are in registration with the intermediate cartridge housing top face panel 137, and the specimen slide panel 151 and the autofocus target 152 are in registration with the trailing cartridge housing top face panel 138. The specimen slide panel 148 and the specimen slide panel 151 are transparent to the same EMR wavelengths as the intermediate cartridge housing top face panel 137 and the trailing cartridge housing top face panel 138. Alternatively, the specimen slide 104 can be transparent to the same EMR wavelengths.

The opposite pair of longitudinal barrels 131 and 132 are correspondingly associated with the specimen slide's central work surface 146 and trailing work surface 147. The barrels 131 and 132 have a similar construction and their corresponding components are denoted A and B. The barrels 131 and 132 include leading seals 152A and 152B towards the leading minor end face 114. The leading seals 152A and 152B are exposed through the leading throughgoing apertures 133 and 134. The barrels 131 and 132 include trailing seals 153A and 153B towards the trailing minor end face 116. The barrels 131 and 132 contain liquid reagents 154A and 154B. The seals 152 and 153 are preferably highly visually distinguishable within the cartridge housing 102 for determining whether an assay device has been used as described hereinbelow with reference to the assay apparatus 200. The barrels 131 and 132 have liquid reagent dispensing ports 156A and 156B correspondingly midway along the central work surface 146 and the trailing work surface 147 for dispensing liquid reagents 154A and 154B thereon.

Figure 10A:
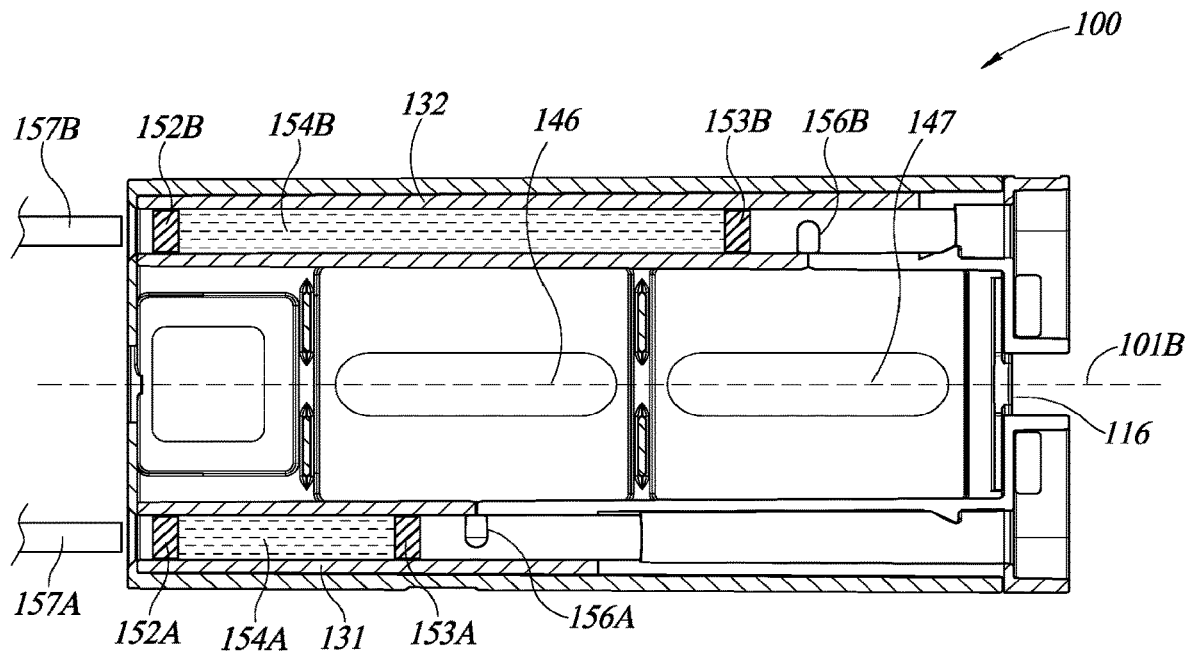
FIG. 10A is a top plan view of the assay device in its pre-liquid reagent dispensing position.

FIG. 10A shows the assay device 100 in an initial pre-liquid reagent dispensing position in which its leading seals 152A and 152B and its trailing seals 153A and 153B are both disposed between the leading minor end surface 114 and their respective liquid reagent dispensing ports 156A and 156B. FIG. 10A also shows plungers 157A and 157B of the assay assembly 200 are yet to be inserted into the barrels 131 and 132.

Sliding insertion of the plunger 157A into the barrel 131 urges the leading seal 152A, the liquid reagent 154A, and the trailing seal 153A along the barrel 131 until the trailing seal 153A passes the liquid reagent dispensing port 156A whereupon further insertion of the plunger 157A causes dispensing of the liquid reagent 154A through the liquid reagent dispensing port 156A onto the central work surface 146. At least at the start of dispensing the liquid reagent 154A, the leading seal 152A is disposed between the leading minor end surface 114 and the liquid reagent dispensing port 156A. Sliding insertion of the plunger 157B into the barrel 132 urges the leading seal 152B, the liquid reagent 154B, and the trailing seal 153B along the barrel 132 until the trailing seal 153B passes the liquid reagent dispensing port 156B whereupon further insertion of the plunger 157B causes dispensing of the liquid reagent 154B through the liquid reagent dispensing port 156B onto the trailing work surface 147. Similarly at least at the start of dispensing the liquid reagent 154B, the leading seal 152B is disposed between the leading minor end surface 114 and the liquid reagent dispensing port 156B.

Figure 10B:
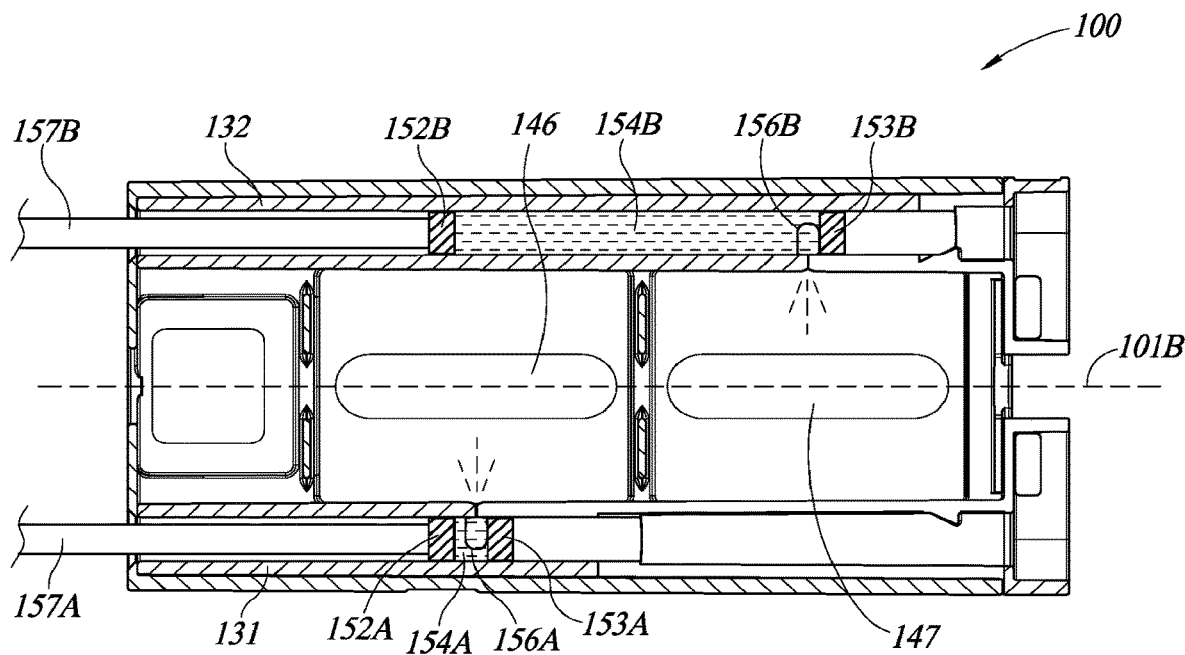
FIG. 10B is a top plan view of the assay device showing dispensing of liquid reagent.

FIG. 10B shows the assay device 100 in towards the end of dispensing the liquid reagents 154A and 154B as evidenced by the barrel 131 being nearly empty. Depending on the length of plungers 157A and 157B inserted into the barrels 131 and 132, the leading seals 152A and 152B can also be urged past the liquid reagent dispensing ports 156A and 156B.

The specimen slide 104 includes a central longitudinal directed elongated elevation support 158 and a trailing longitudinal directed elongated elevation support 159 correspondingly downwardly depending from the central work surface 146 and the trailing work surface 147 and correspondingly in registration with the leading throughgoing aperture 126 and the trailing throughgoing aperture 127. The central elevation support 158 and the trailing elevation support 159 are lateral to the horizontal longitudinal assay device centerline 101B for enabling undisturbed EMR transmission through the assay device 100 and scanning along the specimen slide panel 148 and the specimen slide panel 151.

Figure 11A:
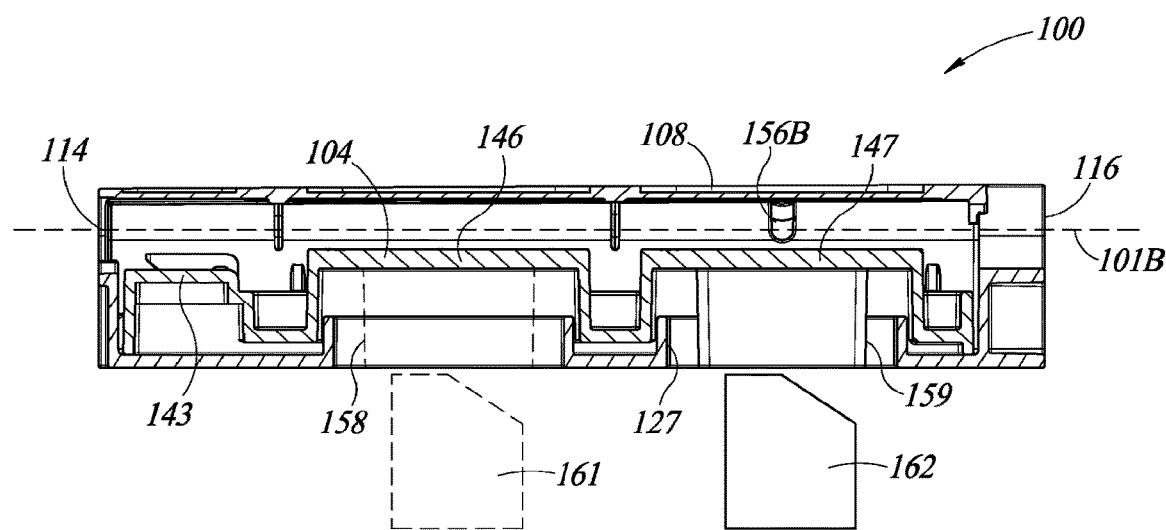
FIG. 11A is a longitudinal cross section of the assay device with its specimen slide in its initial lowermost specimen introduction position along line A-A in FIG. 12.
Figure 11B:
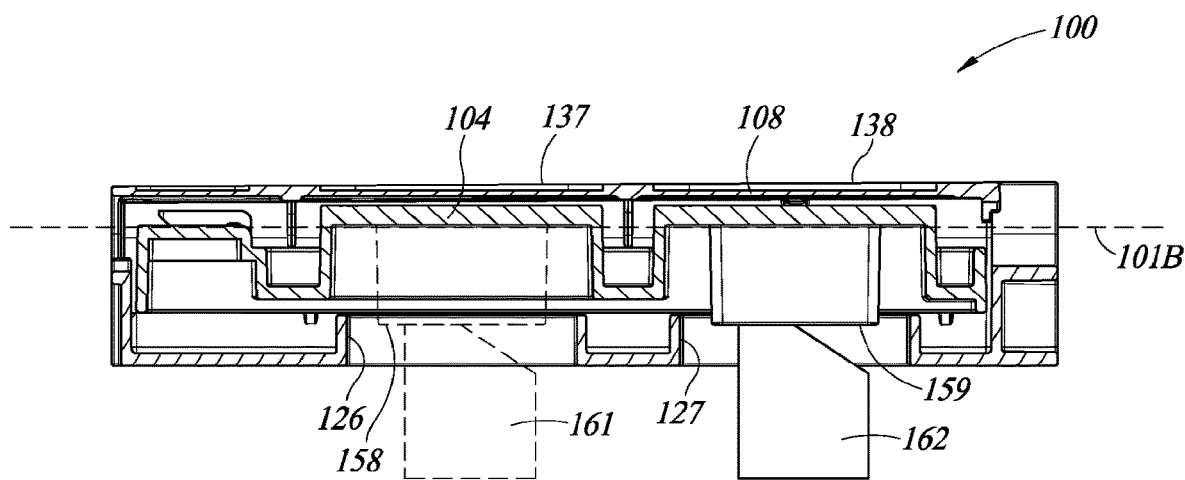
FIG. 11B is a longitudinal cross section of the assay device with its specimen slide in its final uppermost specimen examination position along line A-A in FIG. 12.
Figure 12:
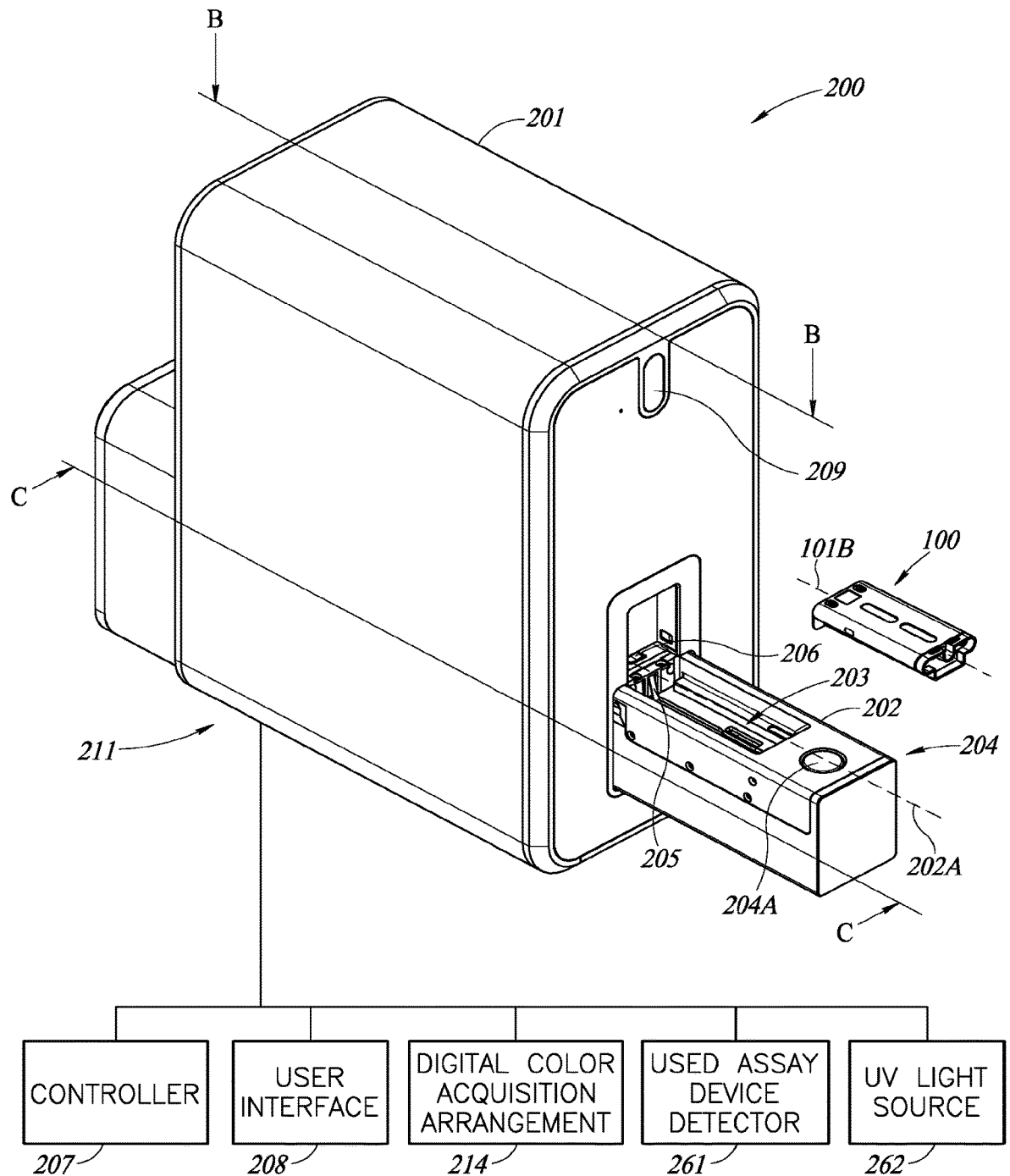
FIG. 12 is a combined perspective view and block diagram of the assay apparatus.

The central elevation support 158 and the trailing elevation support 159 are urged upwards by a leading elevation member 161 and a trailing elevation member 162 of the assay assembly 200 for elevating the specimen slide 104 from its lowermost specimen introduction position (see FIG. 11A) to its uppermost specimen examination position (see FIG. 11B). The specimen slide 104 is correspondingly remote from and adjacent the cartridge housing top face 108 in the initial lowermost specimen introduction position and the final uppermost specimen examination position. In the final uppermost specimen examination position, bodily specimen reacted with the liquid reagent 154A on the central work surface 146 is compressed against the intermediate cartridge housing top face panel 137's underside and bodily specimen reacted with the liquid reagent 154B on the trailing work surface 147 is compressed against the trailing cartridge housing top face panel 138's underside.

Figure 5:
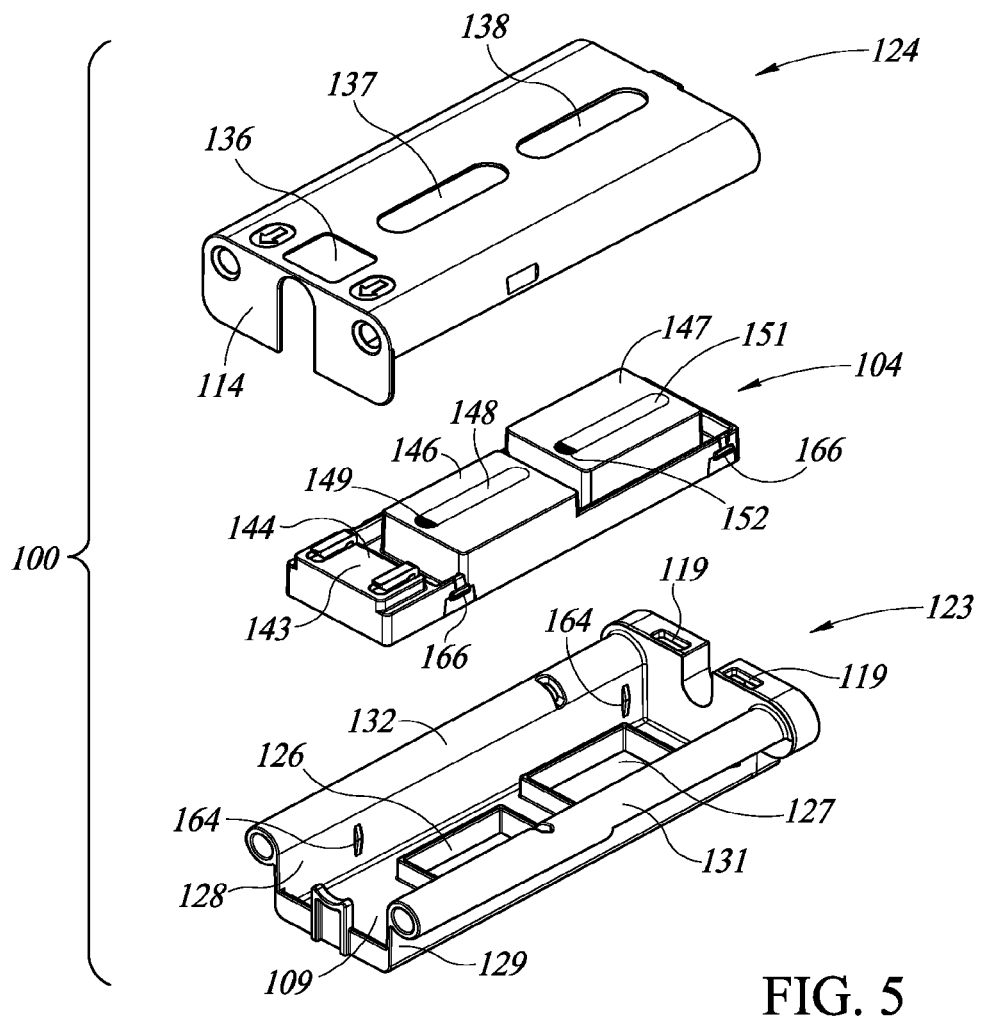
FIG. 5 is an exploded view of the handheld assay device.
Figure 6:
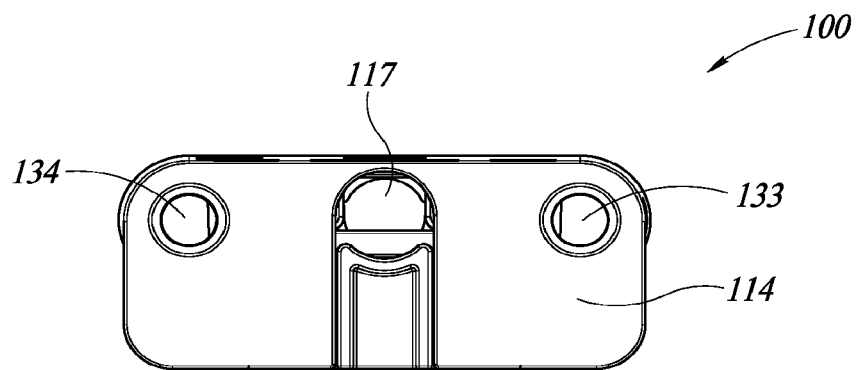
FIG. 6 is a left side elevation view of the assay device.
Figure 7:
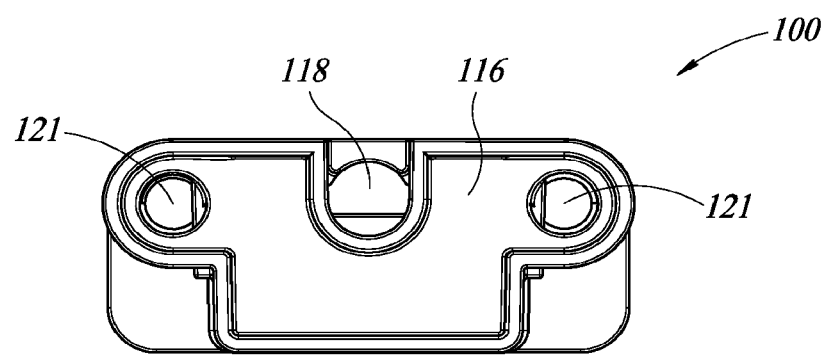
FIG. 7 is a right side elevation view of the assay device.

The specimen slide securing arrangement 105 for securing the specimen slide 104 in its final uppermost specimen examination position preferably enables an irreversible elevation from the initial lowermost specimen introduction position to the final uppermost specimen examination position to prevent re-use of the assay device 100. Implementation of the specimen slide securing arrangement 105 is best seen in FIG. 5: The base 123's first major side wall 128 has a spaced apart pair of inward directed protrusions 163 (obstructed from view) and its second major side wall 129 has a spaced apart pair of inward directed protrusions 164 opposite the spaced apart pair of inward directed protrusions 163. The specimen slide 104 has a spaced apart pair of outwardly biased clips 166 in registration with the spaced apart pair of inward directed protrusions 163. The specimen slide 104 has a spaced apart pair of outwardly biased clips 167 (obstructed from view) in registration with the spaced apart pair of inward directed protrusions 164. On elevation of the specimen slide 104 from its initial lowermost specimen introduction position to its final uppermost specimen examination position, the spaced apart pair of outwardly biased clips 166 irreversibly pass the spaced apart pair of inward directed protrusions 163 and the spaced apart pair of outwardly biased clips 167 irreversibly pass the spaced apart pair of inward directed protrusions 164.

Assay Apparatus

Figure 13A:
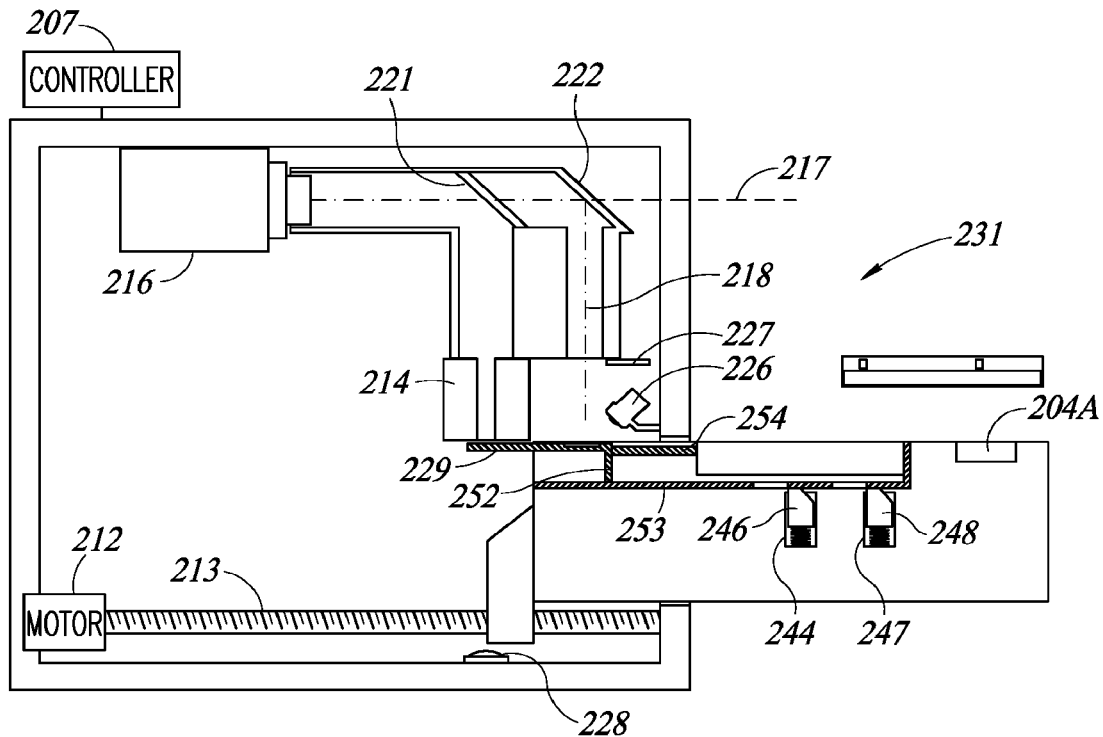
FIG. 13A is a schematic longitudinal cross section of the assay apparatus with its tray in outermost position.
Figure 13B:
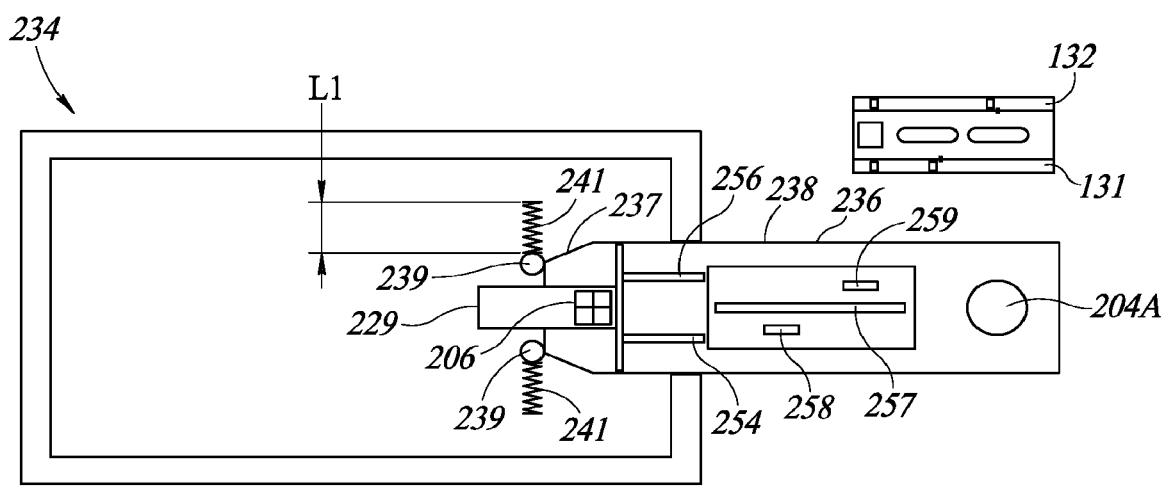
FIG. 13B is a schematic transverse cross section of the assay apparatus with its tray in its outermost position.
Figure 14A:
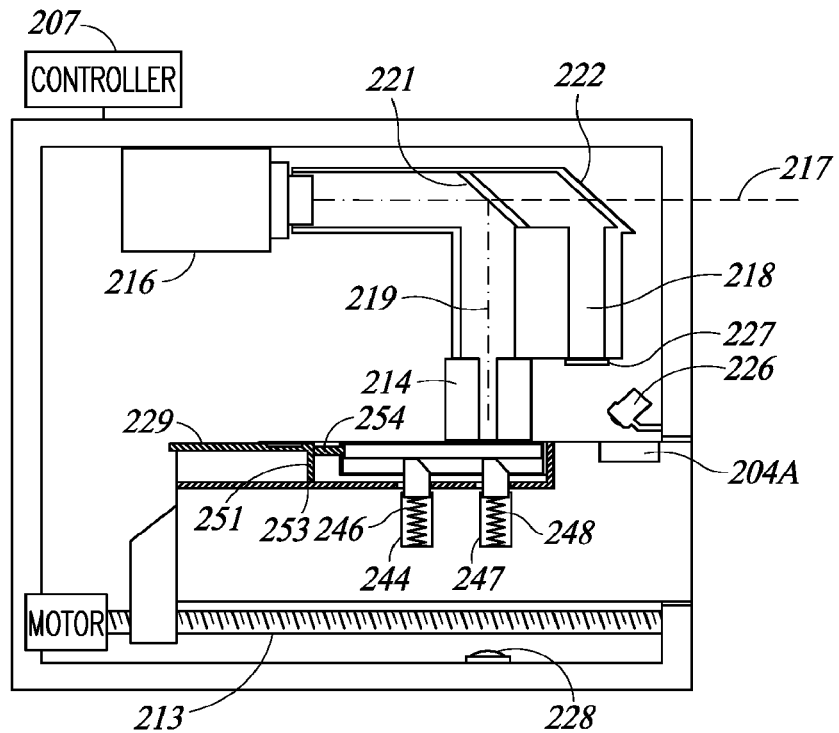
FIG. 14A is a schematic longitudinal cross section of the assay apparatus with its tray in its innermost position
Figure 14B:
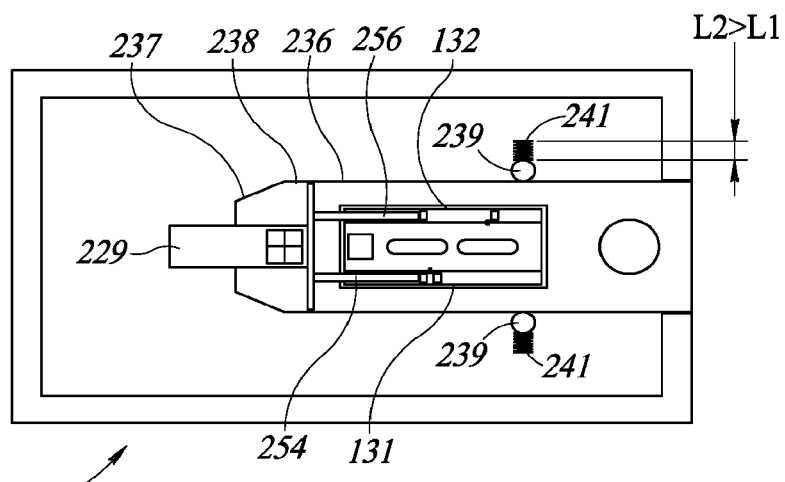
FIG. 14B is a schematic transverse cross section of the assay apparatus with its tray in its innermost position.
Figure 15:
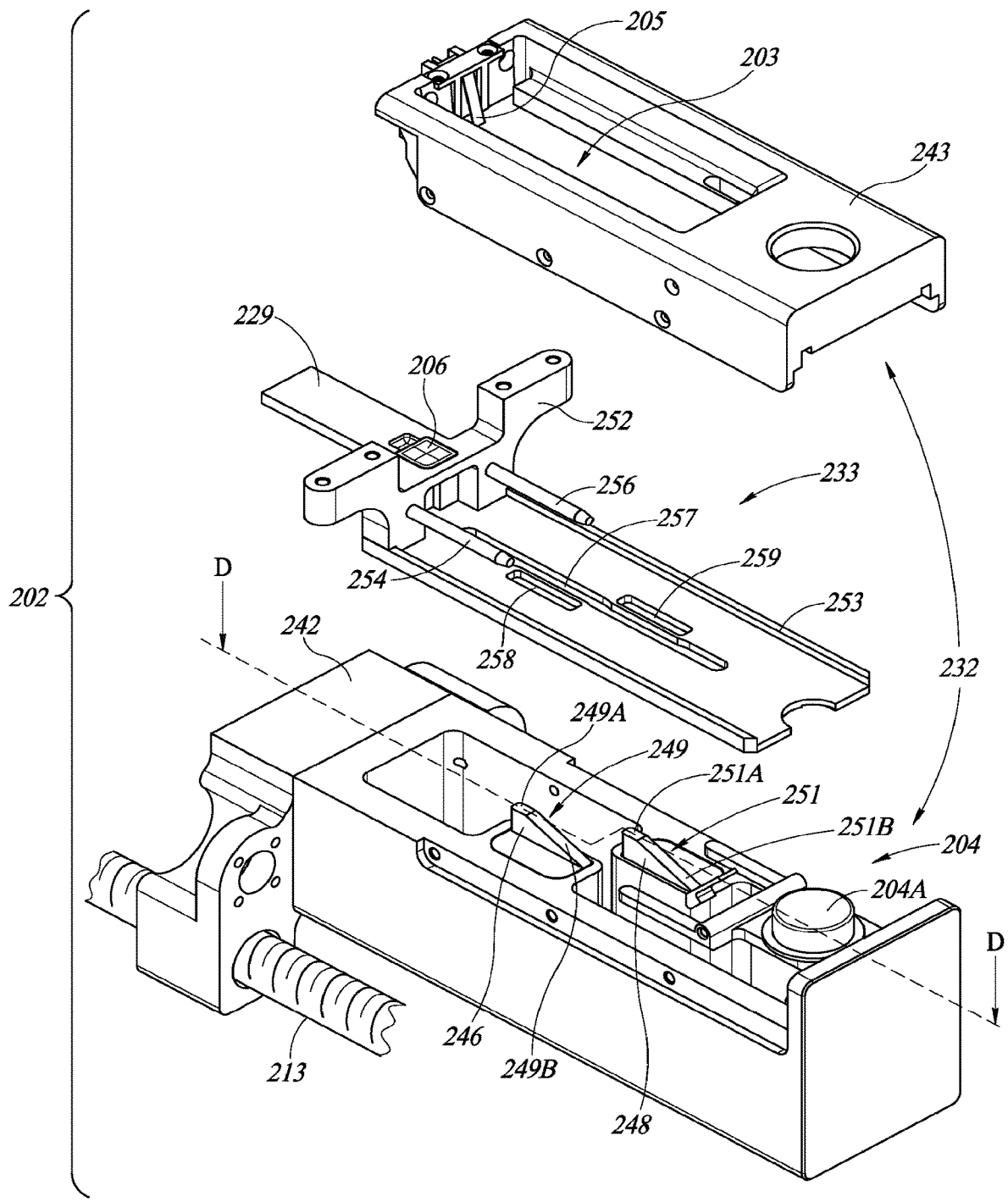
FIG. 15 is an exploded view of the assay assembly's tray.
Figure 16A:
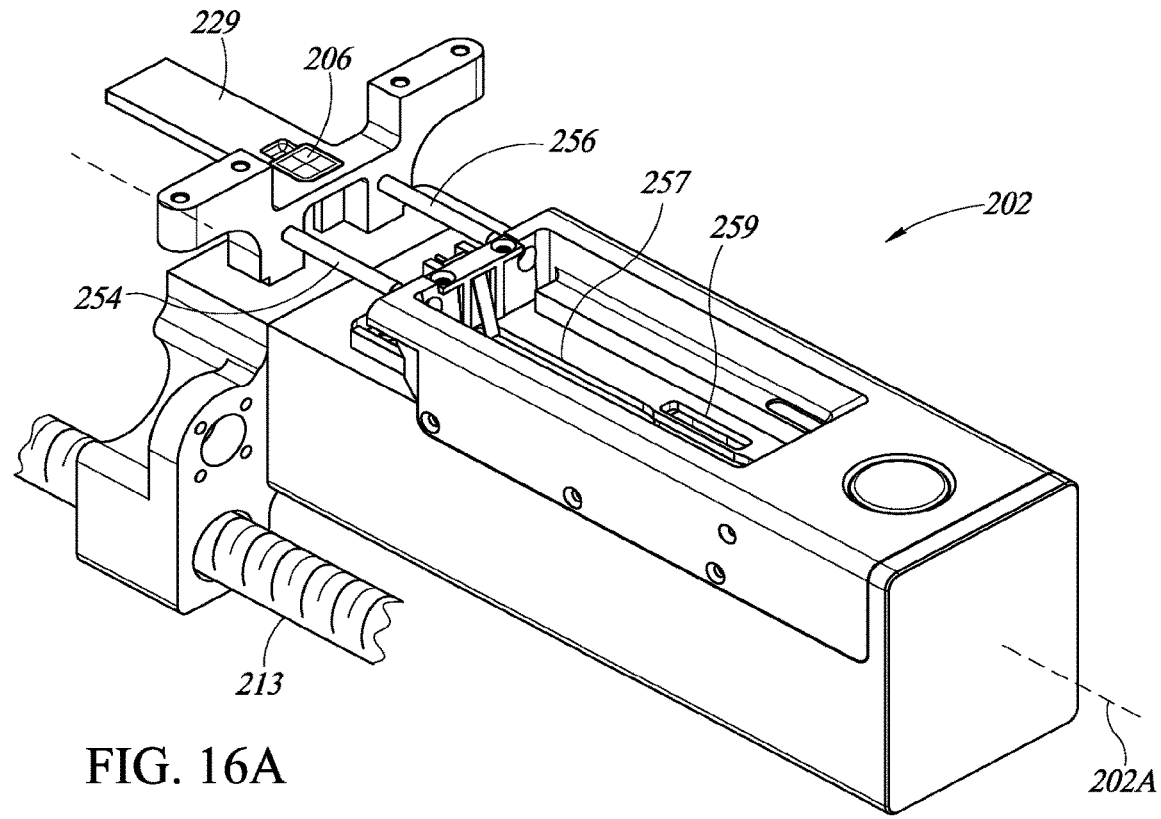
FIG. 16A is a front perspective view of the assay assembly's tray with its internal tray member in its insertion/ejection position relative to its external tray member.
Figure 16B:
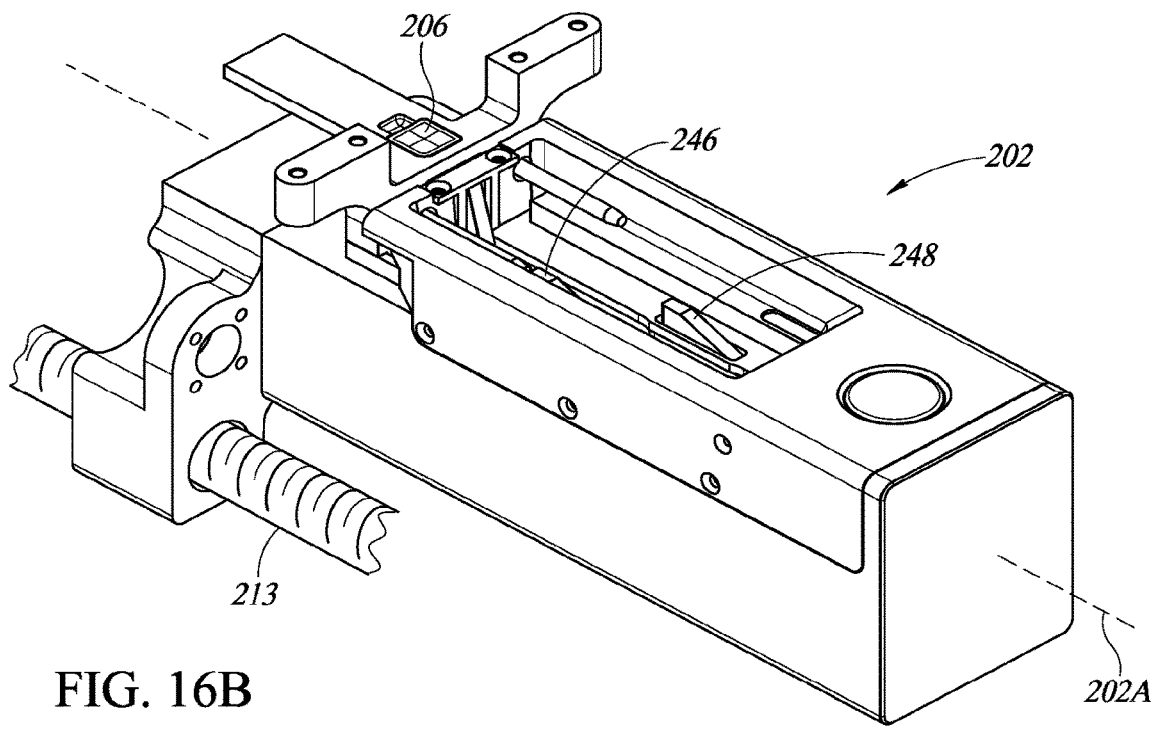
FIG. 16B is a front perspective view of the assay assembly's tray with its internal tray member in its actuated position relative to its external tray member.

The assay apparatus 200 is now described with reference to FIG. 12 to FIG. 16. FIG. 13A and FIG. 13A are schematic longitudinal cross sections of the assay apparatus 200 which have been modified to show components which would otherwise not be shown in a longitudinal cross section along the longitudinal cross section line B-B. FIG. 13A and FIG. 14A include components along a stepped longitudinal cross section line D-D shown in FIG. 15. FIG. 13B and FIG. 14B are schematic transverse cross sections of the assay apparatus 200 which have been modified to show components which would otherwise not be shown in a transverse cross section along the transverse cross section line C-C.

As described hereinabove with reference to FIG. 1, the assay apparatus 200 includes apparatus housing 201 having a tray 202 having a longitudinal tray centerline 202A and being reciprocal between an outermost position (see FIG. 13A and FIG. 13B) and an innermost position (see FIG. 14A and FIG. 14B). The tray 202 includes a tray pocket 203 for interchangeably receiving an assay device 100 such that its horizontal longitudinal assay device centerline 101B coincides with the longitudinal tray centerline 202A. The tray 202 includes a manually operated eject button 204 for ejecting an assay device 100 after it has been processed for diagnostic information. The tray 202 has a color target 206 for calibration purposes for accurately determining a bodily specimen's pH color reading. The assay apparatus 200 stops the tray 202 at its outermost position if an assay device 100 has been incorrectly inserted and issues an audible or visual alert for alerting a user.

The assay apparatus 200 includes a controller 207 for controlling operation of same, a user interface 208 for entering information regarding a clinical procedure, and a START button 209. The assay apparatus 200 includes a motorized arrangement 211 having a motor 212 for driving a screw threaded drive shaft 213 for reciprocating the tray 202 between its outermost position and its innermost position. Clockwise rotation of the drive shaft 213 urges the tray 202 from its outermost position to its innermost position and conversely counterclockwise rotation of the drive shaft 213 urges the tray 202 from its innermost position to its outermost position.

The assay apparatus 200 includes a digital color acquisition arrangement 214 for obtaining diagnostic information regarding a bodily specimen along a series of lines of examination. The digital color acquisition arrangement 214 includes a single color camera 216 with an optical axis 217 and dual optical paths as follows: A first optical path 218 (see FIG. 13A) for acquiring a color target image of the tray 202's color target 206 and a color pH reading image of an assay device's pH detection surface 144. And a second optical path 219 (see FIG. 14A) for obtaining microscope images of bodily specimen from an assay device's central work surface 146 and trailing work surface 147 after being correspondingly reacted with liquid reagent 154A and liquid reagent 154B. The first optical path 218 and the second optical path 219 image the assay device 100 along a multitude of lines of examination as explained hereinbelow. The color camera 216 is, for example, any commercially available 4 to 25 Megapixel CMOS image sensor. The assay apparatus 200 preferably acquires the color target image, the color pH reading image and the microscope images for an assay device 100 during a single continuous inward movement of the tray 202 from its outermost position to its innermost position.

The digital color acquisition arrangement 214 includes two mirrors along the optical axis 217 and inclined at 45° thereto as follows: a semi-reflective mirror 221 proximate to the color camera 216 and a fully reflective mirror 222 distal to the color camera 216. Accordingly, the first optical path 218 includes the semi-reflective mirror 221 and the fully reflective mirror 222. The digital color acquisition arrangement 214 includes an ×10 to ×1000 magnification lens system 224 for acquiring microscope images. Accordingly, the second optical path 219 includes the semi-reflective mirror 221 and the ×10 to ×1000 magnification lens system 224. The digital color acquisition arrangement 214 also preferably includes auto-focusing capability along the second optical path 219.

For use during image acquisitions along the first optical path 218, the digital color acquisition arrangement 214 includes a first illumination source 226 disposed above the tray 202 for illuminating an assay device 100 from above and a first optical path shutter 227 for selectively opening and closing the first optical path 218. For use during image acquisitions along the second optical path 219, the digital color acquisition arrangement 214 includes a second illumination source 228 disposed beneath the tray 202 for backlighting an assay device 100 through the tray 202 and a second optical path shutter 229 inwardly extending from the tray 202 for selectively opening and closing the second optical path 219. The first optical path shutter 227 and the second optical path shutter 229 work in unison to constitute a shutter arrangement 231 for selectively opening and closing the first optical path 218 and correspondingly closing and opening the second optical path 219. Accordingly, the digital color acquisition arrangement 214 acquires a color target image and a pH reading image by switching on the illumination source 226 only and opening the first optical path 218 and closing the second optical path 219. And the digital color acquisition arrangement 214 acquires microscope images by switching on the illumination source 228 only and closing the first optical path 218 and opening the second optical path 219.

The tray 202 includes an external tray member 232 with the tray pocket 203 and the eject button 204A, an internal tray member 233 longitudinally slidingly reciprocal between an assay device insertion/ejection position of an assay device 100 in the tray pocket 203 (see FIG. 16A) and an actuated assay device position of an assay device 100 in the tray pocket 203 (see FIG. 16B), and a restraining mechanism 234 for selectively restraining movement of the internal tray member 233 relative to the external tray member 232. On enabling the restraining mechanism 234, the internal tray member 233 is displaceable between its assay device insertion/ejection position and its assay device actuated position. On disabling the restraining mechanism 234, the internal tray member 233 is coupled to the external tray member 232 such that the internal tray member 233 can move in tandem with the external tray member 232 as driven by the drive shaft 213.

The external tray member 232 has opposite longitudinal surfaces 236 each having a leading minor cam surface 237 inclined with respect to the longitudinal tray centerline 202A and a trailing major surface 238 parallel thereto. The restraining mechanism 234 is constituted by an opposite pair of restraining members 239 acting against opposite longitudinal surfaces 236. The restraining members 239 are preferably spring biased by a pair of compression springs 241 having a non-compressed length L1 in the enabled state of the restraining mechanism 234 for restraining movement of the internal tray member 233 relative to the external tray member 233 and a fully compressed length L2<L1 in the disabled state of the restraining mechanism 234 for enabling the internal tray member 233 to move in tandem with the external tray member 232.

The external tray member 232 includes a major external tray member component 242 and a minor external tray member component 243 mounted on the major external tray member component 242. The major external tray member component 242 is fixedly mounted on the drive shaft 213. The minor external tray member component 243 includes the tray pocket 203. The internal tray member 233 is longitudinally slidingly reciprocal between the major external tray member component 242 and the minor external tray member component 243.

The major external tray member component 242 has a vacant interior for enabling backlighting an assay device 100. The major external tray member component 242 includes a longitudinal leading compartment 244 housing a leading specimen slide elevation member 246 and a longitudinal trailing compartment 247 housing a trailing specimen slide elevation member 248. The leading specimen slide elevation member 246 and the trailing specimen slide elevation member 248 are previously described as the leading specimen slide elevation member 161 and the specimen slide trailing elevation member 162 shown FIG. 11A and FIG. 11B. The leading specimen slide elevation member 246 and the trailing specimen slide elevation member 248 are preferably spring biased but alternatively can be displaced by electro-mechanical means, for example, small electric motors, solenoids, and, the like. The leading specimen slide elevation member 246 has a top leading specimen slide elevation member surface 249 with a horizontal leading surface 249A and an inclined trailing surface 249B. The trailing specimen slide elevation member 248 has a top trailing specimen slide elevation member surface 251 with a horizontal leading surface 251A and an inclined trailing surface 251B.

The compartments 244 and 247 are on opposite sides of the longitudinal tray centerline 202A thereby leaving the longitudinal tray centerline 202A unobstructed for scanning therealong. The leading specimen slide elevation member 246 is deployed for urging an assay device's central elevation support 158. The trailing specimen slide elevation member 248 is deployed for urging an assay device's trailing elevation support 159. The leading specimen slide elevation member 246 and the trailing specimen slide elevation member 248 together urge an assay device's specimen slide 104 from its initial lowermost specimen introduction position to its final uppermost specimen examination position. The leading specimen slide elevation member 246 and the trailing specimen slide elevation member 248 also couple the internal tray member 233 to the external tray member 232 such that the internal tray member 233 moves in tandem with the external tray member 232 as driven by the drive shaft 213.

The internal tray member 233 has a generally L-shaped construction including a leading headpiece 252 and a trailing elongated plate 253. The leading headpiece 252 includes the color target 206 and the second optical path shutter 229 extending inwards towards the second optical path 219. The headpiece 252 includes a plunger 254 and a plunger 256 in the direction of the trailing elongated plate 253 for correspondingly sliding insertion into an assay device's barrel 131 and barrel 132 for dispensing liquid reagent therefrom for reacting with bodily specimen in an internal tray member 233's assay device actuated position. The plunger 254 and the plunger 256 are previously described as the plungers 157A and 157B shown FIG. 10A and FIG. 10B.

The trailing elongated plate 253 includes a longitudinal elongated major slot 257 along the longitudinal tray centerline 202A for enabling backlight illumination therethrough for scanning purposes along the second optical path 219. The trailing elongated plate 253 includes a longitudinal leading slot 258 associated with the leading specimen slide elevation member 246 and a longitudinal trailing slot 259 associated with the trailing specimen slide elevation member 248. In the internal tray member's assay device insertion/ejection position, the leading specimen slide elevation member 246 and the trailing specimen slide elevation member 248 are in a blocked position under the plate 253. In the internal tray member's assay device actuated position, the leading specimen slide elevation member 246 and the trailing specimen slide elevation member 248 correspondingly exit through the leading slot 258 and the trailing slot 259.

On sliding displacement of the internal tray member 233 relative to the external tray member 232 from its assay device insertion/ejection position to its assay device actuated position, the inclined trailing surface 249B acts against the plate 253 to enable the leading specimen slide elevation member 246 to gradually exit through the leading slot 258. More importantly, on sliding displacement of the internal tray member 233 relative to the external tray member 232 from its actuated assay device position to its assay device insertion/ejection position, the inclined trailing surface 249B acts against the plate 253 for gradually depressing the leading specimen slide elevation member 246 for enabling its gradual travel under the plate 253 to its blocked position in the internal tray member 233's assay device insertion/ejection position.

Similarly on sliding displacement of the internal tray member 233 relative to the external tray member 232 from its assay device insertion/ejection position to its assay device actuated position, the inclined trailing surface 251B acts against the plate 253 to enable the trailing specimen slide elevation member 248 to gradually exit through the trailing slot 259. More importantly, on sliding displacement of the internal tray member 233 relative to the external tray member 232 from its actuated assay device position to its assay device insertion/ejection position, the inclined trailing surface 251B acts against the plate 253 for gradually depressing the trailing specimen slide elevation member 248 for enabling its gradual travel under the plate 253 to its blocked position in the internal tray member 233's assay device insertion/ejection position.

The assay apparatus 200 preferably includes a used assay device detector 261 for determining whether an assay device newly inserted in the tray pocket 203 is an unused assay device before operation of the assay apparatus 200 for acquiring diagnostic information. Such detection preferably involves determining whether a newly inserted assay device's built-in liquid reagent dispensing arrangement has been previously actuated. Such detection preferably compares one or more parameters of a newly inserted assay device to benchmark parameters for an unused assay device. One such benchmark parameter is the electric motor power consumption for initially displacing an assay device's leading seal since such displacement requires overcoming frictional forces for urging a seal along a barrel. An unused assay device requires a greater electric motor power consumption than a used assay device. Another approach is to optically detect the position of a newly inserted assay device's leading seals and/or trailing seals. A used assay device's leading seals and/or trailing seals are further along barrels than an unused assay device's leading seals and/or trailing seals.

The assay apparatus 200 preferably includes a UV light source 262 for killing bacteria within the apparatus housing 201.

Use of Assay System

The use of the assay system 10 is now described with reference to FIG. 17 to FIG. 29 for acquiring diagnostic information from an assay device 100. FIG. 17 to FIG. 29 show a complete cycle of operation of the assay apparatus 200 from insertion of a fresh assay device 100 to its ejection after diagnostic information has been acquired therefrom. After ejection of a spent assay device 100, the assay apparatus 200 is completely reset for insertion of a fresh assay device 100.

FIG. 17A to FIG. 29A are schematic longitudinal cross sections similar to FIG. 13A and FIG. 14A and similarly modified to show components which would otherwise not be shown in a longitudinal cross section along the longitudinal cross section line B-B. FIG. 17B to FIG. 29B are schematic transverse cross sections similar to FIG. 13B and FIG. 14B and similarly modified to show components which would otherwise not be shown in a transverse cross section along the transverse cross section line C-C.

Figure 17A:
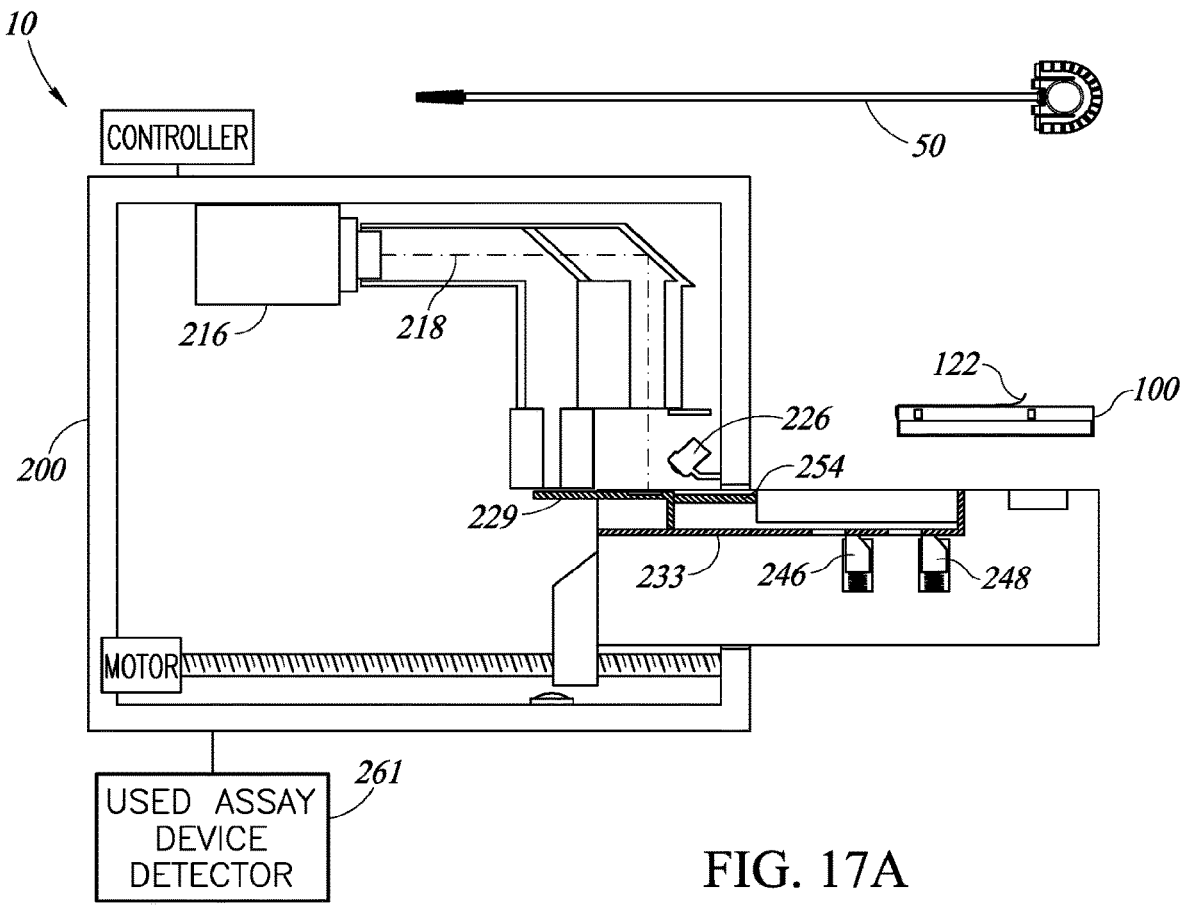
FIG. 17A is a schematic longitudinal cross section of the assay system with the assay apparatus' tray at its outermost position before insertion of an assay device therein.
Figure 17B:
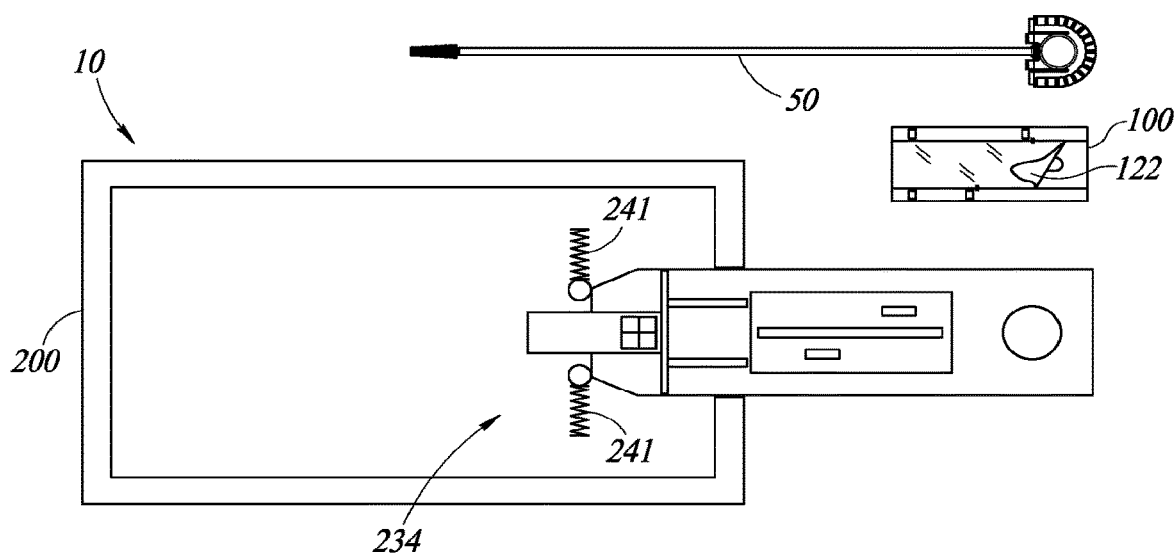
FIG. 17B is a schematic transverse cross section of the assay system with the assay apparatus' tray at its outermost position before insertion of an assay device therein.

FIG. 17A and FIG. 17B show the assay system 10 with the assay apparatus 200 having its tray 202 in its outermost position ready for insertion of a fresh assay device 100 in its tray pocket 203. The assay device 100 is suitably prepared by initially slidingly withdrawing its specimen collection tool 50 therethrough for smearing bodily specimen on its specimen slide 104 and subsequently removing its protective foil 122. The user enters information on the user interface 208 regarding a clinical procedure at hand, for example, patient details, and the like. Patient details include inter alia name, ID number, and age.

In the tray 202's outermost position, the assay apparatus 200 is set up as follows: The internal tray member 233 is in its assay device insertion/ejection position relative to the external tray member 232. The internal tray member 233 blocks the leading specimen slide elevation member 246 and the trailing specimen slide elevation member 248. The tray's color target 206 is disposed along the first optical path 218. The first optical path shutter 227 is open. The tray's second optical path shutter 229 closes the second optical path 219. The restraining mechanism 234 is enabled as evidenced by the compression springs at their fully non-compressed length L1 for restraining movement of the internal tray member 233 relative to the external tray member 232 such that the external tray member 232 can be displaced inward while the internal tray member 233 remains stationary.

Figure 18A:
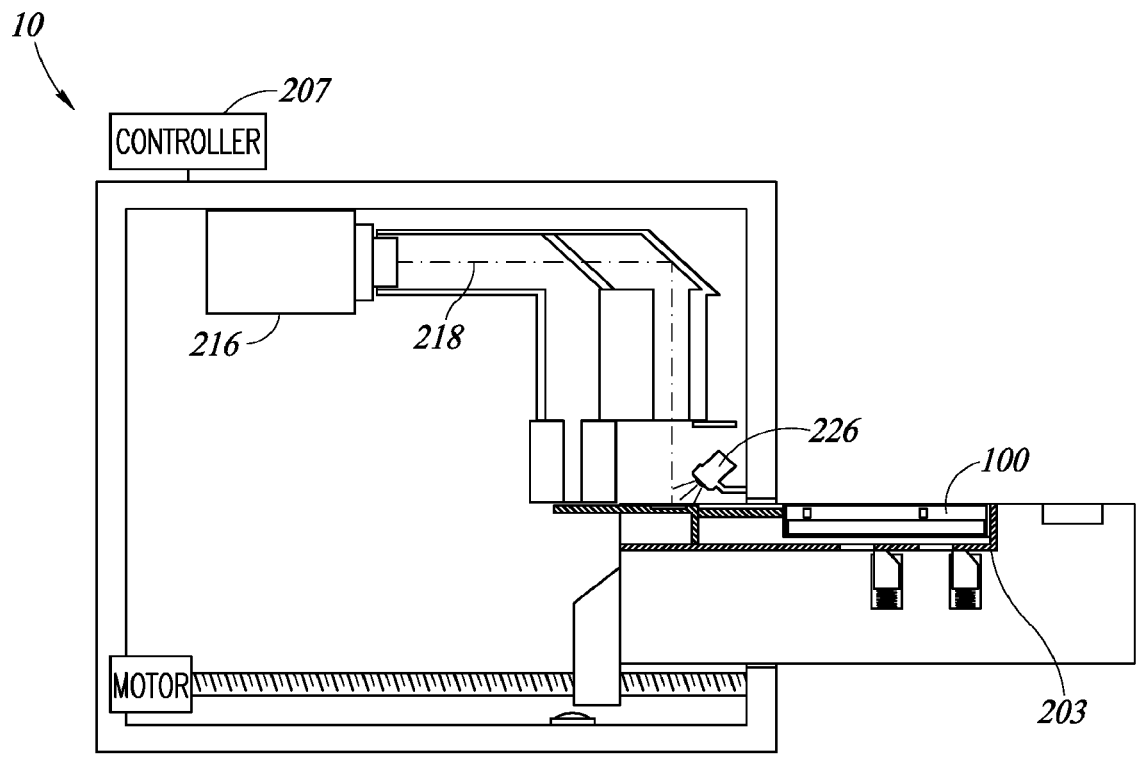
FIG. 18A is a schematic longitudinal cross section of the assay system with the assay apparatus' tray at its outermost position after insertion of the assay device therein.
Figure 18B:
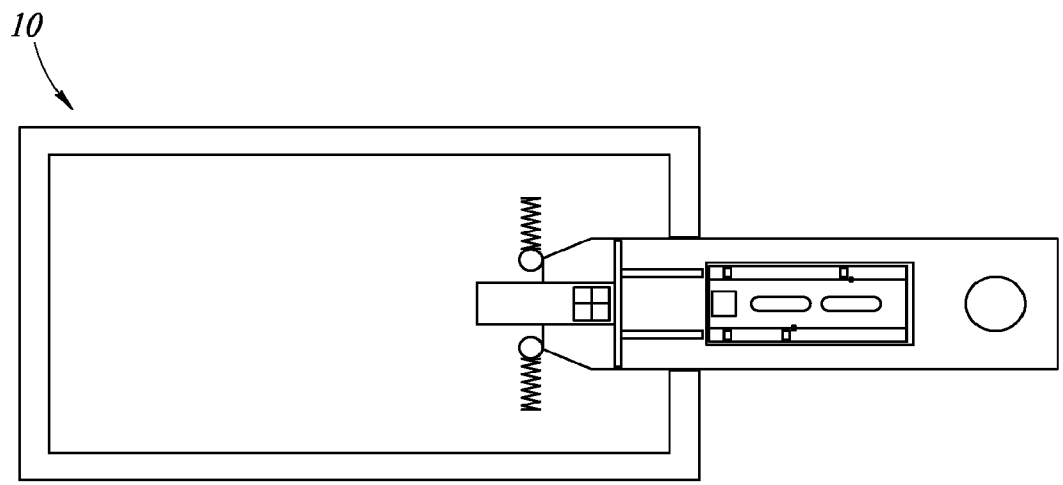
FIG. 18B is a schematic transverse cross section of the assay system with its assay apparatus' tray at its outermost position after insertion of the assay device therein.

FIG. 18A and FIG. 18B show the assay device 100 snugly inserted in the tray pocket 203 and if correctly inserted activates the micro-switch 205. The user presses the START button 209 and the assay apparatus 200 checks the assay device 100 has been correctly inserted in the tray pocket 203 and stops operation if the assay device 100 has been incorrectly inserted. If the assay device 100 has been incorrectly inserted, the assay apparatus 200 alerts the user. The used assay device detector 261 checks the assay device 100 is unused and issues an alert if the assay device 100 is a previously used assay device. The controller 207 switches on the illumination source 226 for illuminating the tray's color target 206 and the digital color camera 216 acquires a color target image along the first optical path 218. The illumination source 226 remains switched on until after the digital color camera 216 acquires a color pH reading image.

Figure 19A:
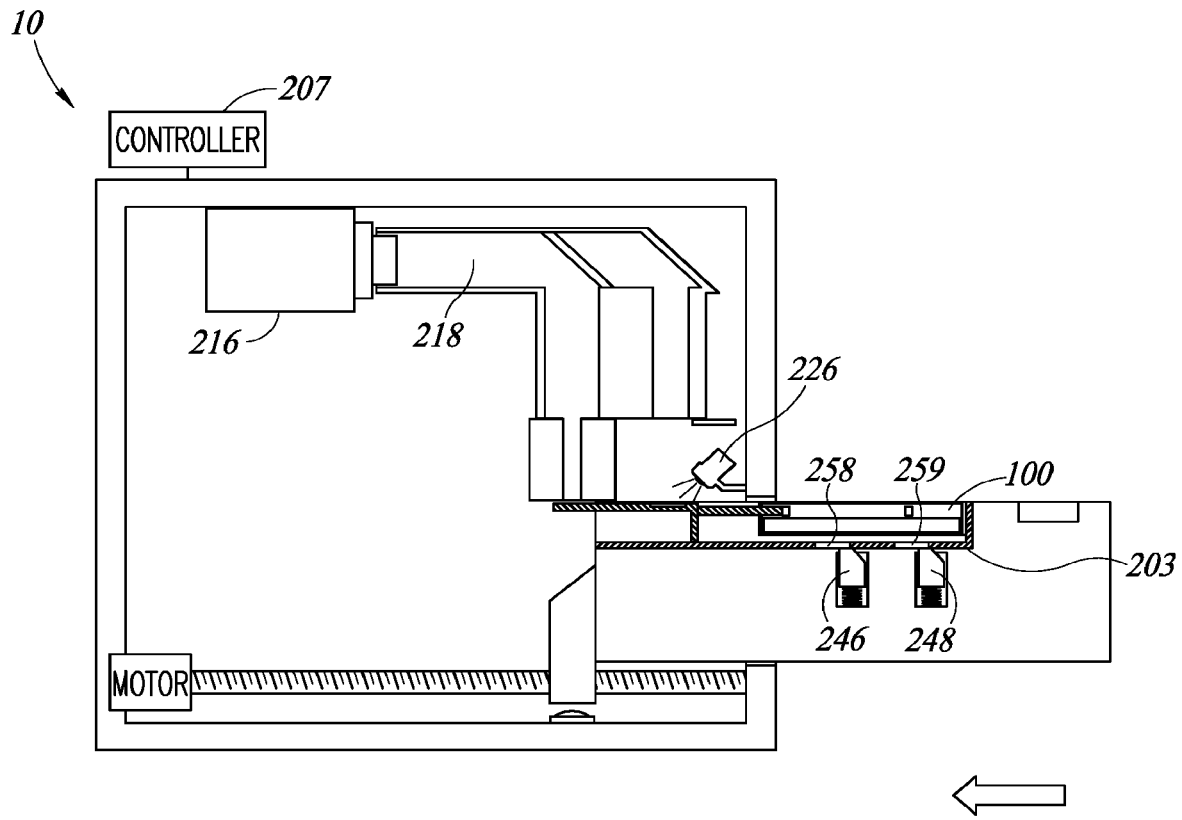
FIG. 19A is a schematic longitudinal cross section of the assay system showing initial inward movement of the assay apparatus' external tray member relative to its stationary internal tray member.
Figure 19B:
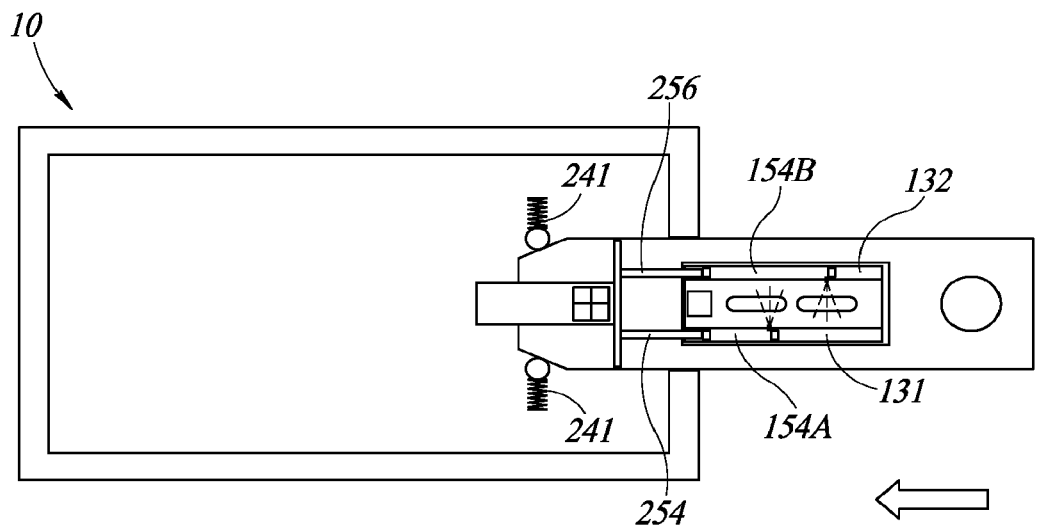
FIG. 19B is a schematic transverse cross section of the assay system showing initial inward movement of the assay apparatus' external tray member relative to its stationary internal tray member.

FIG. 19A and FIG. 19B show an initial inward movement of the external tray member 232 relative to the stationary internal tray member 233 which leads to the following simultaneous actions: The plungers 254 and 256 correspondingly enter the barrels 131 and 132 for dispensing liquid reagent 154A on the central work surface 146 and the liquid reagent 154B on the trailing work surface 147. The leading elevation member 246 approaches the slot 258. The trailing elevation member 248 approaches the slot 259. The compression springs 241 begin to be compressed.

Figure 20A:
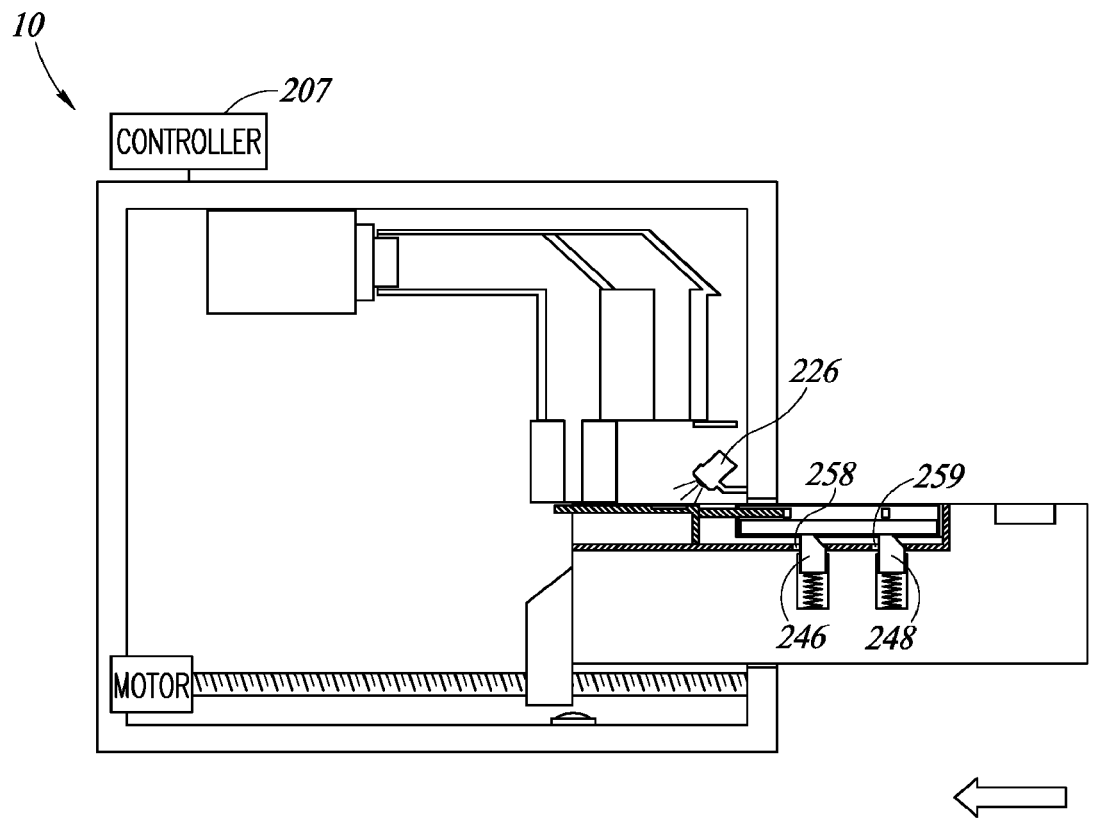
FIG. 20A is a schematic longitudinal cross section of the assay system showing continuing inward movement of the assay apparatus' external tray member relative to its stationary internal tray member.
Figure 20B:
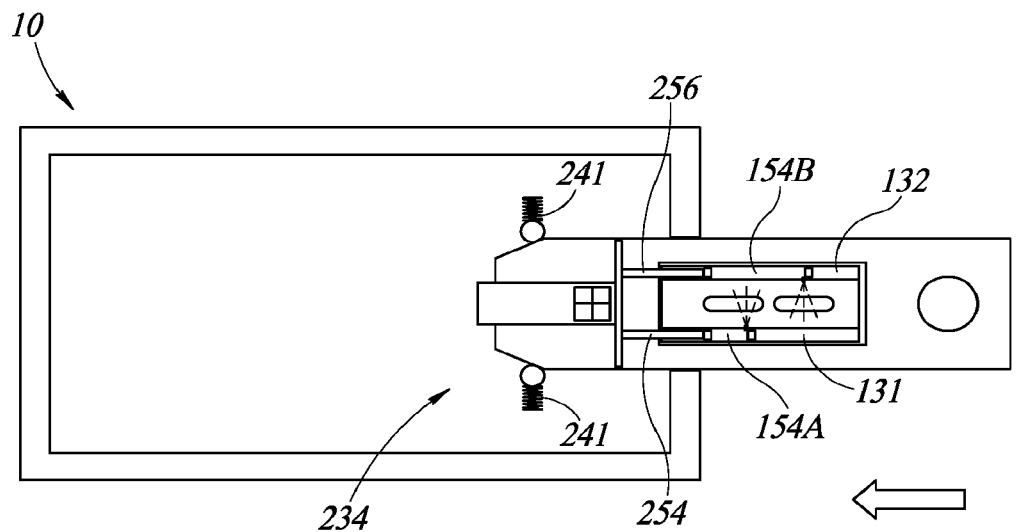
FIG. 20B is a schematic transverse cross section of the assay apparatus showing continuing inward movement of the assay apparatus' external tray member relative to its stationary internal tray member.

FIG. 20A and FIG. 20B show continuing inward movement of the external tray member 232 relative to the stationary internal tray member 233 which leads to the following simultaneous actions: The plungers 254 and 256 continue dispensing liquid reagent 154A and liquid reagent 154B. The leading specimen slide elevation member 246 starts upwardly exiting through the leading slot 258 into the tray pocket 203. The trailing specimen slide elevation member 248 starts upwardly exiting through the trailing slot 259 into the tray pocket 203. The compression springs 241 are further compressed towards disabling the restraining mechanism 234.

Figure 21A:
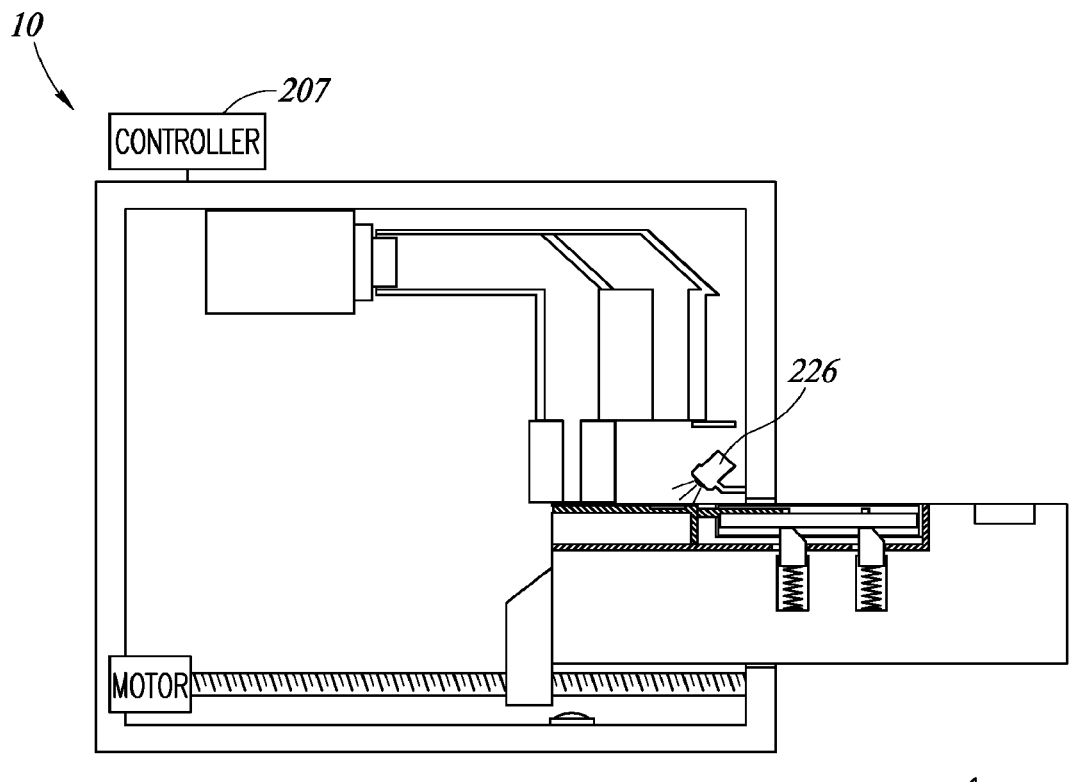
FIG. 21A is a schematic longitudinal cross section of the assay system showing continuing inward movement of the assay apparatus' external tray member relative to its stationary internal tray member.
Figure 21B:
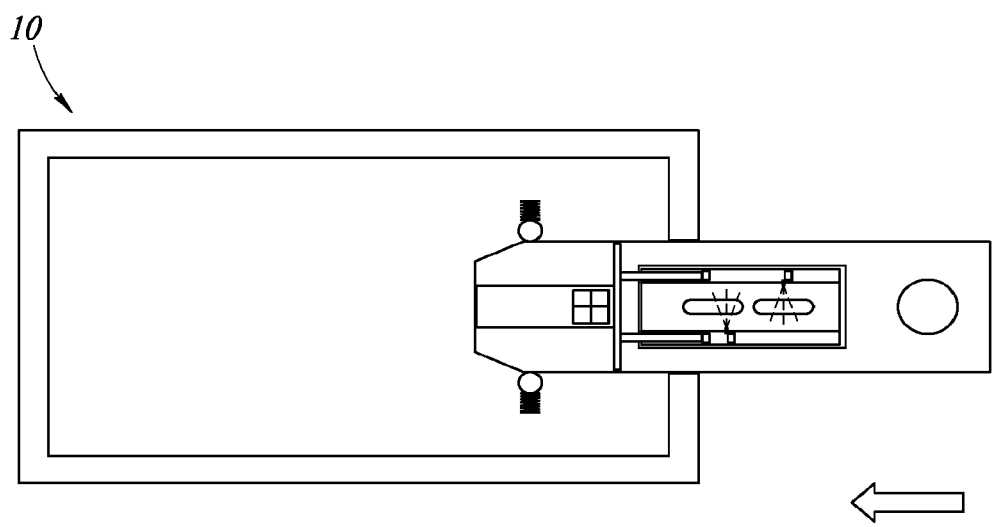
FIG. 21B is a schematic transverse cross section of the assay system showing continuing inward movement of the assay apparatus' external tray member relative to its stationary internal tray member.

FIG. 21A and FIG. 21B show continuing inward movement of the external tray member 232 relative to the stationary internal tray member 233 to the instant immediately before the restraining mechanism 234 is disabled as evidenced by compression of the compression springs 241 to their fully compressed length L2. Disablement of the restraining mechanism 234 enables coupling of the internal tray member 233 to the external tray member 232 for continuing inward movement of the complete tray 202, namely, both external tray member 232 and the internal tray member 233 in tandem. The internal tray member 233 is in its actuated assay device position relative to the external tray member 232 insofar as the leading specimen slide elevation member 246 further upwardly exits through the leading slot 258 and the trailing specimen slide elevation member 248 further upwardly exits through the trailing slot 259 into the tray pocket 203 to latch the internal tray member 233 to the external tray member 232 for enabling their combined continuing inward movement and upwardly urge the assay device's specimen slide 104 towards its final uppermost specimen examination position.

Figure 22A:
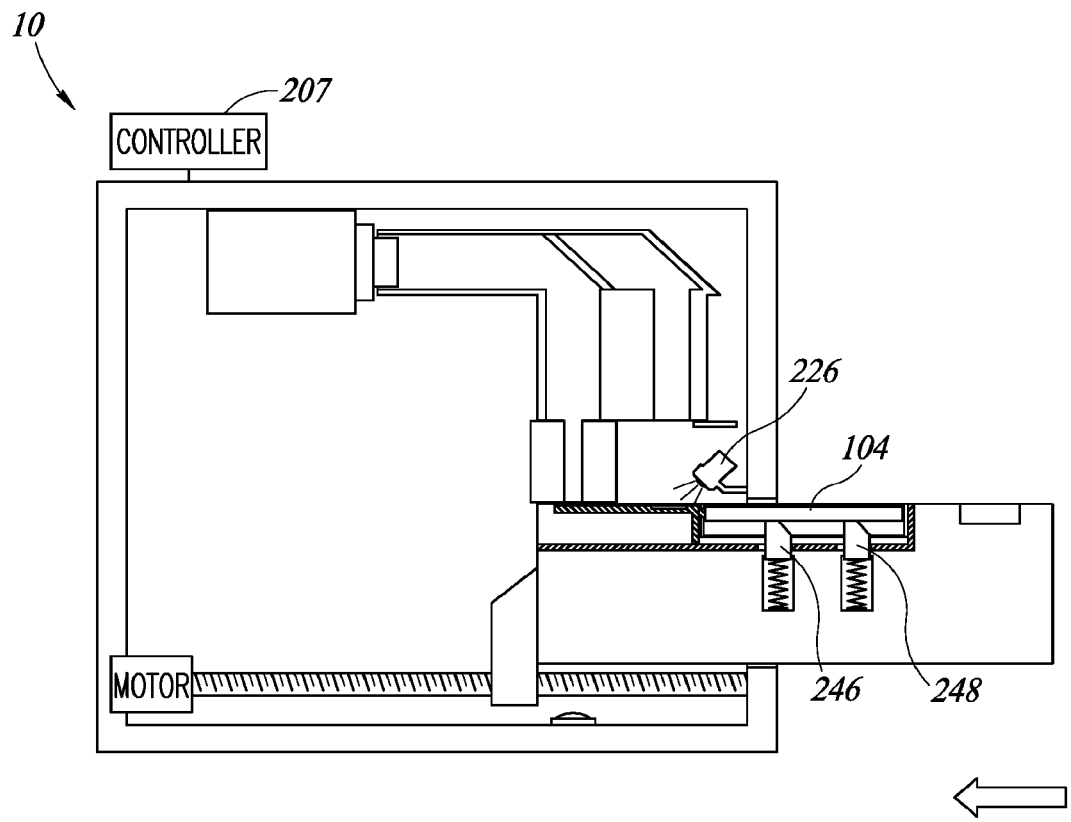
FIG. 22A is a schematic longitudinal cross section of the assay system showing continuing inward movement of the assay apparatus' complete tray towards its innermost position.
Figure 22B:
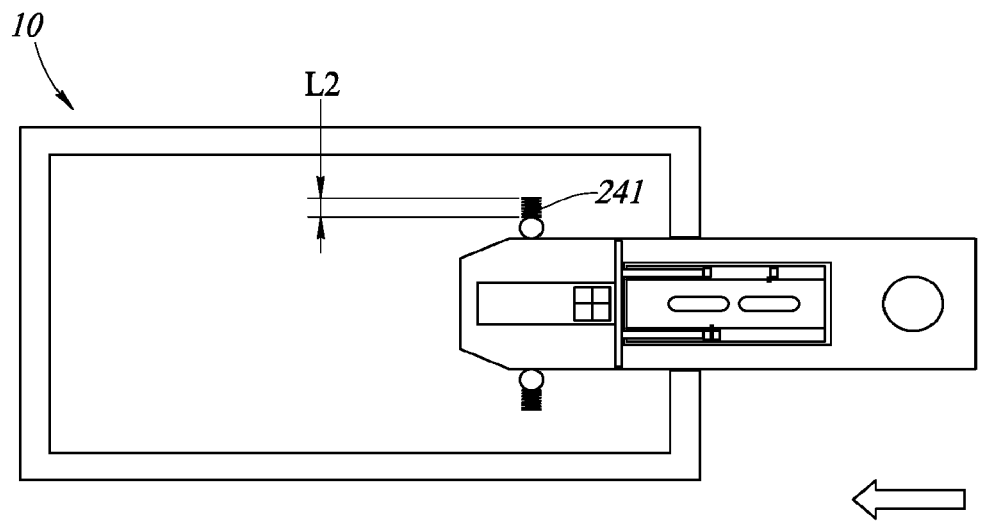
FIG. 22B is a schematic transverse cross section of the assay system showing continuing inward movement of the assay apparatus' complete tray towards its innermost position.

FIG. 22A and FIG. 22B show continuing inward movement of the complete tray 202 which leads to the leading specimen slide elevation member 246 completely exiting through the leading slot 258 and the trailing specimen slide elevation member 248 completely exiting through the trailing slot 259 into the tray pocket 203 to fully upwardly urge the assay device's specimen slide 104 into its final uppermost specimen examination position.

Figure 23A:
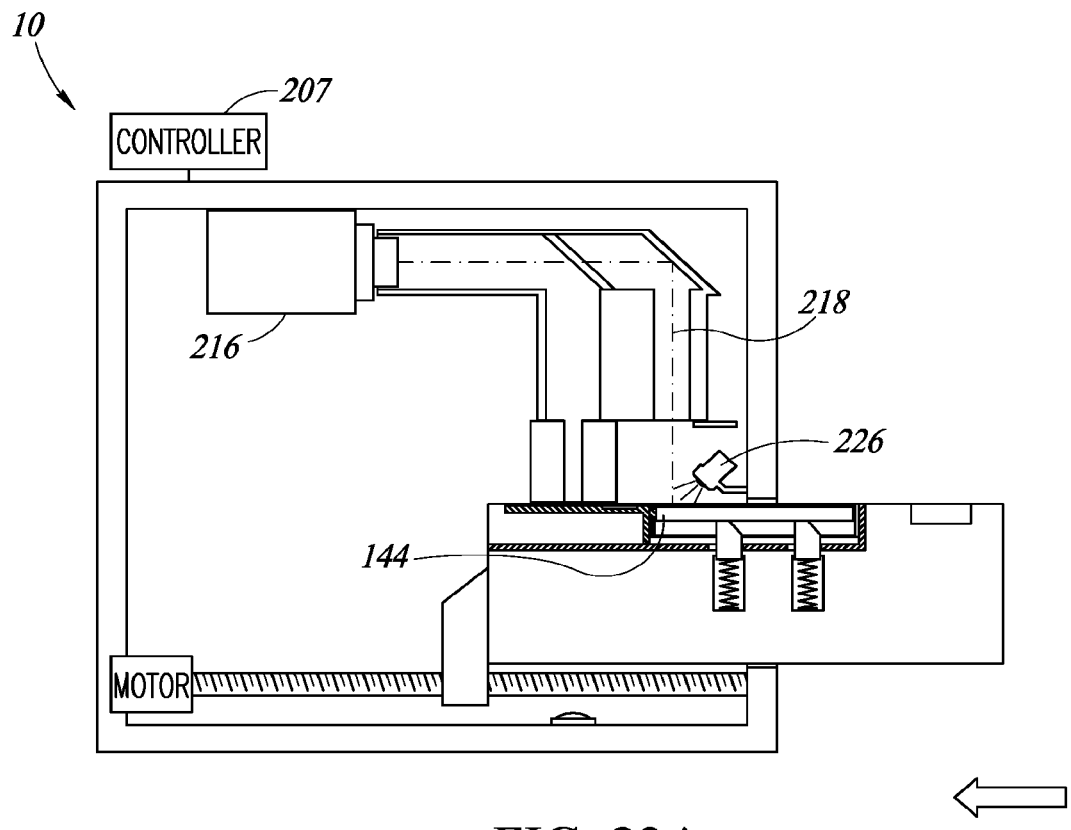
FIG. 23A is a schematic longitudinal cross section of the assay system showing continuing inward movement of the assay apparatus' complete tray towards its innermost position.
Figure 23B:
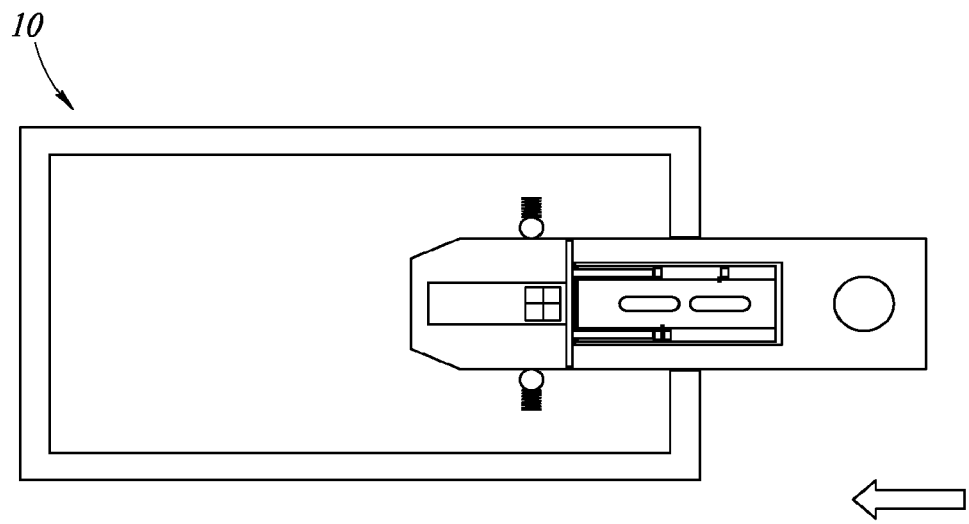
FIG. 23B is a schematic transverse cross section of the assay system showing continuing inward movement of the assay apparatus' complete tray towards its innermost position.

FIG. 23A and FIG. 23B show continuing inward movement of the complete tray 202 until the assay device 100's pH detection surface 144 is disposed along the first optical path 218. The digital color camera 216 acquires a color pH reading image. The controller 207 switches off the illumination source 226.

Figure 24A:
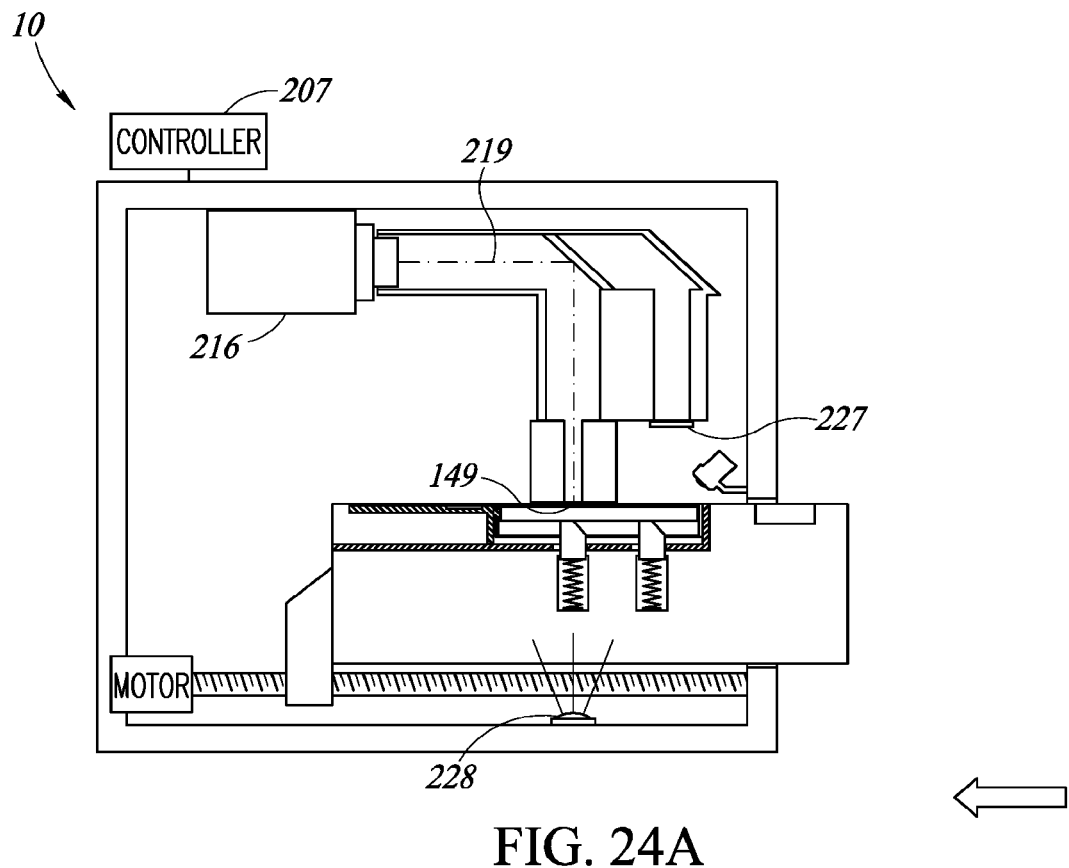
FIG. 24A is a schematic longitudinal cross section of the assay system showing continuing inward movement of the assay apparatus' complete tray towards its innermost position.
Figure 24B:
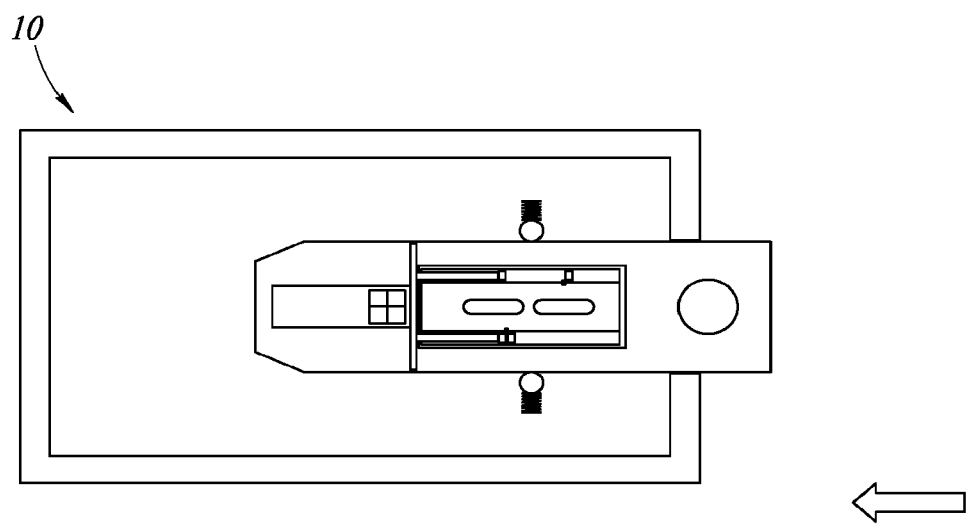
FIG. 24B is a schematic transverse cross section of the assay system showing continuing inward movement of the assay apparatus' complete tray towards its innermost position.

FIG. 24A and FIG. 24B show continuing inward movement of the assay apparatus' complete tray 202 until the assay device 100's autofocus target 149 is disposed along the second optical path 219. The continuing inward movement leads to the following simultaneous actions: The controller 207 switches on the illumination source 228 for backlighting the assay device 100. The first optical path shutter 227 closes the first optical path 218 to preclude illumination reaching the color camera 216 via the first optical path 218. The digital color acquisition arrangement 214 focuses the color camera 216 on the autofocus target 149 backlighted by the illumination source 228 ready to start acquiring microscope images of bodily specimen reacted with the liquid reagent 154A on the specimen slide panel 148.

Figure 25A:
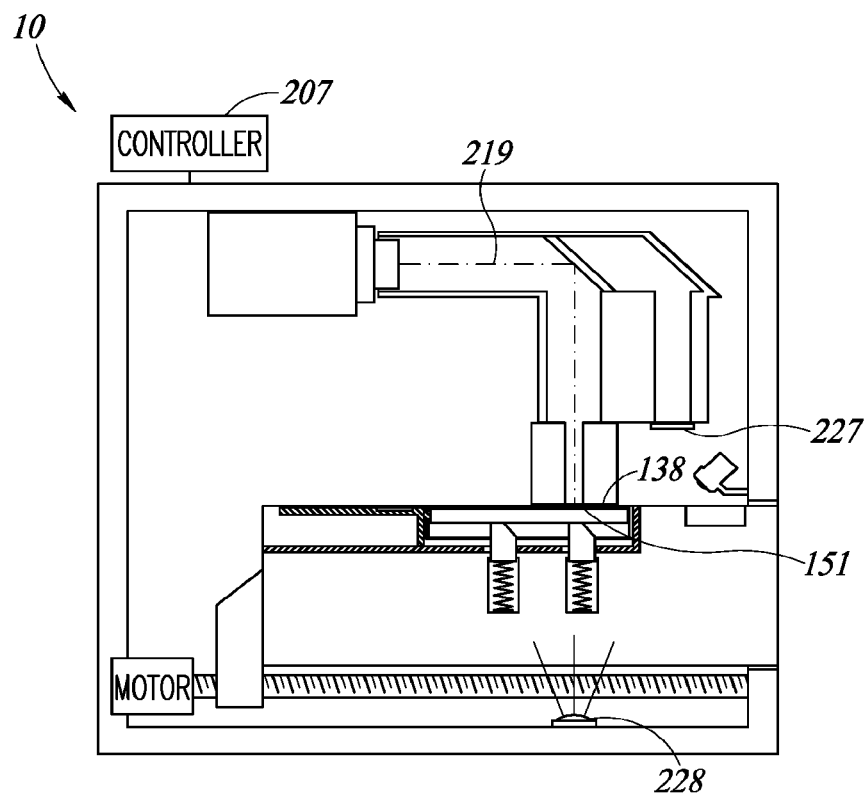
FIG. 25A is a schematic longitudinal cross section of the assay system show the assay apparatus' complete tray at its innermost position.
Figure 25B:
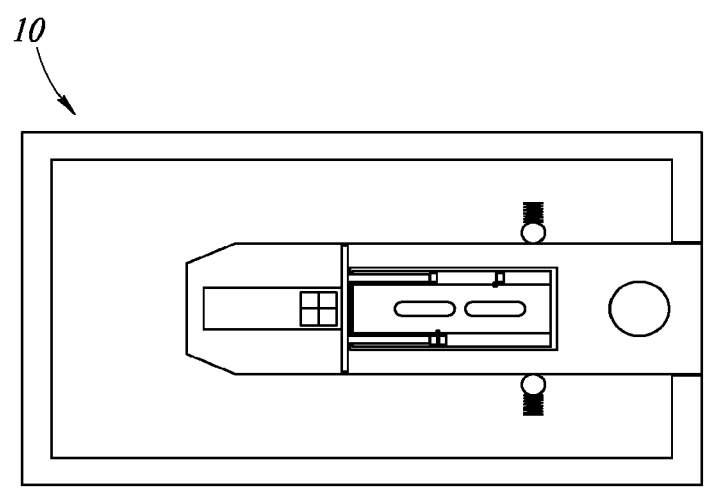
FIG. 25B is a schematic transverse cross section of the assay system show assay apparatus' complete tray at its innermost position.

FIG. 25A and FIG. 25B show the tray 202 at its innermost position. During continuous inward movement of the complete tray 202 to its innermost position, the following actions took place: The color camera 216 acquires a series of microscope images of bodily specimen reacted with the liquid reagent 154A on the specimen slide panel 148 as the specimen slide panel 148 passes under the second optical path 219. The bodily specimen on the specimen slide panel 148 is backlighted by illumination from the illumination source 228 passing through the major external tray member component 242 and the longitudinal slot 257.

As the assay device 100's autofocus target 152 is disposed along the second optical path 219, the digital color acquisition arrangement 214 focuses the color camera 216 on the autofocus target 152 ready to start acquiring microscope images of bodily specimen reacted with the liquid reagent 154B on the specimen slide panel 151.

The color camera 216 acquires a series of microscope images of bodily specimen reacted with the liquid reagent 154B on the specimen slide panel 151 as the specimen slide panel 151 passes under the second optical path 219. The bodily specimen on the specimen slide panel 151 is backlighted by illumination from the illumination source 228 passing through the major external tray member component 242 and the longitudinal slot 257.

The illumination source 228 is switched off.

Figure 26A:
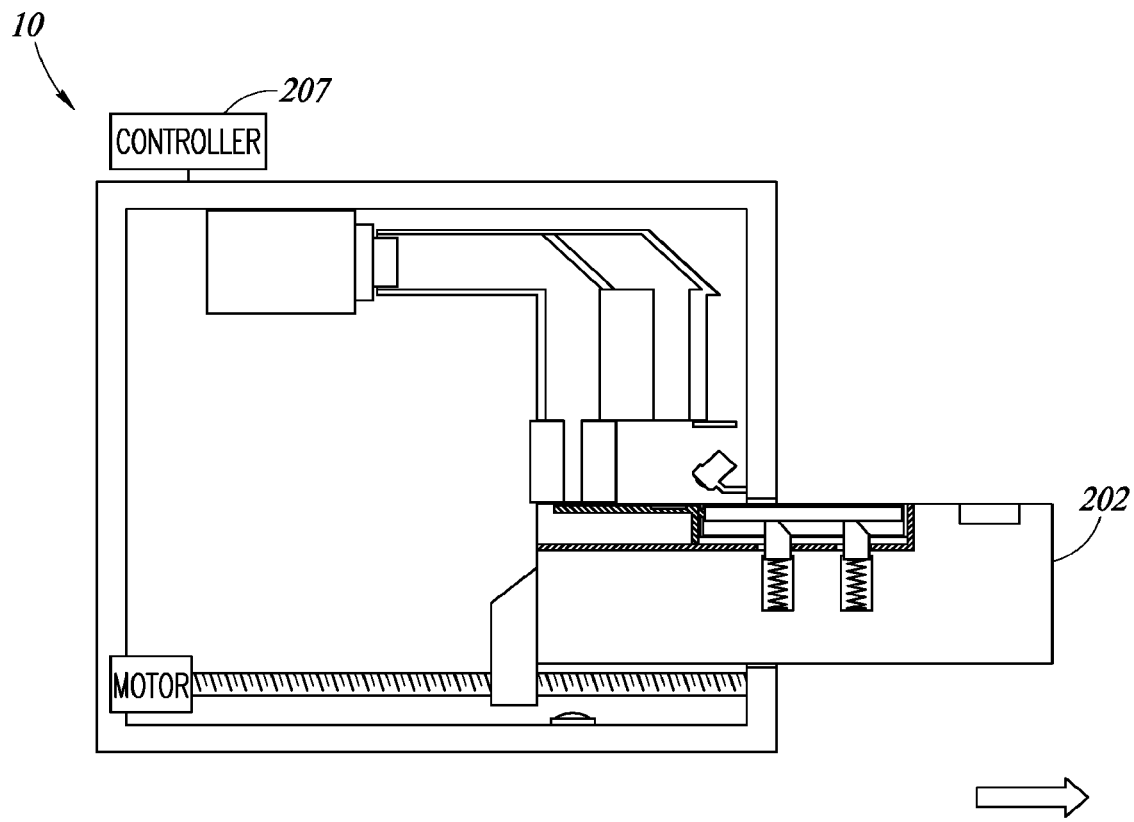
FIG. 26A is a schematic longitudinal cross section of the assay system showing outward movement of the assay apparatus' complete tray until a start of outward movement of the assay apparatus' external tray member relative to its stationary internal tray member.
Figure 26B:
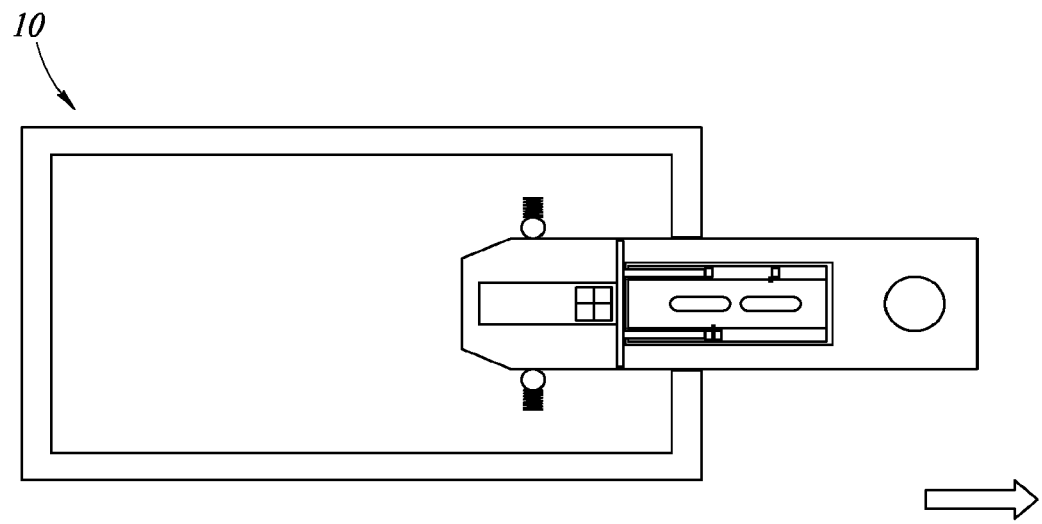
FIG. 26B is a schematic transverse cross section of the assay system showing outward movement of the assay apparatus' complete tray until a start of outward movement of the assay apparatus' external tray member relative to its stationary internal tray member.

FIG. 26A and FIG. 26B show outward movement of the complete tray 202 until a start of decoupling of the internal tray member 233 from the external tray member 232 to enable continued outward movement of the external tray member 232 relative to the internal tray member 233 such that the internal tray member 233 can be reset to its assay device insertion/ejection position. The first optical path shutter 227 is opened.

Figure 27A:
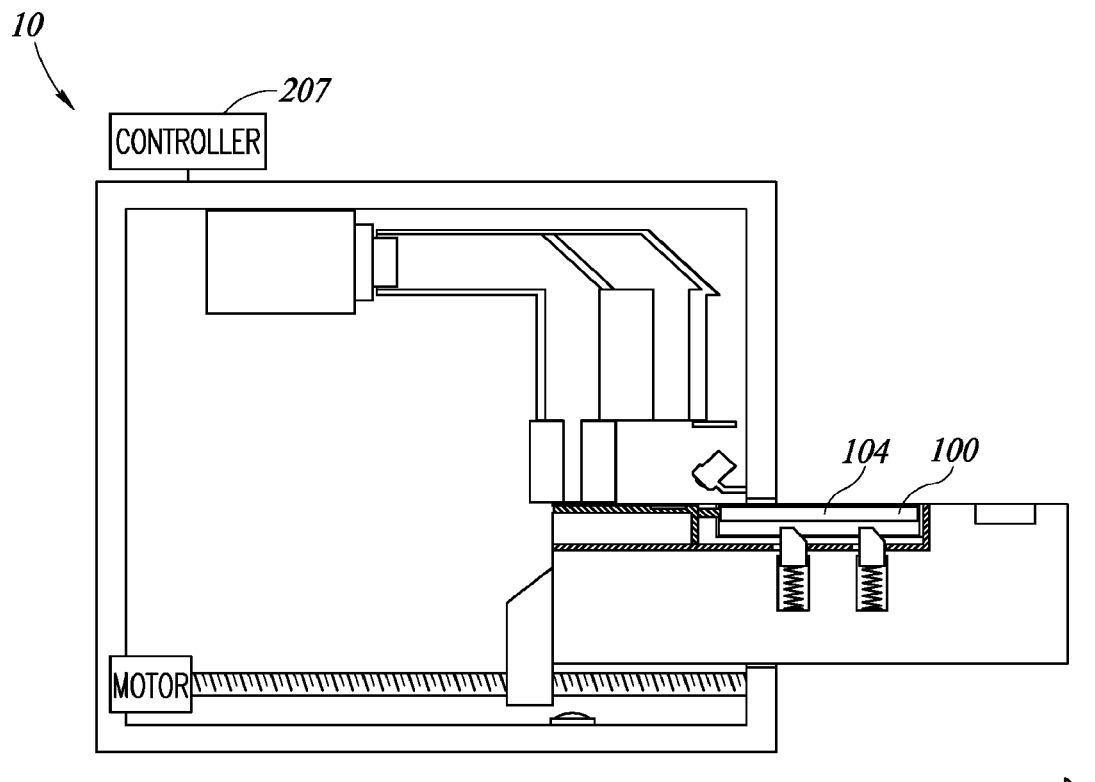
FIG. 27A is a schematic longitudinal cross section of the assay system showing outward movement of the assay apparatus' external tray member relative to its stationary internal tray member.
Figure 28A:
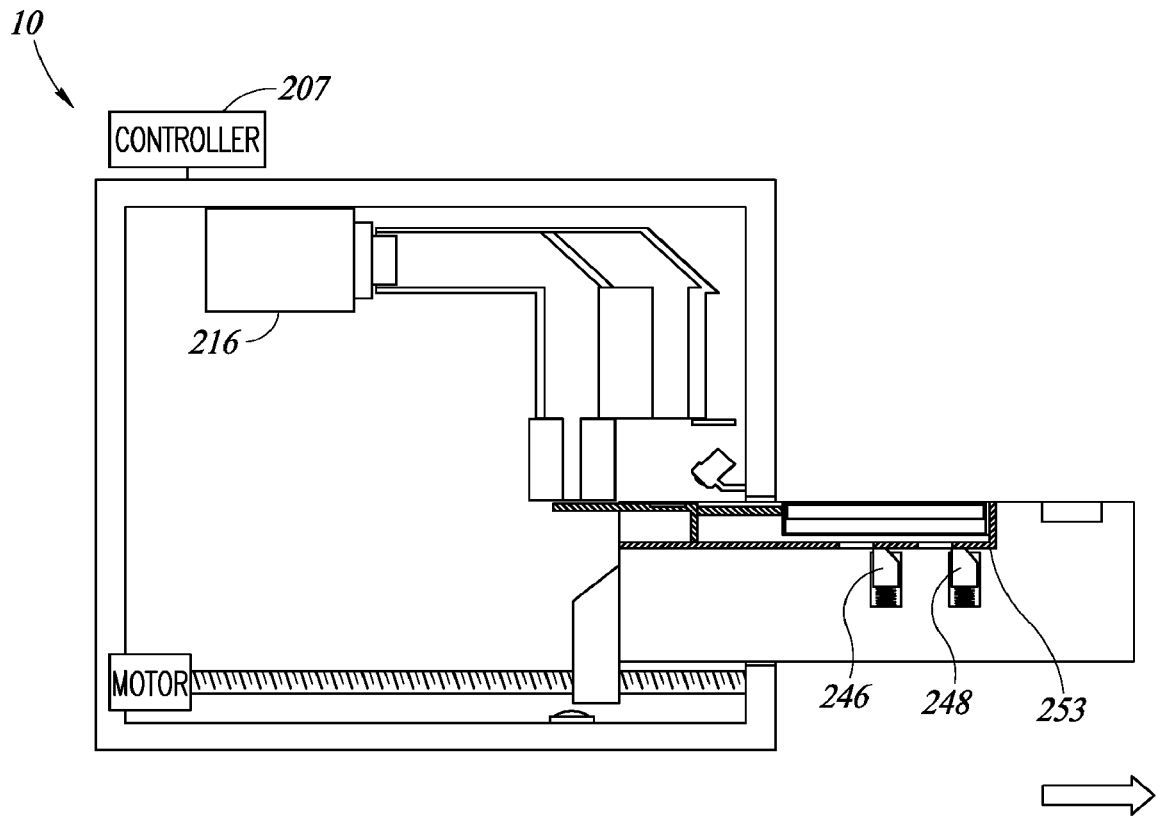
FIG. 28A is a schematic longitudinal cross section of the assay system with the assay apparatus' tray at its outermost position.
Figure 28B:
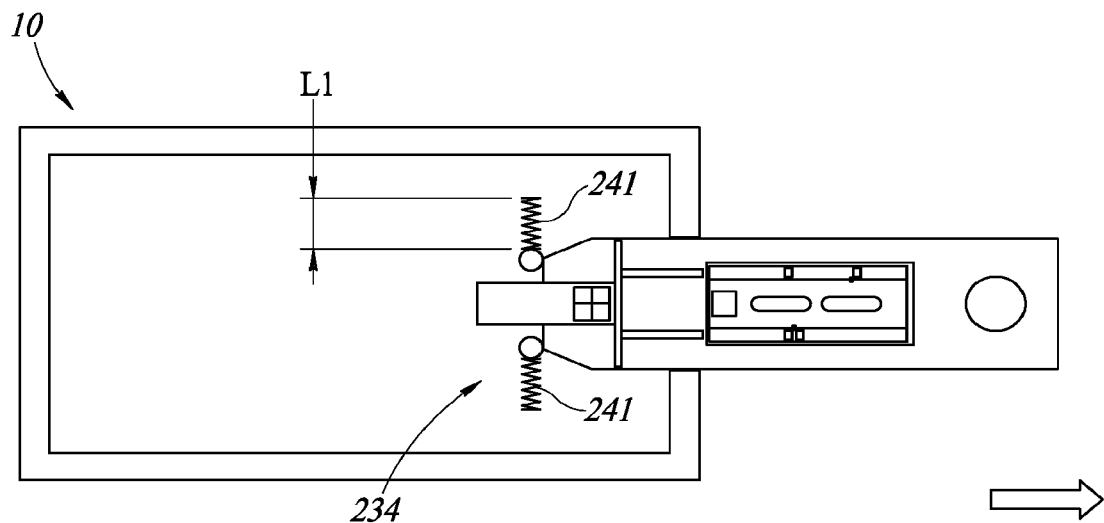
FIG. 28B is a schematic transverse cross section of the assay system with the assay apparatus' tray at its outermost position.

FIG. 27A and FIG. 28B show outward movement of the external tray member 232 relative to the stationary internal tray member 233. The restraining mechanism 234 starts to be enabled as evidenced by the compression springs 241 beginning to extend from their fully compressed length. The internal tray member 233 begins to depress the leading specimen slide elevation member 246 and the trailing specimen slide elevation member 248 thereunder. The plungers 254 and 256 begin to leave the barrels 131 and 132. The assay device's specimen slide 104 remains in its final uppermost specimen examination position by virtue of its specimen slide securing arrangement 105 thereby precluding its reuse.

Figure 27B:
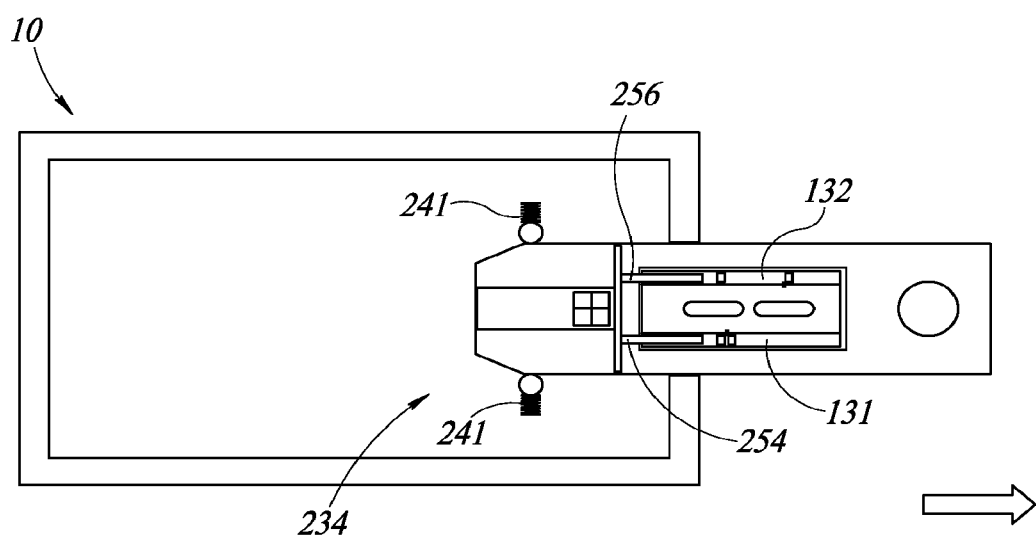
FIG. 27B is a schematic transverse cross section of the assay system showing outward movement of the assay apparatus' external tray member relative to its stationary internal tray member.

FIG. 28A and FIG. 28B show the assay system 10 with the tray 202 at the same outermost position as shown in FIG. 27A and FIG. 27B thereby completing a full cycle of operation of the assay apparatus 200 for obtaining diagnostic information from the assay device 100. The restraining mechanism 234 is fully enabled as evidenced by the compression springs 241 at their fully non-compressed length L1. The leading specimen slide elevation member 246 and the trailing specimen slide elevation member 248 are blocked by the plate 253. In the tray's outermost position, the internal tray member 233 is in its assay device insertion/ejection position relative to the external tray member 232.

Figure 29A:
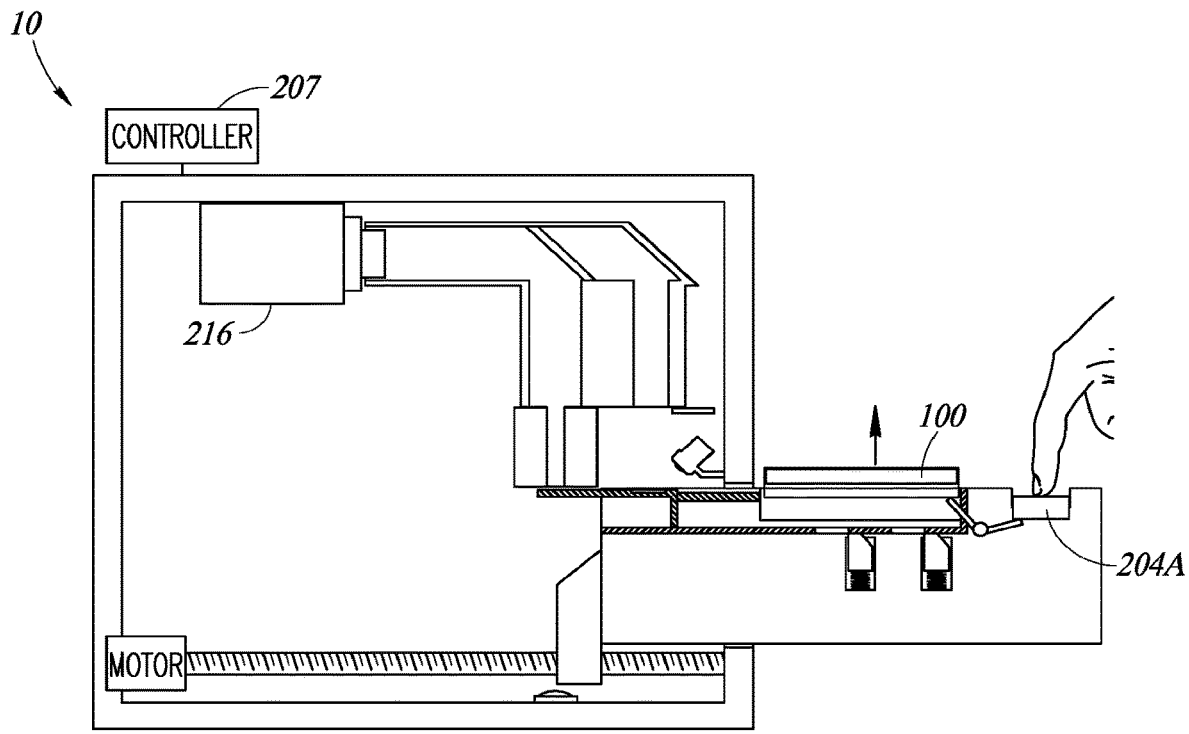
FIG. 29A is a schematic longitudinal cross section of the assay system showing ejection of the assay device from the assay apparatus' tray pocket at its tray's outermost position.
Figure 29B:
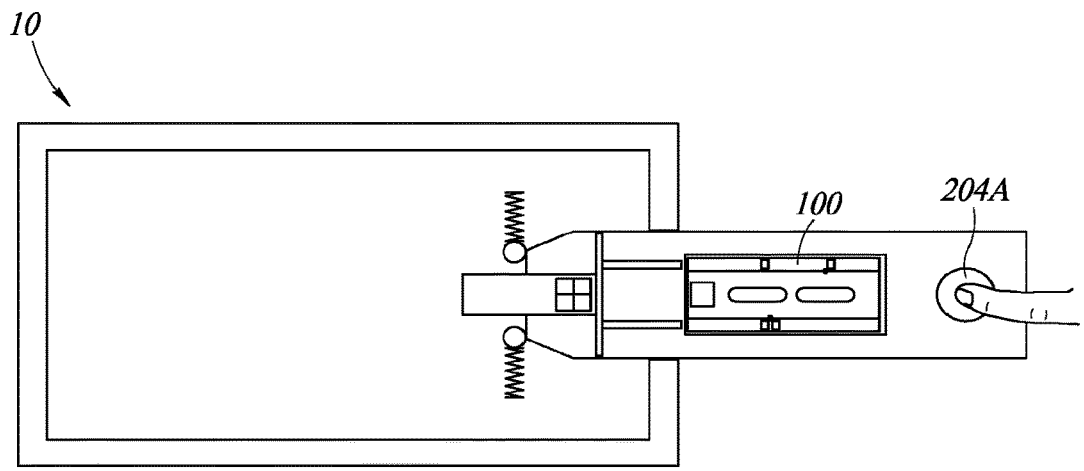
FIG. 29B is a schematic transverse cross section of the assay system showing ejection of the assay device from the assay apparatus' tray pocket at its tray's outermost position.

FIG. 29A and FIG. 29B show ejection of the assay device 100 from the tray pocket 203 on manual depression of the eject button 204A. The spent assay device 100 can be safely discarded. The assay apparatus 200 is reset to snugly receive a fresh assay device 100 in its tray pocket 203.

Alternative Assay Apparatus and Assay Devices

FIG. 30 to FIG. 46 show alternative assay devices for visual examination and/or for use with assay apparatus. Assay apparatus can range from a commercially available digital microscope to purposely designed assay apparatus. Suitable commercially available digital microscopes include inter alia Leica DVM6 and the like.

FIG. 30 to FIG. 32 show an assay system 10A including an assay device 100A for use with an assay apparatus 200A. The assay device 100A has a similar construction to the assay device 100 and differs therefrom in three main respects as follows:

First, the assay device 100A requires manual dispensing of liquid reagent to react with bodily specimen in its initial lowermost specimen introduction position. Accordingly, the cartridge housing top face 108 has a leading liquid reagent port 171 for manual dispensing of liquid reagent thereinto for being channeled onto bodily specimen deposited on a leading spatially discrete work surface to react therewith. And a trailing liquid reagent port 172 for manual dispensing liquid reagent thereinto for being channeled onto bodily specimen deposited on a trailing spatially discrete work surface to react therewith.

Second, the assay device 100A's specimen slide 104 is elevated from its initial lowermost specimen introduction position to its final uppermost specimen examination position on insertion of spaced apart pair of specimen slide elevation members 173 into the assay device's trailing minor end face 116. The spaced apart pair of specimen slide elevation members 173 can be fashioned as a handheld tool for repeated use with assay devices 100A. Alternatively, assay apparatus 200A includes a tray 202A with a spaced apart pair of specimen slide elevation members 173.

Figure 32A:
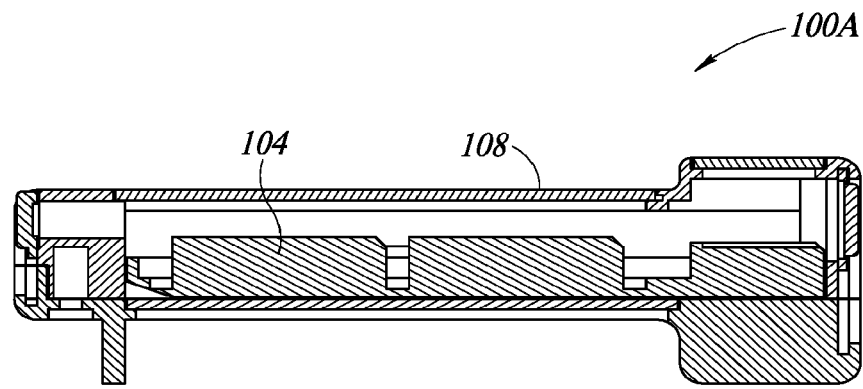
FIG. 32A is a longitudinal cross section of the FIG. 30 assay device with its specimen slide in its initial lowermost specimen introduction position along line E-E in FIG. 30.
Figure 32B:
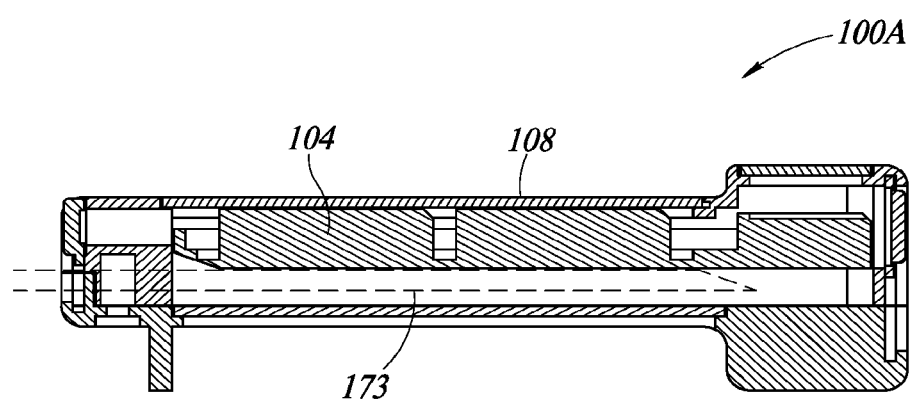
FIG. 32B is a longitudinal cross section of the FIG. 30 assay device with its specimen slide in its final uppermost specimen examination position along line E-E in FIG. 30.
Figure 33:
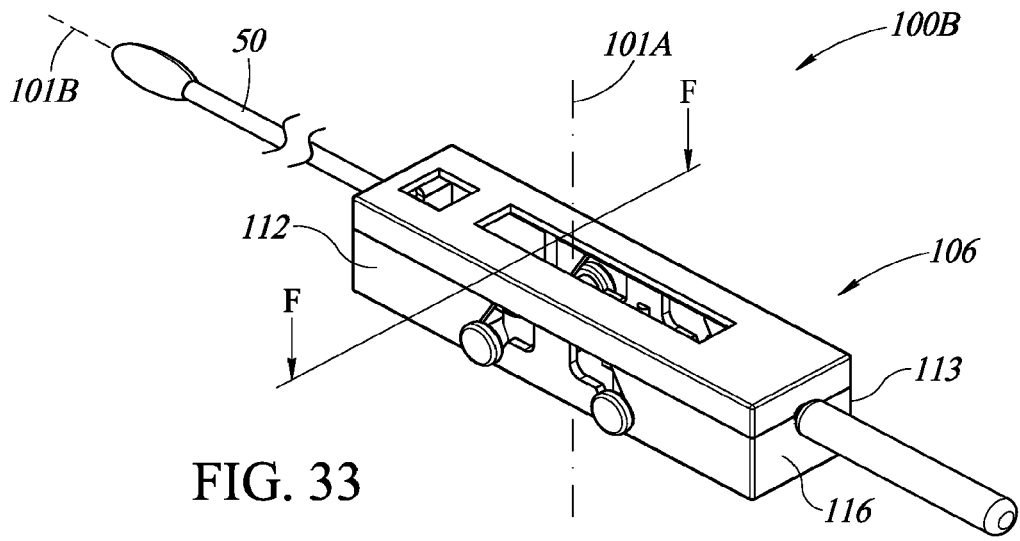
FIG. 33 is a front perspective view of an alternative assay device with a specimen slide in an initial lowermost specimen introduction position and a pre-deployed handheld pull through elongated swab having a bodily specimen.
Figure 34:
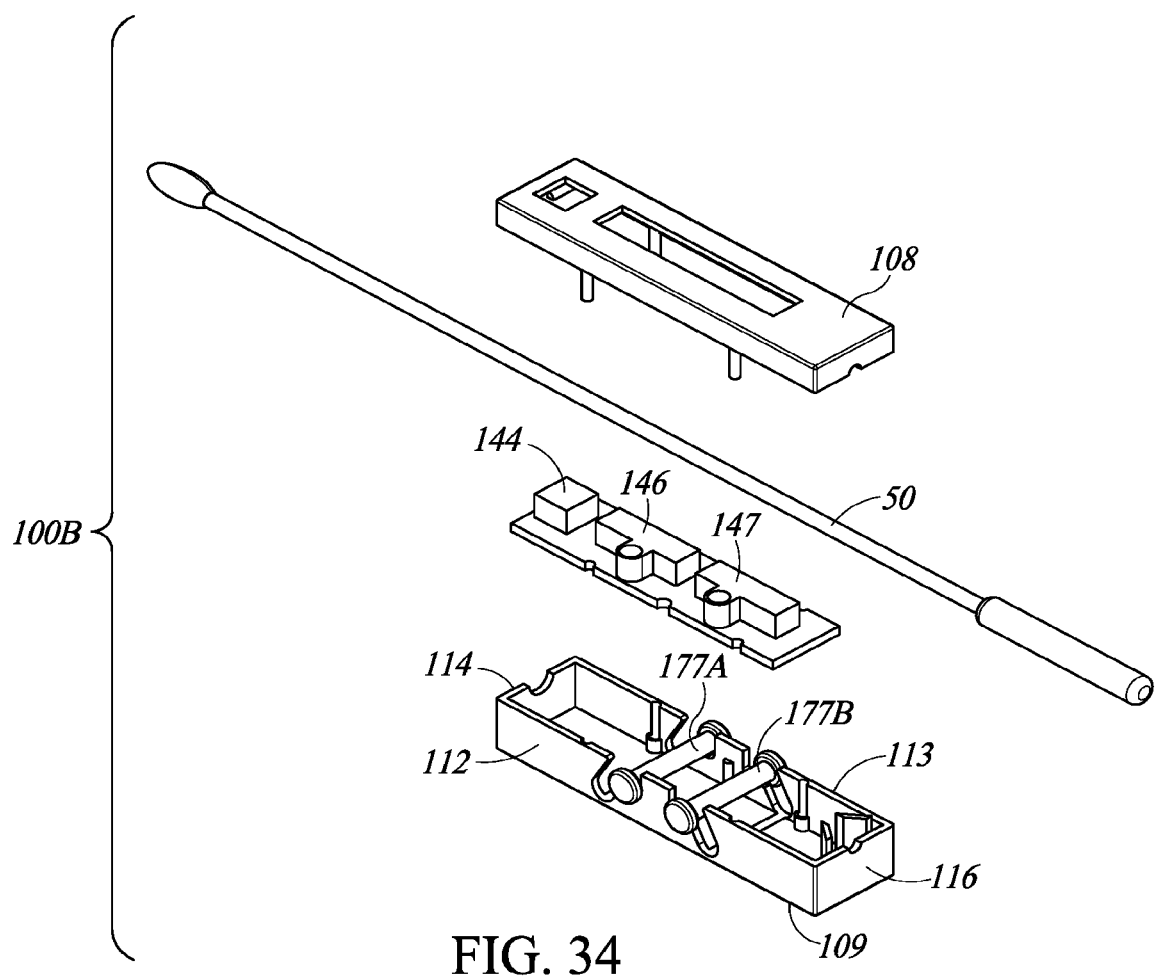
FIG. 34 is an exploded view of the FIG. 33 assay device.
Figure 35:
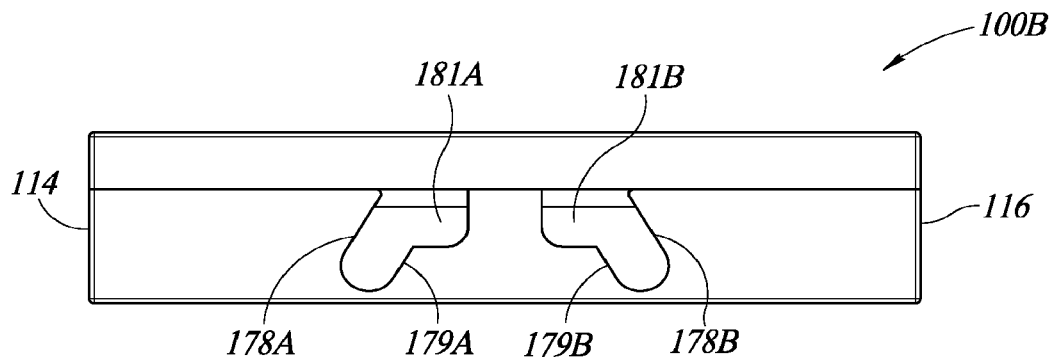
FIG. 35 is a front elevation view of the FIG. 33 assay device's cartridge housing.
Figure 36:
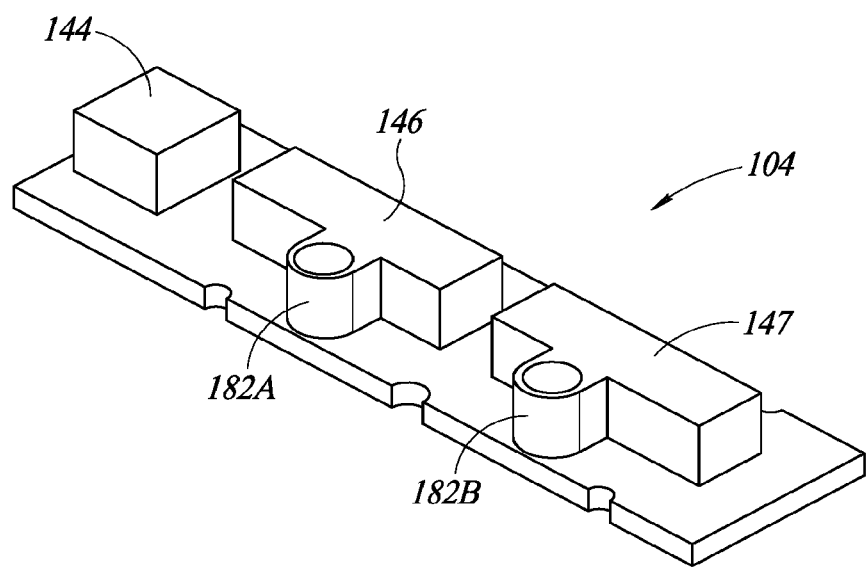
FIG. 36 is a front perspective view of the FIG. 33 assay device's specimen slide.
Figure 37:
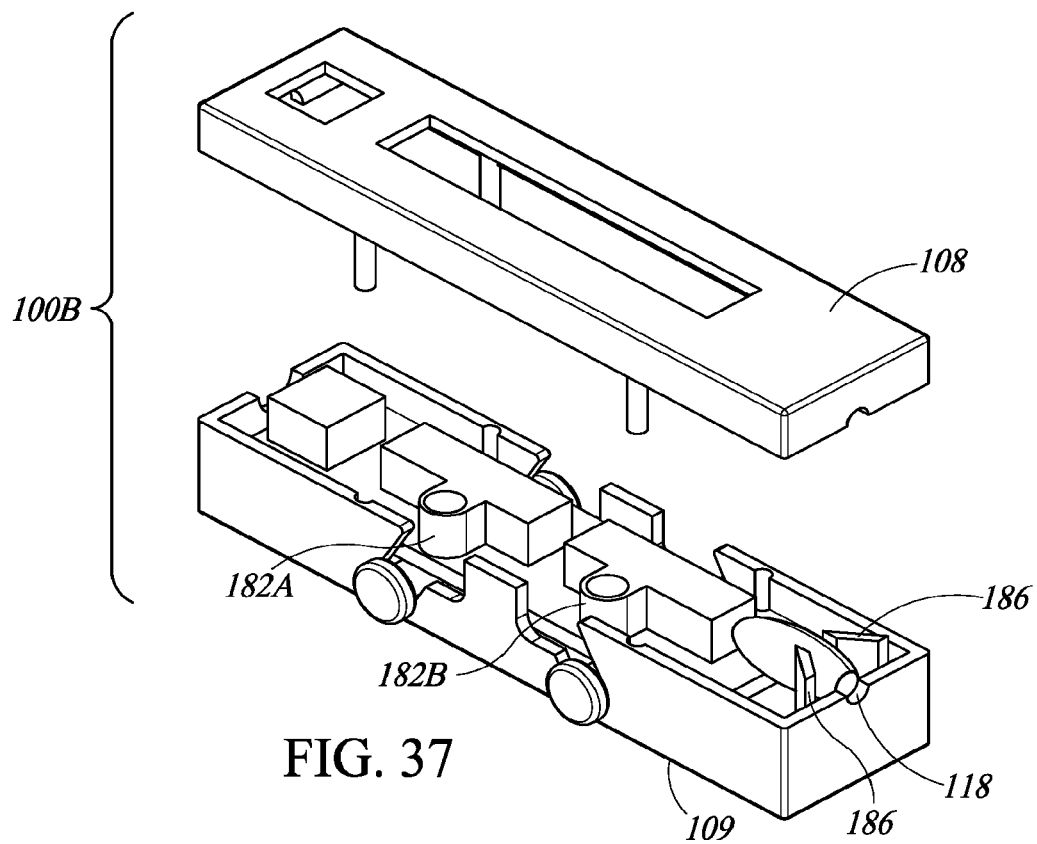
FIG. 37 is a partially exploded view of the FIG. 33 assay device with the specimen slide in the initial lowermost specimen examination position.
Figure 38:
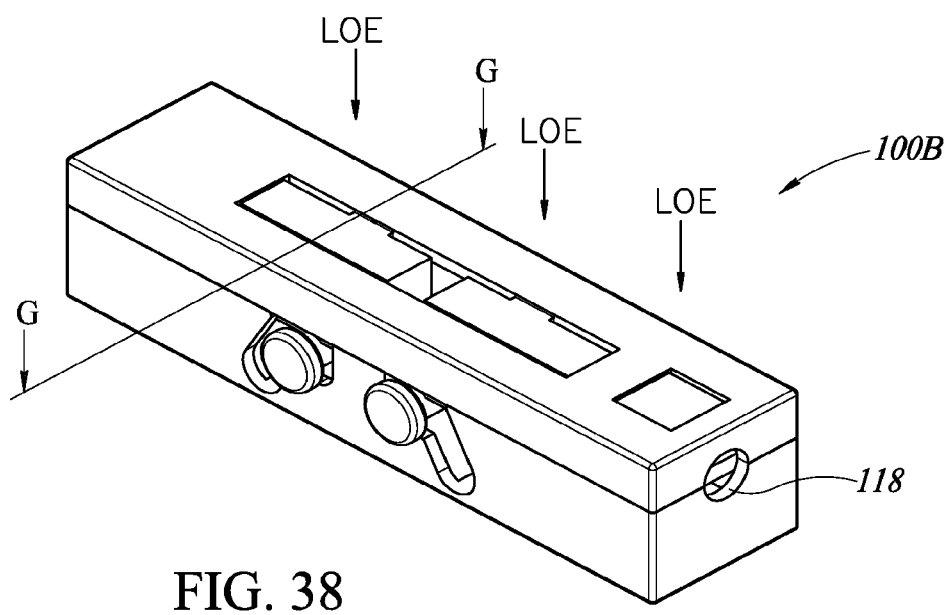
FIG. 38 is a front perspective view of the FIG. 33 assay device with the specimen slide in a final uppermost specimen examination position.
Figure 39A:
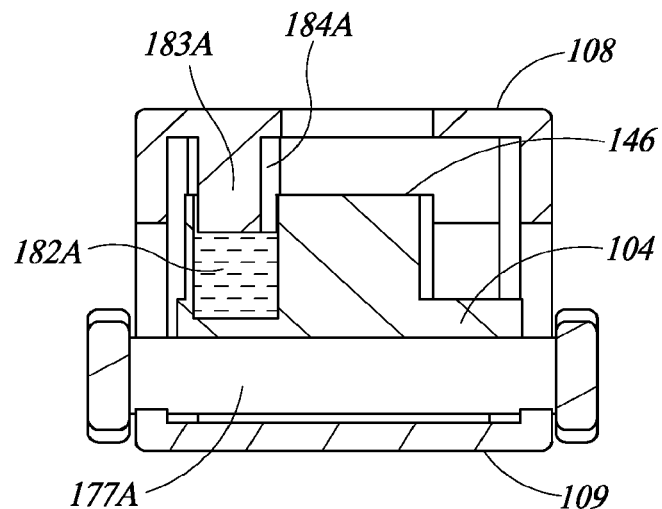
FIG. 39A is a transverse cross section of the FIG. 33 assay device along line F-F in FIG. 33.
Figure 39B:
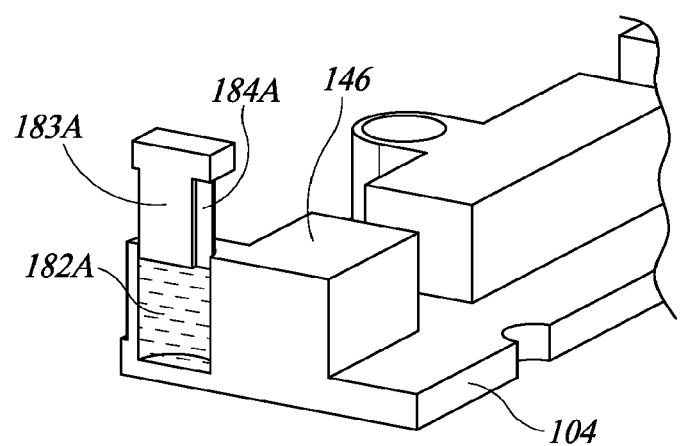
FIG. 39B is a cut-away view of the FIG. 33 assay device with the specimen slide in its initial lowermost specimen introduction position.
Figure 39C:
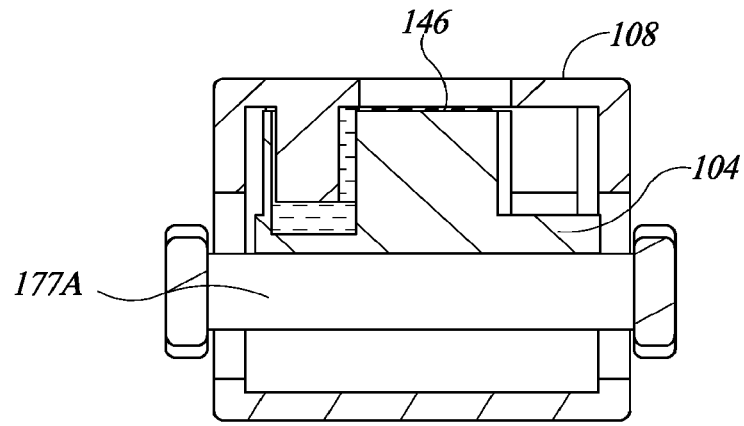
FIG. 39C is a transverse cross section of the FIG. 33 assay device along line G-G in FIG. 38.
Figure 39D:
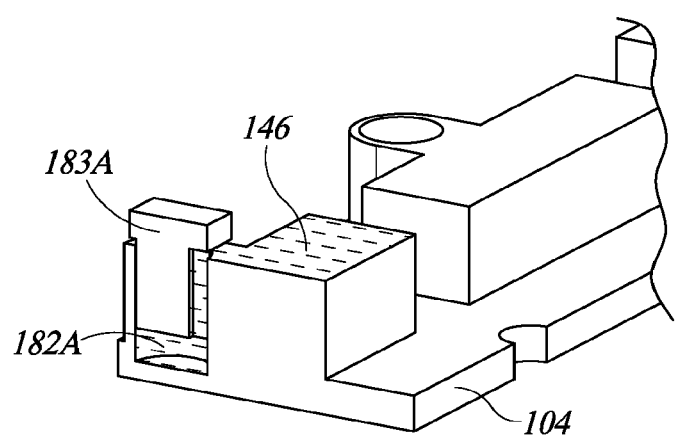
FIG. 39D is a cut-away view of the FIG. 33 assay device with the specimen slide in its final uppermost specimen examination position.
Figure 40:
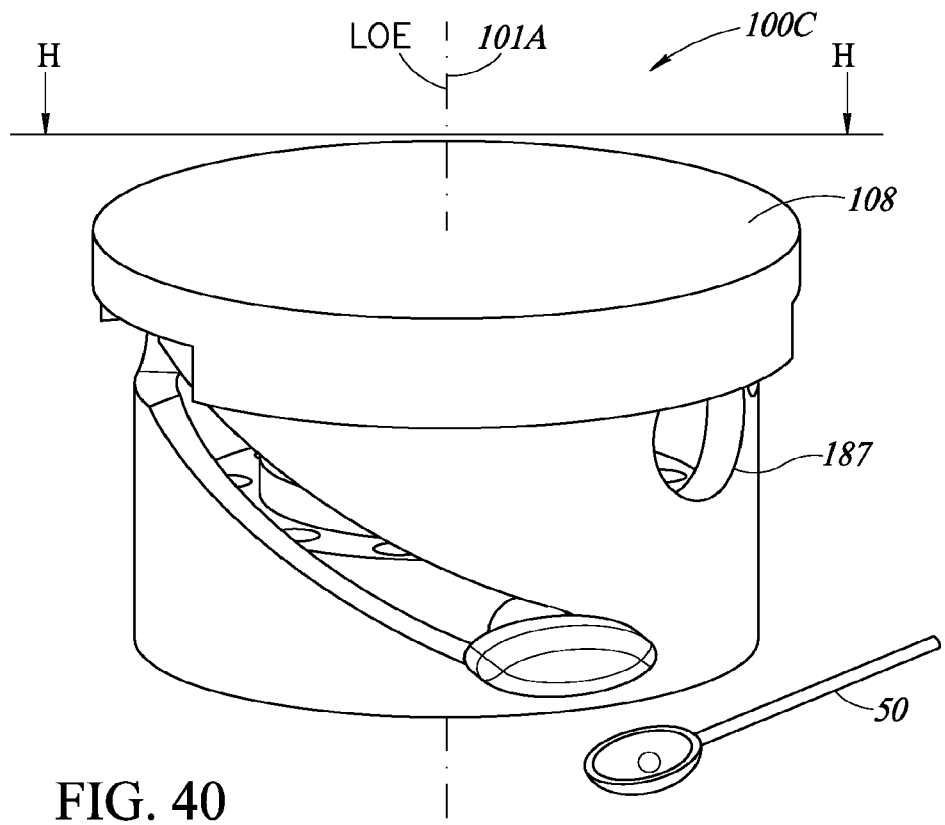
FIG. 40 is a front perspective view of a further alternative assay device with a specimen slide in an initial lowermost specimen examination position for examination of a bodily specimen.
Figure 41:
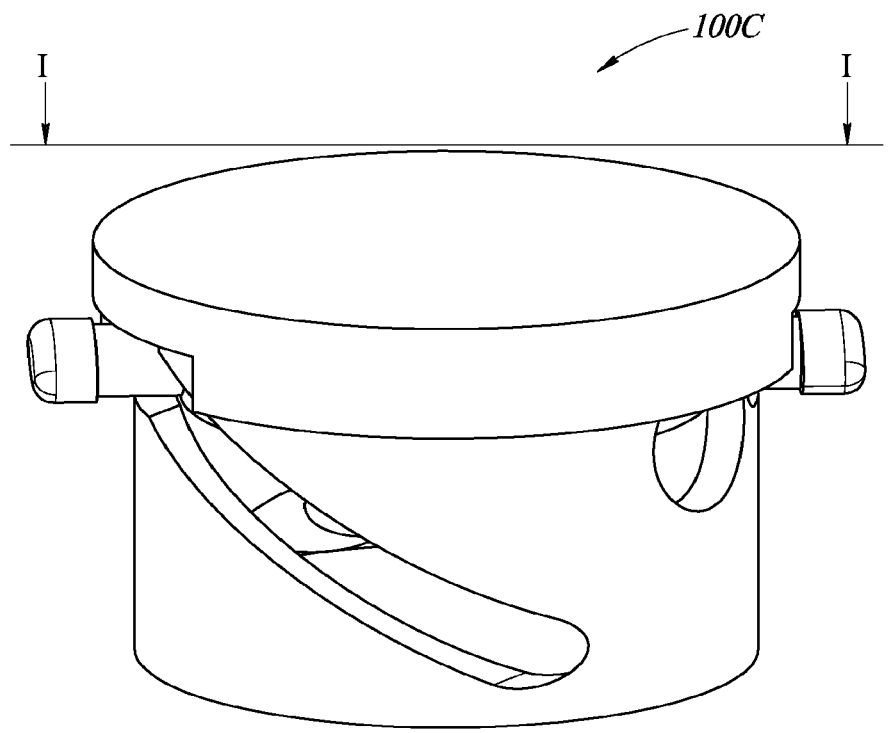
FIG. 41 is a front perspective view of the FIG. 40 assay device with the specimen slide in a final uppermost specimen examination position for examination of the bodily specimen.
Figure 42:
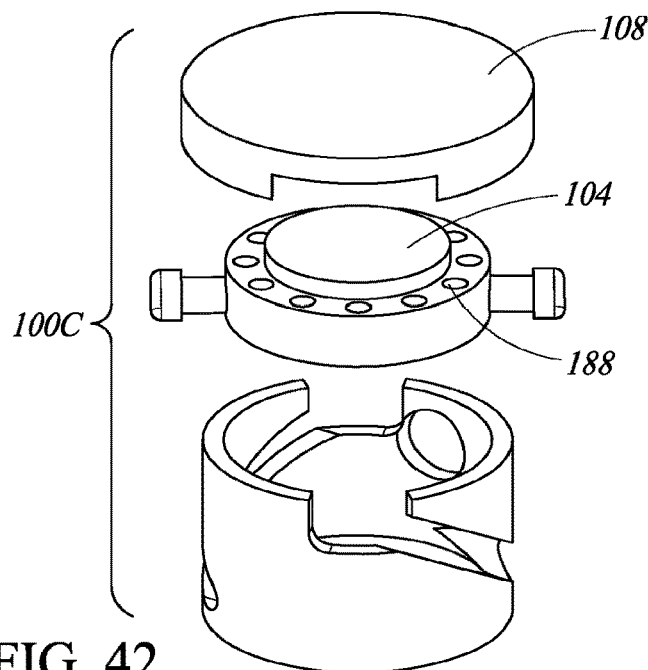
FIG. 42 is an exploded view of the FIG. 40 assay device.
Figure 43:
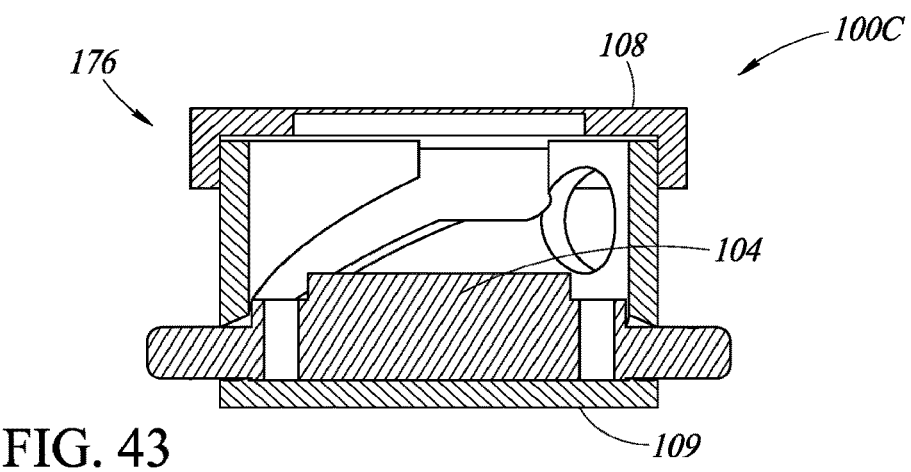
FIG. 43 is a longitudinal cross section of the FIG. 40 assay device after placing the bodily specimen on the specimen slide along line H-H in FIG. 40.
Figure 44:
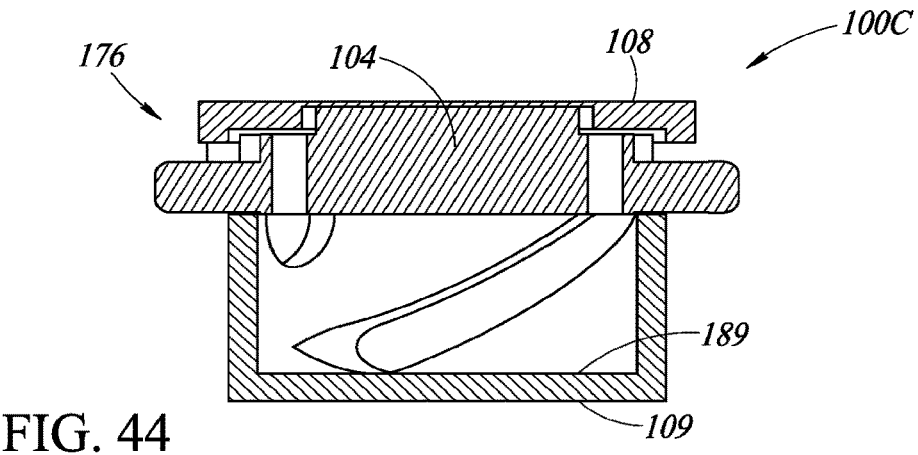
FIG. 44 is a longitudinal cross section of the FIG. 40 assay device along line I-I in FIG. 41.
Figure 45:
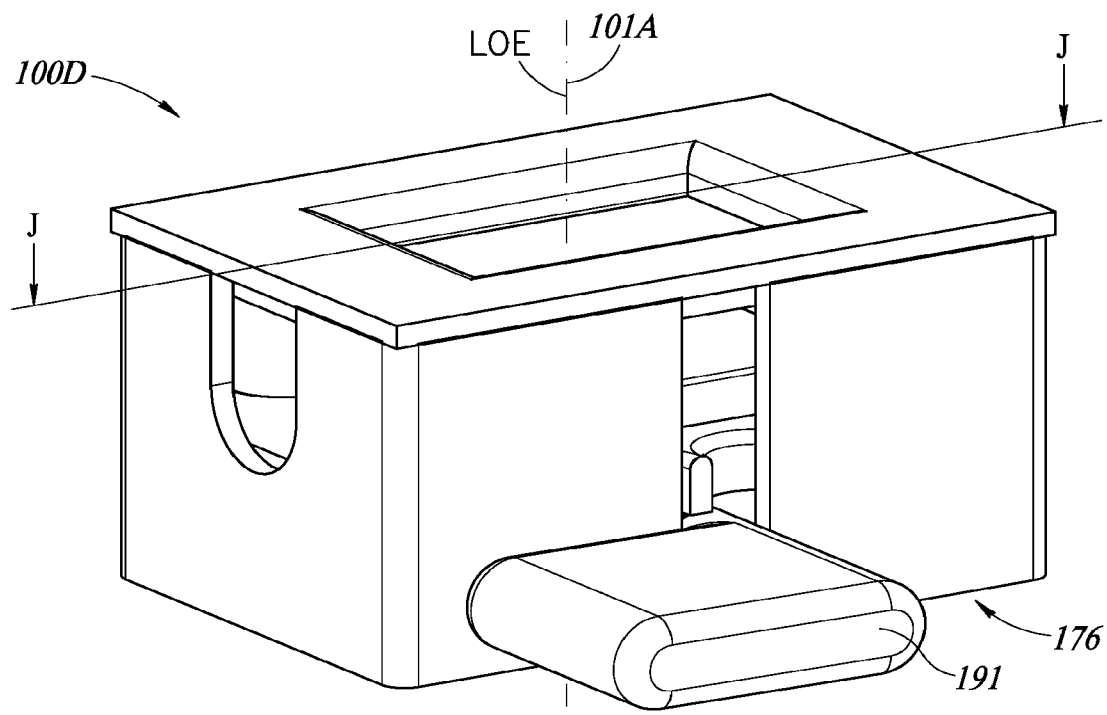
FIG. 45 is a front perspective view of a yet further assay device with a specimen slide in an initial lowermost specimen introduction position.
Figure 46:
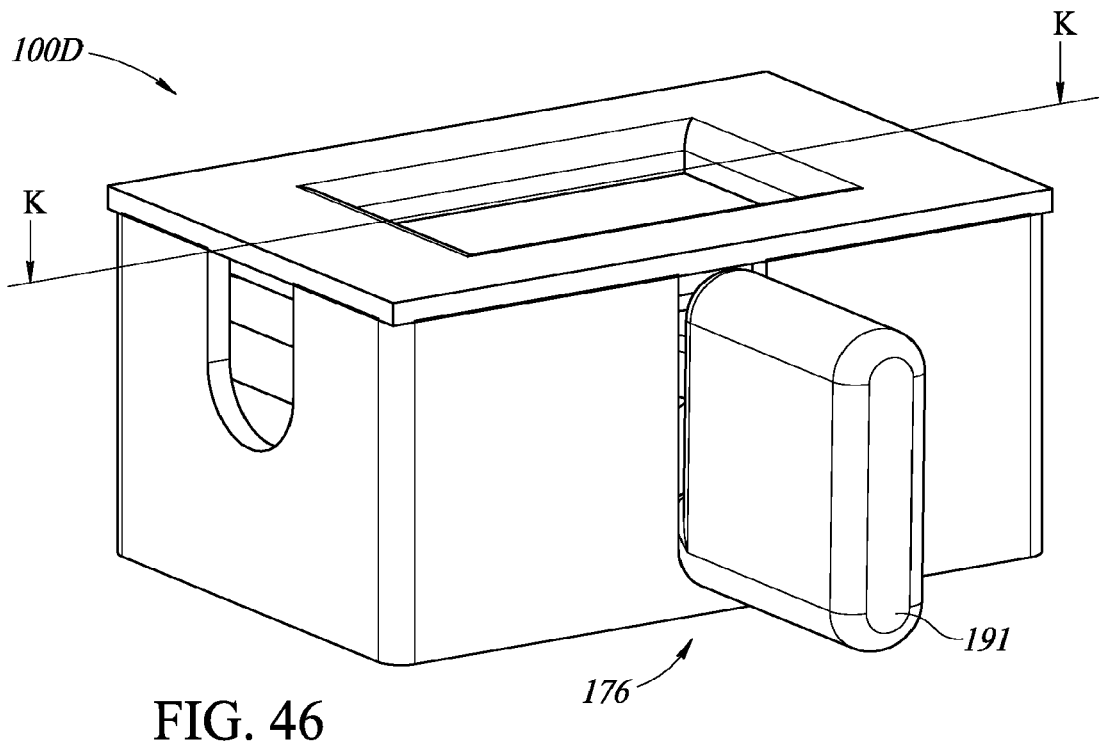
FIG. 46 is a front perspective view of the FIG. 45 assay device with the specimen slide in a final uppermost specimen examination position.
Figure 47:
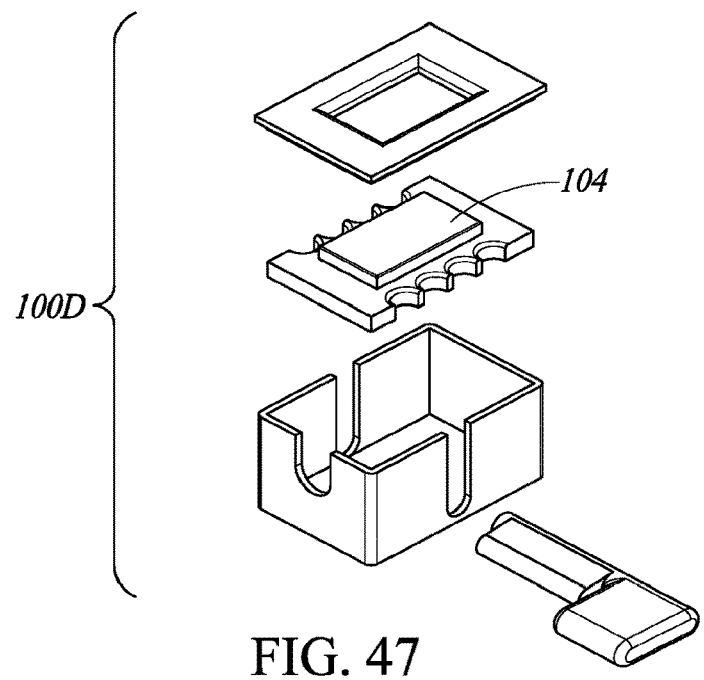
FIG. 47 is an exploded view of the FIG. 45 assay device.
Figure 48:
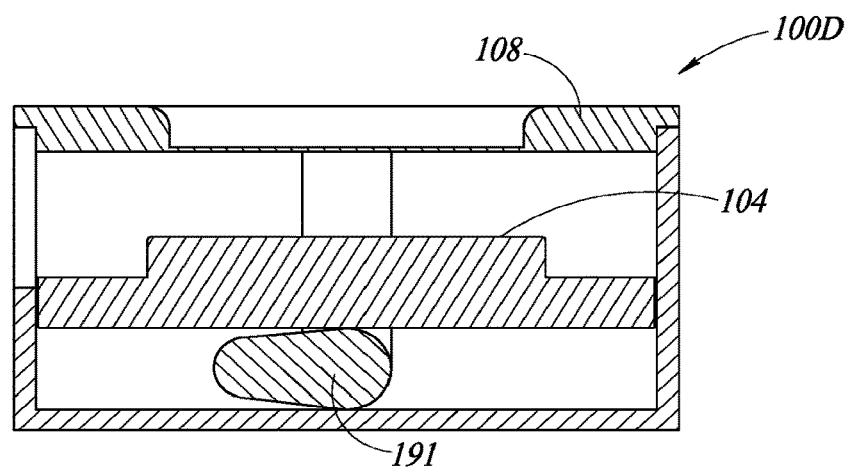
FIG. 48 is a longitudinal cross section of the FIG. 45 assay device along line J-J in FIG. 45.
Figure 49:
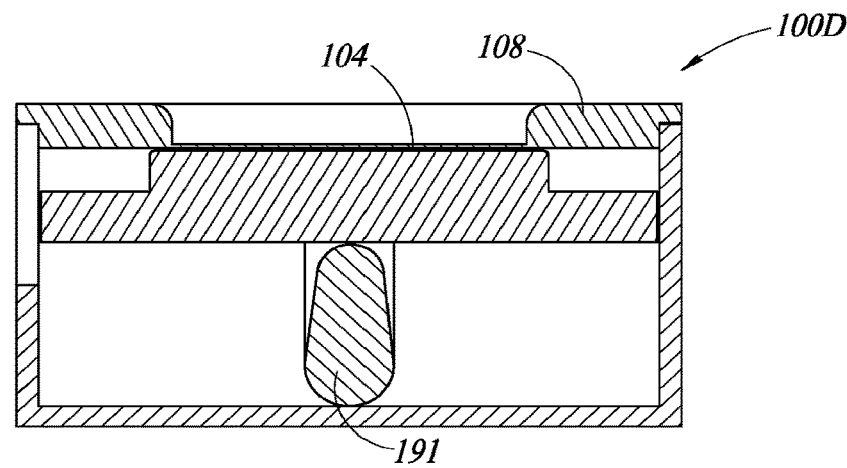
FIG. 49 is a longitudinal cross section of the FIG. 45 assay device along line K-K in FIG. 46.

FIG. 32A shows the assay device 100A before insertion of the spaced apart pair of specimen slide elevation members 173 for elevating its specimen slide 104 from its initial lowermost specimen introduction position to its final uppermost specimen examination position. FIG. 32B shows the assay device 100A after insertion of the spaced apart pair of specimen slide elevation members 173 for elevating its specimen slide 104 from its initial lowermost specimen introduction position to its final uppermost specimen examination position.

And third, the assay device 100A has an odor sensor 174 for obtaining odor information from a bodily specimen. Odor sensors are also known as electrochemical noses, e-noses and micro noses. Commercially available electrochemical noses include inter alia Figaro TGS8100 and the like. The assay apparatus 200A has suitable power and communication connections to the odor sensor 174.

FIG. 33 to FIG. 39 show an assay device 100B for examination of a bodily specimen. The assay device 100B has a similar construction to the assay device 100 and differs therefrom in three main respects as follows:

First, the assay device 100B includes a manually operated built-in specimen slide elevation arrangement 176 for elevating its specimen slide 104 from an initial lowermost specimen introduction position to a final uppermost specimen examination position. The cartridge housing 102 includes a leading specimen slide elevation actuator 177A adjacent the leading minor end face 114 and a trailing specimen slide elevation actuator 177B adjacent the trailing minor end face 116. The leading specimen slide elevation actuator 177A extends widthwise across the cartridge housing 102 and protrudes from an opposite pair of specimen slide elevation tracks 178A in the major side wall 112 and the major side wall 113 for manual actuation purposes. The specimen slide elevation tracks 178A each have a lower inclined elevation leg 179A and an upper horizontal locking leg 181A adjacent the cartridge housing top face 108 and extending from its lower inclined elevation leg 179A towards the trailing minor end face 116. The trailing specimen slide elevation actuator 177B extends widthwise across the cartridge housing 102 and protrudes from an opposite pair of specimen slide elevation tracks 178B in the major side wall 112 and the major side wall 113 for manual actuation purposes. The specimen slide elevation tracks 178B each has a lower inclined elevation leg 179B and a horizontal locking leg 181B adjacent the cartridge housing top face 108 and extending from its lower inclined elevation leg 179B towards the leading minor end face 114. The inclined elevation legs 179A and the inclined elevation legs 179B converge towards one another from the cartridge housing bottom face 109 towards the cartridge housing top face 108 such that the specimen slide elevation actuators 177A and 177B have an initial set-up position adjacent the cartridge housing bottom face 109 and a final examination position towards the cartridge housing top face 108. The initial set-up position corresponds to the initial lowermost specimen introduction position and the final examination position corresponds to the final uppermost specimen examination position.

Second, the assay device 100B includes a built-in liquid reagent dispensing arrangement 106 for dispensing liquid reagent on bodily specimen on the specimen slide 104 for reaction therewith. The specimen slide 104 includes the pH detection surface 144, the central work surface 146 and the trailing work surface 147. The assay device 100B has three lines of examination LOE corresponding to the pH detection surface 144, the central work surface 146 and the trailing work surface 147.

The built-in liquid reagent dispensing arrangement 106 includes a leading liquid reagent reservoir 182A and a trailing liquid reagent reservoir 182B. The cartridge housing top face 108 includes a downward depending leading plunger 183A and a downward depending trailing plunger 183B (not shown) for corresponding sliding insertion into the leading liquid reagent reservoir 182A and the trailing liquid reagent reservoir 182B on sliding elevation of the specimen slide 104 from its initial lowermost specimen introduction position to its final uppermost specimen examination position. The leading plunger 183A has an upright flow channel 184A and the trailing plunger 183B has an upright flow channel 184B (not shown) such that the assay device 100B dispenses liquid reagent from the leading liquid reagent reservoir 182A onto the central work surface 146 and from the trailing liquid reagent reservoir 182B onto the trailing work surface 147.

Third, the assay device 100B includes a spaced apart pair of abutment members 186 at the trailing throughgoing aperture 118 for detaching the specimen collection tool's leading specimen collection tip 52 therefrom on withdrawing the specimen collection tool 50 from the assay device 100B.

FIG. 40 to FIG. 44 show a further alternative assay device 100C for examination of a bodily specimen. The assay device 100C is a simplified assay device with a single line of examination LOE along its upright assay device centerline 101A. The assay device 100C includes a manual operated built-in specimen slide elevation arrangement 176 involving rotary elevation of a specimen slide 104 from an initial lowermost specimen introduction position (see FIG. 40 and FIG. 43) to a final uppermost specimen examination position (see FIG. 41 and FIG. 44) in which a bodily specimen on the specimen slide 104 is compressed between the specimen slide 104 and the cartridge housing top face 108. The assay device 100C includes a specimen introduction port 187 in the cartridge housing peripheral surface 111 above the specimen slide 104 in its initial lowermost specimen introduction position. A bodily specimen can be reacted with liquid reagent before examination and therefore the specimen slide 104 includes an annular arrangement of drainage holes 188 for facilitating drainage therefrom. The cartridge housing bottom surface 109 can be lined with hygroscopic material 189 to absorb liquid residues.

FIG. 45 to FIG. 49 show a yet further alternative assay device 100D for examination of a bodily specimen. The assay device 100D is similar to the assay device 100C and differs therefrom in terms of its manually operated built-in specimen slide elevation arrangement 176. The specimen slide elevation arrangement 176 includes a specimen slide elevation actuator 191 which requires a quarter turn to elevate the specimen slide 104 from its initial lowermost specimen introduction position to its final uppermost specimen examination position.

While the invention has been described with respect to a limited number of embodiments, it will be appreciated that many variations, modifications, and other applications of the invention can be made within the scope of the appended claims.

The invention claimed is:

1. An assay device for enabling electromagnetic radiation (EMR) examination of a bodily specimen at at least one predetermined EMR spectrum along an upright line of examination, the assay device having an upright assay device centerline and a horizontal longitudinal assay device centerline perpendicular to the upright line of examination, the assay device comprising:
   (a) a handheld cartridge housing having a cartridge housing top face, a cartridge housing bottom face opposite said cartridge housing top face, and a cartridge housing peripheral face between said cartridge housing top face and said cartridge housing bottom face to bound a cartridge housing interior,
      said cartridge housing top face and said cartridge housing bottom face being transverse to the upright assay device centerline and said cartridge housing peripheral face being co-directional with the upright assay device centerline,
      said cartridge housing having a specimen introduction port in said housing peripheral face for enabling introduction of the bodily specimen into said cartridge housing interior; and
   (b) a single specimen slide snugly continuously accommodated in said cartridge housing interior and capable of sliding linear elevation from an initial lowermost specimen introduction position in an unused assay device to a final uppermost specimen examination position in a used assay device correspondingly remote from and adjacent said cartridge housing top face,
      said specimen slide having the bodily specimen deposited thereon through said specimen introduction port in said initial lowermost specimen introduction position, and
      said specimen slide being intimately juxtaposed against said cartridge housing top face in said final uppermost specimen examination position for compressing at least some bodily specimen between said specimen slide and said cartridge housing top face,
      for enabling examination of said compressed at least some bodily specimen at the at least one predetermined EMR spectrum along the upright line of examination.

2. The device according to claim 1 wherein said specimen slide includes a pH chemical detector for providing a visible color indication regarding the bodily specimen's pH value.

3. The device according to claim 1 wherein said specimen slide includes at least one visually discernible autofocus target for enabling autofocusing thereon in said final uppermost specimen examination position.

4. The device according to claim 1 and further comprising a specimen slide securing arrangement for securing the specimen slide in said final uppermost specimen examination position wherein said specimen slide securing arrangement enables an irreversible elevation of said specimen slide from said initial lowermost specimen introduction position to said final uppermost specimen examination position.

5. The device according to claim 1 wherein said cartridge housing top face includes a liquid reagent port for manual dispensing of liquid reagent onto said specimen slide in said initial lowermost specimen introduction position to react with at least some bodily specimen on said specimen slide.

6. The device according to claim 1 wherein said cartridge housing bottom face is lined with hygroscopic material to absorb liquid residues displaced from said specimen slide pursuant to elevation of said specimen slide to said final uppermost specimen examination position.

7. The device according to claim 1 and further comprising an odor sensor for obtaining odor information from the bodily specimen deposited on the specimen slide.

8. The device according to claim 1 wherein said cartridge housing includes at least one throughgoing aperture under said specimen slide in said initial lowermost specimen introduction position for sliding insertion of a specimen slide elevation member into said cartridge housing interior for elevating said specimen slide from said initial lowermost specimen introduction position to said final uppermost specimen examination position on said sliding insertion of the specimen slide elevation member into said cartridge housing interior.

9. The device according to claim 8 wherein said cartridge housing bottom face includes said at least one throughgoing aperture under said specimen slide.

10. The device according to claim 1 wherein said cartridge housing includes a built-in liquid reagent dispensing arrangement including a liquid reagent reservoir for dispensing liquid reagent on at least some bodily specimen on said specimen slide to react therewith before said sliding elevation of said specimen slide from said initial lowermost specimen introduction position to said final uppermost specimen examination position.

11. The device according to claim 10 wherein said cartridge housing top face includes a downward depending plunger for insertion into said built-in liquid reagent reservoir on said sliding elevation of said specimen slide from said initial lowermost specimen introduction position to said final uppermost specimen introduction position for dispensing liquid reagent onto said specimen slide.

12. The device according to claim 10 wherein said cartridge housing includes a longitudinal directed barrel lateral to the horizontal longitudinal assay device centerline,
said barrel including an exposed leading seal, a trailing seal and liquid reagent between said exposed leading seal and said trailing seal,
said barrel having a liquid reagent dispensing port for dispensing liquid reagent on said specimen slide for reacting with the bodily specimen deposited thereon,
said leading seal and said trailing seal having an initial pre-liquid dispensing position in an unused assay device and a final post-liquid dispensing position in a used assay device,
said trailing seal being urged past said liquid reagent dispensing port on being urged from said initial pre-liquid reagent dispensing position to said final post-liquid reagent dispensing position.

13. The device according to claim 12 wherein at least one of said leading seal and said trailing seal is highly visually distinguishable within said cartridge housing for enabling determination of its position along said barrel.

14. The device according to claim 1 wherein the handheld cartridge is pre-assembled with a handheld specimen collection tool having a shank, a handle and a specimen collection tip for bearing a bodily specimen, the handheld specimen collection tool's shank traversing said cartridge housing such that its specimen collection tip and handle oppositely extend beyond said cartridge housing peripheral face, and the handheld specimen collection tool's handle includes a manual operated release button for mechanically engaging said cartridge housing peripheral face in a pre-assembled state before use thereby precluding relative movement of the handheld specimen collection tool relative to the assay device.

15. The device according to claim 14 wherein said cartridge housing top face includes guidance members downward depending into said cartridge housing interior for guiding sliding withdrawal of the handheld specimen collection tool from the handheld cartridge for depositing bodily specimen on said specimen slide.

16. The device according to claim 14 further comprising a removable protective foil for protecting at least said cartridge housing top face, said protective foil being manually removable subsequent to sliding withdrawal of the handheld specimen collection tool from the assay device.

17. The device according to claim 1 wherein said cartridge housing includes a manually operated specimen slide elevation arrangement for slidingly elevating said specimen slide from said initial lowermost specimen introduction position to said final uppermost specimen examination position.

18. The device according to claim 17 wherein said specimen slide elevation arrangement includes:
a leading manual operated specimen slide elevation actuator under said specimen slide in said initial lowermost specimen introduction position for sliding along a leading opposite pair of specimen slide elevation tracks in said cartridge housing peripheral face each including at least an inclined elevation leg, and
a trailing manual operated specimen slide elevation actuator under said specimen slide in said initial lowermost specimen introduction position for sliding along a trailing opposite pair of specimen slide elevation tracks in said cartridge housing peripheral face each including at least an inclined elevation leg,
said leading manual operated specimen slide elevation actuator and trailing manual operated specimen slide elevation actuator being spaced apart for manual displacement along their corresponding opposite pairs of specimen slide elevation tracks towards one another from an initial set-up position to a final examination position, said initial set-up position corresponding to said initial lowermost specimen introduction position and said final examination position corresponding to said final uppermost specimen examination position.

* * * * *